(12) United States Patent
Koperski et al.

(10) Patent No.: US 9,710,556 B2
(45) Date of Patent: Jul. 18, 2017

(54) CONTENT RECOMMENDATION BASED ON COLLECTIONS OF ENTITIES

(75) Inventors: Krzysztof Koperski, Seattle, WA (US);
Jisheng Liang, Bellevue, WA (US);
Neil Roseman, Seattle, WA (US)

(73) Assignee: VCVC III LLC, Seattle, WA (US)

( * ) Notice: Subject to any disclaimer, the term of this patent is extended or adjusted under 35 U.S.C. 154(b) by 29 days.

(21) Appl. No.: 13/038,192

(22) Filed: Mar. 1, 2011

(65) Prior Publication Data

US 2011/0282888 A1    Nov. 17, 2011

Related U.S. Application Data

(60) Provisional application No. 61/309,318, filed on Mar. 1, 2010.

(51) Int. Cl.
*G06F 17/30* (2006.01)
(52) U.S. Cl.
CPC .. *G06F 17/30864* (2013.01); *G06F 17/30867* (2013.01)
(58) Field of Classification Search
None
See application file for complete search history.

(56) References Cited

U.S. PATENT DOCUMENTS

| | | | |
|---|---|---|---|
| 4,839,853 A | 6/1989 | Deerwester et al. | 364/900 |
| 4,887,212 A | 12/1989 | Zamora et al. | |
| 5,301,109 A | 4/1994 | Landauer et al. | 364/419.19 |
| 5,317,507 A | 5/1994 | Gallant | 364/419.13 |
| 5,325,298 A | 6/1994 | Gallant | 364/419.19 |

(Continued)

FOREIGN PATENT DOCUMENTS

| | | |
|---|---|---|
| EP | 0 280 866 | 9/1988 |
| EP | 0 585 079 | 3/1994 |

(Continued)

OTHER PUBLICATIONS

Abraham, "FoXQ—Xquery by Forms," Human Centric Computing Languages and Environments, Proceedings 2003 IEEE Symposium, Oct. 28-31, 2003, Piscataway, New Jersey, pp. 289-290.

(Continued)

*Primary Examiner* — Charles Adams
(74) *Attorney, Agent, or Firm* — Ellen M. Bierman; Benedict R. Dugan; Lowe Graham Jones PLLC

(57) ABSTRACT

Techniques for content recommendation are described. Some embodiments provide a content recommendation system ("CRS") configured to recommend content items that are related to a collection of entities. A content item may be considered related to a collection of entities based on various factors, including whether and how often the article references or otherwise covers the entities of the collection, the size of the article, other entities that are covered by the article but that are not in the collection, article recency, or article credibility. Recommending content items may also or instead include determining entities that are related to a collection. An entity can be considered related to a collection based on various factors, such as whether the entity is of the same or similar type to entities of the collection, or whether the entity appears in some article in a relationship with one or more entities of the collection.

34 Claims, 26 Drawing Sheets

(56) References Cited

U.S. PATENT DOCUMENTS

| | | | |
|---|---|---|---|
| 5,331,556 A | 7/1994 | Black, Jr. et al. ........ 364/419.08 |
| 5,377,103 A | 12/1994 | Lamberti et al. ........ 364/419.08 |
| 5,590,322 A | 12/1996 | Harding et al. |
| 5,619,709 A | 4/1997 | Caid et al. .................... 395/794 |
| 5,634,051 A * | 5/1997 | Thomson |
| 5,752,022 A | 5/1998 | Chiu ............................ 395/610 |
| 5,778,362 A | 7/1998 | Deerwester ...................... 707/5 |
| 5,794,050 A | 8/1998 | Dahlgren et al. ............. 395/708 |
| 5,794,178 A | 8/1998 | Caid et al. ........................ 704/9 |
| 5,799,268 A | 8/1998 | Boguraev ......................... 704/9 |
| 5,848,417 A | 12/1998 | Shoji et al. .................. 707/102 |
| 5,857,179 A | 1/1999 | Vaithyanathan et al. ......... 707/2 |
| 5,884,302 A | 3/1999 | Ho .................................... 707/3 |
| 5,933,822 A * | 8/1999 | Braden-Harder et al. |
| 5,950,189 A | 9/1999 | Cohen et al. ..................... 707/3 |
| 5,982,370 A | 11/1999 | Kamper ........................ 345/356 |
| 6,006,221 A | 12/1999 | Liddy et al. ...................... 707/5 |
| 6,006,225 A | 12/1999 | Bowman et al. ................. 705/5 |
| 6,026,388 A | 2/2000 | Liddy et al. ...................... 707/1 |
| 6,061,675 A | 5/2000 | Wical ............................. 706/45 |
| 6,064,951 A | 5/2000 | Park et al. ......................... 704/8 |
| 6,122,647 A | 9/2000 | Horowitz et al. ............. 707/513 |
| 6,167,368 A | 12/2000 | Wacholder ........................ 704/9 |
| 6,178,416 B1 | 1/2001 | Thompson et al. ............... 707/3 |
| 6,192,360 B1 | 2/2001 | Dumais et al. .................... 707/6 |
| 6,202,064 B1 | 3/2001 | Julliard ............................. 707/5 |
| 6,246,977 B1 | 6/2001 | Messerly et al. ................. 704/9 |
| 6,363,373 B1 | 3/2002 | Steinkraus ........................ 707/3 |
| 6,405,190 B1 | 6/2002 | Conklin ............................ 707/3 |
| 6,411,962 B1 | 6/2002 | Kupiec |
| 6,460,029 B1 | 10/2002 | Fries et al. |
| 6,484,162 B1 | 11/2002 | Edlund et al. .................... 707/3 |
| 6,510,406 B1 | 1/2003 | Marchisio |
| 6,584,464 B1 | 6/2003 | Warthen |
| 6,601,026 B2 | 7/2003 | Appelt et al. |
| 6,728,707 B1 | 4/2004 | Wakefield et al. |
| 6,732,097 B1 | 5/2004 | Wakefield et al. |
| 6,732,098 B1 | 5/2004 | Wakefield et al. |
| 6,738,765 B1 | 5/2004 | Wakefield et al. |
| 6,741,988 B1 | 5/2004 | Wakefield et al. |
| 6,745,161 B1 | 6/2004 | Arnold et al. ..................... 704/7 |
| 6,757,646 B2 | 6/2004 | Marchisio ......................... 704/8 |
| 6,859,800 B1 | 2/2005 | Roche et al. ..................... 707/3 |
| 6,862,710 B1 | 3/2005 | Marchisio .................. 715/501.1 |
| 6,904,433 B2 | 6/2005 | Kapitskaia et al. ............ 707/10 |
| 6,910,003 B1 | 6/2005 | Arnold et al. ..................... 704/4 |
| 6,996,575 B2 | 2/2006 | Cox et al. ..................... 707/102 |
| 7,051,017 B2 | 5/2006 | Marchisio .......................... 707/3 |
| 7,054,854 B1 | 5/2006 | Hattori et al. .................... 707/3 |
| 7,146,416 B1 | 12/2006 | Yoo et al. ...................... 709/224 |
| 7,171,349 B1 | 1/2007 | Wakefield et al. ............... 704/9 |
| 7,283,951 B2 | 10/2007 | Marchisio et al. ................ 704/9 |
| 7,398,201 B2 * | 7/2008 | Marchisio et al. ................ 704/9 |
| 7,403,938 B2 | 7/2008 | Harrison et al. .................. 707/3 |
| 7,451,135 B2 * | 11/2008 | Goldman et al. |
| 7,526,425 B2 | 4/2009 | Marchisio et al. ................ 704/9 |
| 7,529,756 B1 | 5/2009 | Haschart et al. ............. 707/100 |
| 7,752,200 B2 | 7/2010 | Scholl et al. .................. 707/730 |
| 7,788,084 B2 | 8/2010 | Brun et al. ........................ 704/7 |
| 8,112,402 B2 * | 2/2012 | Cucerzan et al. ............ 707/705 |
| 8,122,016 B1 | 2/2012 | Lamba et al. ................ 707/723 |
| 8,412,557 B1 | 4/2013 | Lloyd et al. ................ 705/7.29 |
| 8,594,996 B2 | 11/2013 | Liang et al. |
| 8,666,909 B2 * | 3/2014 | Pinckney et al. ............... 706/11 |
| 8,700,604 B2 | 4/2014 | Roseman et al. ............. 707/716 |
| 8,725,739 B2 | 5/2014 | Liang ............................ 707/40 |
| 8,856,096 B2 | 10/2014 | Marchisio et al. |
| 8,954,469 B2 | 2/2015 | Dhillon et al. |
| 2002/0007267 A1 | 1/2002 | Batchilo et al. ................... 704/9 |
| 2002/0010574 A1 | 1/2002 | Tsourikov et al. ................ 704/9 |
| 2002/0022956 A1 | 2/2002 | Ukrainczyk et al. ............. 704/9 |
| 2002/0059161 A1 | 5/2002 | Li ..................................... 707/1 |
| 2002/0078041 A1 | 6/2002 | Wu .................................... 707/4 |
| 2002/0078045 A1 | 6/2002 | Dutta ................................. 707/7 |
| 2002/0091671 A1 | 7/2002 | Prokoph ............................ 707/1 |
| 2002/0103789 A1 | 8/2002 | Turnbull et al. .................. 707/3 |
| 2002/0120651 A1 | 8/2002 | Pustejovsky et al. ......... 707/513 |
| 2002/0156763 A1 | 10/2002 | Marchisio ......................... 707/1 |
| 2003/0004716 A1 | 1/2003 | Haigh et al. .................. 704/238 |
| 2003/0101182 A1 | 5/2003 | Govrin et al. ..................... 707/7 |
| 2003/0115065 A1 | 6/2003 | Kakivaya et al. .......... 704/270.1 |
| 2003/0115191 A1 | 6/2003 | Copperman et al. ............. 707/3 |
| 2003/0191626 A1 | 10/2003 | Al-Onzian et al. ............... 704/8 |
| 2003/0233224 A1 | 12/2003 | Marchisio et al. ................ 704/4 |
| 2004/0010508 A1 * | 1/2004 | Fest et al. ..................... 707/102 |
| 2004/0044669 A1 * | 3/2004 | Brown et al. ................ 707/100 |
| 2004/0064447 A1 | 4/2004 | Simske et al. .................... 707/5 |
| 2004/0103090 A1 | 5/2004 | Dogl et al. ........................ 707/3 |
| 2004/0125877 A1 | 7/2004 | Chang et al. ............. 375/240.28 |
| 2004/0167870 A1 | 8/2004 | Wakefield et al. ................ 707/1 |
| 2004/0167883 A1 | 8/2004 | Wakefield et al. ................ 707/3 |
| 2004/0167884 A1 | 8/2004 | Wakefield et al. ................ 707/3 |
| 2004/0167885 A1 | 8/2004 | Wakefield et al. ................ 707/3 |
| 2004/0167886 A1 | 8/2004 | Wakefield et al. ................ 707/3 |
| 2004/0167887 A1 | 8/2004 | Wakefield et al. ................ 707/3 |
| 2004/0167907 A1 | 8/2004 | Wakefield et al. ............ 707/100 |
| 2004/0167908 A1 | 8/2004 | Wakefield et al. ............ 707/100 |
| 2004/0167909 A1 | 8/2004 | Wakefield et al. ............ 707/100 |
| 2004/0167910 A1 | 8/2004 | Wakefield et al. ............ 707/100 |
| 2004/0167911 A1 | 8/2004 | Wakefield et al. ............ 707/100 |
| 2004/0221235 A1 | 11/2004 | Marchisio et al. ............ 715/534 |
| 2004/0243388 A1 | 12/2004 | Corman et al. ................... 704/1 |
| 2005/0027704 A1 | 2/2005 | Hammond et al. ............... 707/5 |
| 2005/0076365 A1 | 4/2005 | Popov et al. .................... 725/46 |
| 2005/0108001 A1 | 5/2005 | Aarskog ......................... 704/10 |
| 2005/0108262 A1 * | 5/2005 | Fawcett et al. ............... 707/100 |
| 2005/0138018 A1 | 6/2005 | Sakai et al. ....................... 707/3 |
| 2005/0144064 A1 | 6/2005 | Calabria et al. ................ 705/14 |
| 2005/0149473 A1 | 7/2005 | Weare |
| 2005/0149494 A1 | 7/2005 | Lindh et al. ...................... 707/3 |
| 2005/0177805 A1 | 8/2005 | Lynch et al. .................. 715/968 |
| 2005/0197828 A1 | 9/2005 | McConnell et al. .............. 704/9 |
| 2005/0210000 A1 | 9/2005 | Michard .......................... 707/3 |
| 2005/0216443 A1 | 9/2005 | Morton et al. ................... 707/3 |
| 2005/0234968 A1 * | 10/2005 | Arumainayagam ........................ G06F 17/30011 |
| 2005/0262050 A1 * | 11/2005 | Fagin ................ G06F 17/30864 |
| 2005/0267871 A1 | 12/2005 | Marchisio et al. ................ 707/3 |
| 2006/0149734 A1 | 7/2006 | Egnor et al. ...................... 707/7 |
| 2006/0167862 A1 | 7/2006 | Reisman ........................... 707/3 |
| 2006/0224565 A1 | 10/2006 | Ashutosh et al. ................. 707/3 |
| 2006/0229889 A1 | 10/2006 | Hodjat et al. ................. 709/202 |
| 2006/0271353 A1 | 11/2006 | Berkan et al. .................... 704/9 |
| 2006/0279799 A1 * | 12/2006 | Goldman ...................... 358/403 |
| 2007/0136326 A1 | 6/2007 | McClement et al. ......... 707/100 |
| 2007/0143300 A1 | 6/2007 | Gulli et al. ...................... 707/10 |
| 2007/0156669 A1 * | 7/2007 | Marchisio et al. ................ 707/4 |
| 2007/0209013 A1 | 9/2007 | Ramsey et al. .............. 715/769 |
| 2007/0233656 A1 | 10/2007 | Bunescu et al. .................. 707/3 |
| 2007/0276830 A1 * | 11/2007 | Gruhl ................ G06F 17/30675 |
| 2008/0005651 A1 | 1/2008 | Grefenstette et al. ......... 715/500 |
| 2008/0010270 A1 | 1/2008 | Gross ................................ 707/5 |
| 2008/0059456 A1 | 3/2008 | Chowdhury et al. ............. 707/5 |
| 2008/0097975 A1 | 4/2008 | Guay et al. ........................ 707/4 |
| 2008/0097985 A1 | 4/2008 | Olstad et al. ...................... 707/5 |
| 2008/0120129 A1 | 5/2008 | Seubert et al. ................. 705/35 |
| 2008/0127331 A1 | 5/2008 | Seidman et al. |
| 2008/0208864 A1 | 8/2008 | Cucerzan et al. ................. 707/8 |
| 2008/0222105 A1 | 9/2008 | Matheny |
| 2008/0228720 A1 * | 9/2008 | Mukherjee et al. .............. 707/3 |
| 2008/0235203 A1 | 9/2008 | Case et al. ........................ 707/5 |
| 2008/0249991 A1 | 10/2008 | Valz |
| 2008/0288456 A1 | 11/2008 | Omoigui ........................... 707/3 |
| 2009/0070325 A1 * | 3/2009 | Gabriel ............ G06F 17/30705 |
| 2009/0144609 A1 | 6/2009 | Liang et al. ................... 715/230 |
| 2009/0187467 A1 | 7/2009 | Fang et al. ..................... 705/10 |
| 2009/0228439 A1 | 9/2009 | Manolescu et al. .............. 707/3 |
| 2009/0248678 A1 * | 10/2009 | Okamoto et al. ................. 707/5 |
| 2009/0327223 A1 * | 12/2009 | Chakrabarti ....... G06F 17/30864 |
| 2010/0010994 A1 | 1/2010 | Wittig et al. ...................... 707/6 |
| 2010/0250497 A1 | 9/2010 | Redlich et al. ............... 707/661 |
| 2010/0299326 A1 * | 11/2010 | Germaise ..................... 707/728 |
| 2011/0173194 A1 | 7/2011 | Sloo et al. .................... 707/736 |

(56) References Cited

U.S. PATENT DOCUMENTS

| | | | |
|---|---|---|---|
| 2011/0208801 A1 | 8/2011 | Thorkelsson et al. | |
| 2012/0254188 A1 | 10/2012 | Koperski et al. | 707/740 |
| 2013/0124510 A1 | 5/2013 | Guha | 707/723 |

FOREIGN PATENT DOCUMENTS

| | | |
|---|---|---|
| EP | 0 597 630 | 5/1994 |
| WO | WO 00/14651 | 3/2000 |
| WO | WO 00/57302 | 9/2000 |
| WO | WO 01/22280 | 3/2001 |
| WO | WO 01/80177 | 10/2001 |
| WO | WO 02/27536 | 4/2002 |
| WO | WO 02/33583 | 4/2002 |
| WO | WO 03/017143 | 2/2003 |
| WO | WO 2004/053645 | 6/2004 |
| WO | WO 2004/114163 | 12/2004 |
| WO | WO 2006/068872 | 6/2006 |

OTHER PUBLICATIONS

Cass, "A Fountain of Knowledge," IEEE Spectrum Online, URL: http://www.spectrum.ieee.org/WEBONLY/publicfeature/jan04/0104compl.html, download date Feb. 4, 2004, 8 pages.

Feldman et al., "Text Mining at the Term Level," *Proc. of the 2nd European Symposium on Principles of Data Mining and Knowledge Discover*, Nantes, France, 1998.

Ilyas et al., "A Conceptual Architecture for Semantic Search Engine," IEEE, INMIC, 2004, pp. 605-610.

Jayapandian et al., "Automating the Design and Construction of Query Forms," Data Engineering, Proceedings of the 22nd International Conference IEEE, Atlanta, Georgia, Apr. 3, 2006, pp. 125-127.

Kaiser, "Ginseng—A Natural Language User Interface for Semantic Web Search," University of Zurich, Sep. 16, 2004, URL=http://www.ifi.unizh.ch/archive/mastertheses/DA_Arbeiten_2004/Kaiser_Christian.pdf, pp. 1-84.

Liang et al., "Extracting Statistical Data Frames from Text," SIGKDD Explorations, Jun. 2005. vol. 7, No. 1, pp. 67-75.

Littman et al., "Automatic Cross-Language Information Retrieval using Latent Semantic Indexing," In Grefenstette, G., editor, Cross Language Information Retrieval. Kluwer, 1996.

Nagao et al., "Semantic Annotation and Transcoding: Making Web Content More Accessible," *IEEE Multimedia, IEEE Computer Society*, US. 8(2):69-81, Apr. 2001.

Nguyen et al., "Accessing Relational Databases from the World Wide Web," SIGMOD Record. ACM USA, Jun. 1996, vol. 25, No. 2, pp. 529-540.

Pohlmann et al., "The Effect of Syntactic Phrase Indexing on Retrieval Performance for Dutch Texts," Proceedings of RIAO, pp. 176-187, Jun. 1997.

Google, "How to Interpret Your Search Results", http://web.archive.org/web/20011116075703/http://www.google.com/intl/en/help/interpret.html, Mar. 27, 2001; 6 pages.

William H. Press et al.: "Backus-Gilbert Method, Chapter 18.6" In: "Fortran Numerical Recipes Second Edition", Jan. 1, 1996, Cambridge University Press, XP055083119, pp. 806-809.

DARPA-61 Phase I Selections from the 99.1 Solicitation, Jul. 1, 1999, p. 21 of 30, entitled "An Inverse Inference Engine for High Precision Web Search" by Marchisio, topic# DARPA 99-020.

* cited by examiner

Fig. 11A

"Roger Moore" <> * <> * [Go] help
Results 1-100 of 2,835 for *"Roger Moore" <> * <>*                                    1112

| | | | | | |
|---|---|---|---|---|---|
| 02/26/2010 | ⊞ | [1] | Martin Grace ⇧ | act as | stuntman / Roger Moore |
| 02/28/2010 | ⊞ | [2] | actor ⇧ | single out | Moore |
| 02/18/2010 | ⊞ | [2] | Moore ⇧ | make | screen / comeback |
| 03/01/2010 | ⊞ | [1] | Roger / Moore ⇧ | write | isQuotation |
| 02/18/2010 | ⊞ | [2] | Moore ⇧ | star in | film / Connemara Days |
| 02/18/2010 | ⊞ | [6] | Moore ⇧ | make | film / comeback |
| 02/18/2010 | ⊞ | [2] | Moore ⇧ | make | comeack |
| 02/23/2010 | ⊞ | [1] | she ⇧ | need | Roger / Moore |
| 02/06/2010 | ⊞ | [2] | village ⇧ | become | Moore |
| 02/19/2010 | ⊞ | [2] | MOORE ⇧ | make | RETURN |
| 02/03/2010 | ⊞ | [3] | Moore ⇧ | feel | fit |
| 02/18/2010 | ⊞ | [3] | character ⇧ | hit | Moore |
| 02/02/2010 | ⊞ | [2] | actor ⇧ | include | Moore |
| 02/08/2010 | ⊞ | [1] | guest ⇧ | include | Elaine Page / Joel Grey / Cliff Richard / Roger / Moore / Riverdance / |

1111

Next

*Fig. 11B*

Results 1-100 of 1,991 for [actor] <> " " <> context contains "007" or "Bond actor" — 1121

| Date | | | | | | |
|---|---|---|---|---|---|---|
| 02/28/2010 | [+] [1] | Benjamin Rousseau | ⇑ | act | ⇑ | Daniel Craig / man-tan |
| 02/04/2010 | [+] [1] | franchise | ⇑ | make | ⇑ | name / Sean Connery — 1123 |
| 02/04/2010 | [+] [1] | Sean Connery / actor | ⇑ | return to | ⇑ | franchise — 1124 |
| | | DVD Review: The Return Of The Man From U.N.C.L.E. - The Fifteen Years Later Affair | | | | |
| | | *A sinister cabal of superior whites.* Spies were all the rage back in 1983, while Roger Moore was bumbling through his latest 007 escapade, Octopussy, veteran Bond actor Sean Connery returned to the franchise that made him a household name (and that he had also retired from—twice) in the independently-produced James Bond outing, Never Say Never Again. There was also some sort of a Cold War thing going on at the time, too - but the regards on that are completely unfounded... | | | | |
| 02/04/2010 | [+] [1] | Sean Connery | ⇑ | retire | | |
| 02/04/2010 | [+] [1] | Roger Moore | ⇑ | bumble | | |
| 11/12/2008 | [+] [1] | James Bond Roger Moore / actor | ⇑ | say | ⇑ | 007 |
| | | Roger Moore: James Bond is too violent | | | | |
| | | Quantum of Solace is too violent for his tastes. James Bond actor Roger Moore says the new 007 film | | | | |
| 10/12/2008 | [+] [1] | James Bond Daniel Craig / actor | ⇑ | buy | ⇑ | apartment |
| 10/23/2008 | [+] [1] | Daniel Craig / actor | ⇑ | break with | ⇑ | elegance |
| 01/31/2010 | [+] [1] | actor / Sean Connery | ⇑ | portray | ⇑ | James Bond |

1122 — Next

*Fig. 11C*

"Sean Connery" <> " * " context contains "Roger" [Go] help
Results 1-100 of 124 for "Sean Connery" <> " * " context contains "Roger Moore" — 1131

| Date | | | | | |
|---|---|---|---|---|---|
| 02/10/2010 | [5] | | | include ⇑ | Sean Connery / Moore — 1135 |
| 02/06/2010 | [2] | | | include ⇑ | Sean Connery / Roger Moore — 1133 |
| 02/04/2010 | [1] | franchise ⇑ | make ⇑ | name / Sean Connery — 1134 |
| | | DVD Review: The Return Of The Man From U.N.C.L.E. - The Fifteen Years Later Affair | | | |
| | | *A similar cabal of superior writers...* Spies were all the rage back in 1983: while Roger Moore was bumbling through his latest 007 escapade, Octopussy, veteran Bond actor Sean Connery returned to the franchise that made him a household name (and that he had also retired from--twice) in the independently-produced James Bond outing, Never Say Never Again. There was also some sort of a Cold War thing going on at the time too - but the reports on that completely unfounded... | | | |
| 02/04/2010 | [1] | Sean Connery / actor ⇑ | return to ⇑ | franchise |
| 11/24/2009 | [2] | resident ⇑ | include ⇑ | Moore / Sean Connery |
| 01/30/2010 | [1] | Sean Connery / Roger / Moore ⇑ | brief ⇑ | Sean Connery / staff |
| 01/30/2010 | [1] | Roger / Moore ⇑ | retire ⇑ | be |
| 11/06/2009 | [1] | | offer ⇑ | replacement / Sean Connery / pale |
| 12/01/2009 | [1] | Sean Connery / James Bond ⇑ | enjoy ⇑ | gig |
| 10/03/2008 | [1] | ROGER MOORE MAKES ⇑ | succeed ⇑ | Sean Connery |

Next — 1132

*Fig. 11D*

"Roger Moore" <> " " <> " context contains "Sean C [Go] help
Results 1-100 of 144 for "Roger Moore" <> " " <> " context contains "Sean Connery"

| Date | | | | | |
|---|---|---|---|---|---|
| 02/10/2010 | ⊞ [3] | | | include ⇧ | Sean Connery / Moore |
| 02/06/2010 | ⊞ [2] | | | include ⇧ | Sean Connery / Roger Moore |
| 11/24/2009 | ⊞ [2] | resident ⇧ | | include ⇧ | Moore / Sean Connery |
| 01/30/2010 | ⊞ [1] | | | rely on ⇧ | Roger / Moore |
| 02/04/2010 | ⊞ [1] | Roger / Moore ⇧ | | bumble ⇧ | |
| 01/30/2010 | ⊞ [1] | Sean Connery / Roger / Moore ⇧ | | be ⇧ | |
| 11/06/2009 | ⊞ [1] | Roger / Moore ⇧ | | offer ⇧ | replacement / Sean Connery / pale |
| 10/28/2009 | ⊞ [2] | Moore ⇧ | | play ⇧ | James Bond |
| 10/28/2009 | ⊞ [1] | Roger / Moore ⇧ | | embody ⇧ | image |
| 10/28/2009 | ⊞ [1] | Roger / Moore ⇧ | | give ⇧ | Sean Connery |
| 10/03/2008 | ⊞ [1] | ROGER MOORE MAKES ⇧ | | succeed ⇧ | Sean Connery |
| 11/26/2009 | ⊞ [1] | | | feature ⇧ | depicting / Sean Connery / Roger Moore |
| 10/04/2008 | ⊞ [1] | Roger / Moore ⇧ | | succeed ⇧ | Roger / Moore |
| 05/29/2009 | ⊞ [1] | Roger / Moore ⇧ | | work on ⇧ | The Persuaders |
| 10/05/2008 | ⊞ [1] | Michael O'Mara ⇧ | | publish ⇧ | Roger / Moore |
| 10/14/2009 | ⊞ [1] | Roger / Moore ⇧ | | ham ⇧ | his |

*Fig. 11E*

CONTENT RECOMMENDATION BASED ON COLLECTIONS OF ENTITIES

TECHNICAL FIELD

The present disclosure relates to methods, techniques, and systems for recommending content and, in particular, to methods, techniques, and systems for recommending content items that are related to a collection of entities.

BRIEF DESCRIPTION OF THE DRAWINGS

FIGS. 11A-11E illustrate example screen displays generated by queries executed for content recommendation provided by an example embodiment of a content recommendation system.

DETAILED DESCRIPTION

Embodiments described herein provide enhanced computer- and network-based methods and systems for recommending content. Example embodiments provide a content recommendation system ("CRS") configured to recommend content items that are related to a collection of entities. A CRS may be used, for example, by a user to locate or follow pertinent content from a large corpus of documents, such as from news articles available via a wide-area or local area networked environment, to a set of entities of personal interest. Content items may include articles and information about or contained in articles or other documents. A typical article comprises text, audio, image, and/or video data that provides information about one or more entities and relationships between those entities. Information about or contained in articles thus includes entities and relationships referenced or otherwise covered by an article. Entities include people, places (e.g., locations), organizations (e.g., political parties, corporations, groups), events, concepts, products, substances, and the like. Table 3, below, includes a list of example entity types. Fewer or more can be made available. Information about or contained in articles may also or instead include various types of meta-information, such as article titles, authors, publication dates, summaries, quotations, and the like.

In one embodiment, a user can interact with the CRS to define a collection of entities of interest. The CRS then recommends content items that are related to the entities in the user's collection. Recommending content items may include determining one or more articles, such as news stories, Web pages, Blog posts, or the like, that are related to the collection. An article can be considered related to a collection based on various factors, including whether and how often the article references or otherwise covers the entities of the collection, the size of the article, other entities that are covered by the article but that are not in the collection, article recency, article credibility, and the like. Recommending content items may also or instead include determining one or more entities that are related to the collection. An entity can be considered related to a collection based on various factors, such as whether the entity is of the same or similar type to entities of the collection, whether the entity appears in some article in a relationship with one or more entities of the collection, and the like. Specific example techniques for determining related articles and entities are discussed, for example, with respect to FIGS. 7-11, below.

Figure 1:
FIG. 1 illustrates an example screen display provided by an example embodiment of a content recommendation system.

FIG. 1 illustrates an example screen display provided by an example embodiment of a content recommendation system. In particular, FIG. 1 illustrates a Web browser 100 that displays a screen 102 (e.g., a Web page) that is being used by a user to interact with the content recommendation system. The screen 102 displays information about and related to a collection named "Collection)," including a collection contents section 104, a related entities section 106, and a related articles section 108. The collection contents section 104 indicates that Collection1 includes two entities: Roger Moore and Sean Connery. The related articles section 108 includes references to multiple articles that are related to either or both of the entities of Collection1. For example, article reference 110 includes a title, a snippet from the article, and indications of at least some of the entities (e.g., Richard Demarco, Edinburgh, The Scotsman, Joseph Beuys, Sean Connery, Scotland, etc.) referenced in the article. The related entities section 106 includes references to multiple entities that are related to the entities in Collection1, including James Bond, George Lazenby, Pierce Brosnan, Timothy Dalton, Daniel Craig, and the like.

Some of the examples discussed herein focus primarily on collections that include indications of one or more singular entities (e.g., the actor Sean Connery). In other embodiments, a collection can include indications that reference multiple entities, such as by including names that ambiguously reference multiple entities (e.g., Jaguar the animal or Jaguar the car); facets (e.g., more finely granular characteristics of entities such as categories, types, and/or characteristics, such as actor, politician, nation, drug, automobile, and the like); keyterms (e.g., one or more words or phrases, such as "bond actors," "007," and the like); and the like. Table 4, below, includes a list of example facets for the various entity types. Fewer or more can be made available. The techniques described herein are equally applicable to collections that include such indications of multiple and/or ambiguous entities.

Figure 2:
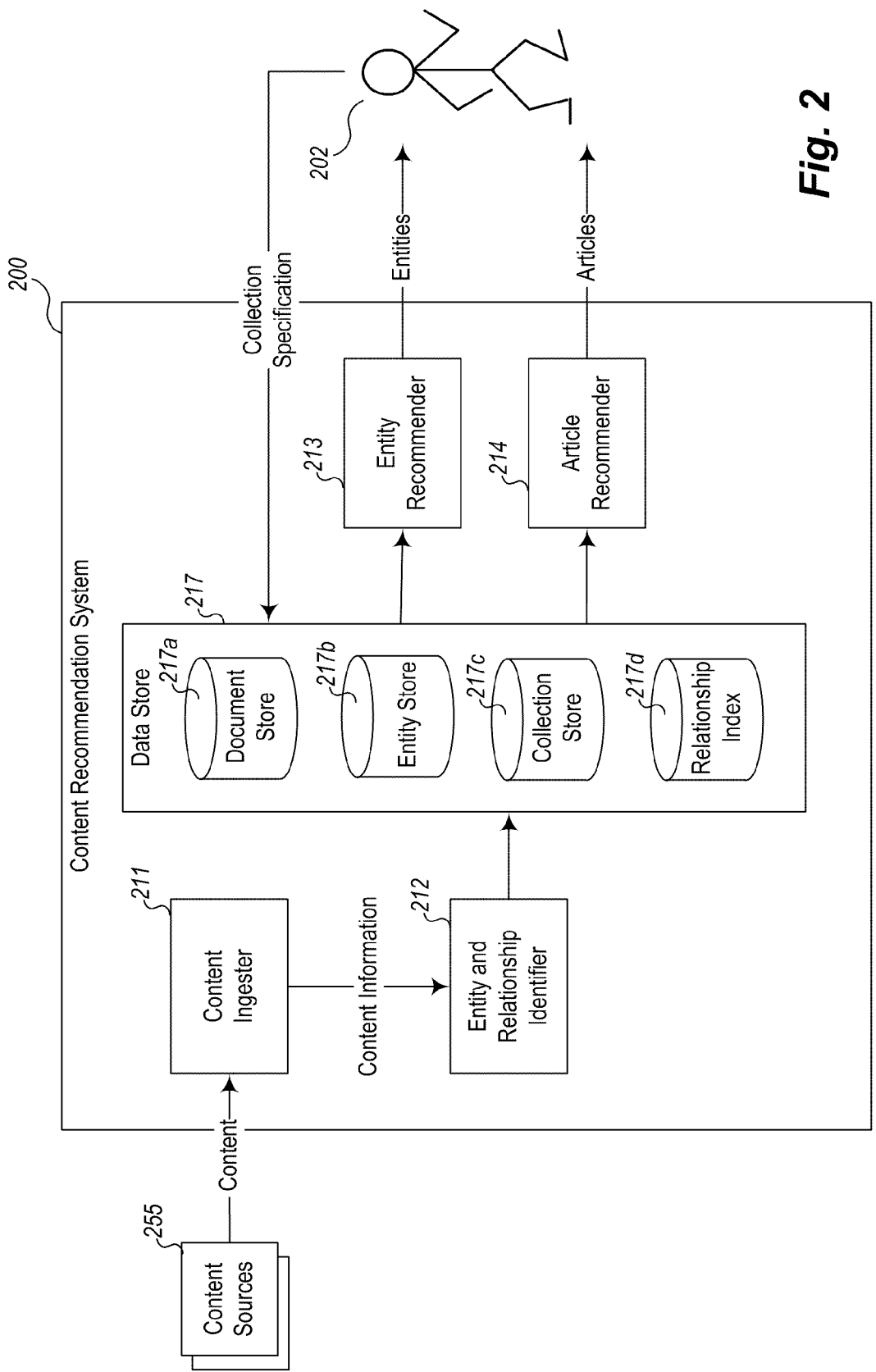
FIG. 2 illustrates an example block diagram of an example embodiment of a content recommendation system.

FIG. 2 illustrates an example block diagram of an example embodiment of a content recommendation system. In particular, FIG. 2 illustrates a content recommendation system ("CRS") 200 that includes a content ingester 211, an entity and relationship identifier 212, an entity recommender 213, an article recommender 214, and a data store 217. The data store 217 includes a document store 217a, an entity store 217b, a collection store 217c, and a relationship index 217d. The content ingester 211 receives and indexes content from various content sources 255, including sources such as Web sites, Blogs, news feeds, video feeds, and the like. The content ingester 211 may also receive content from non-public or semi-public sources, including subscription-based information services, access-controlled social networks, and the like. The content ingester 211 provides content information, including data included within content items (e.g., text, images, video) and meta-data about content items (e.g., author, title, date, source), to the entity and relationship identifier 212. The content information may be provided directly (as illustrated) and/or via some intermediary, such as the data store 217.

The entity and relationship identifier 212 receives content information from the content ingester 211 and identifies entities and relationships that are referenced therein. Various automatic and semi-automatic techniques are contemplated for identifying entities within content items. In one embodiment, the identifier 212 uses natural language processing techniques, such as parts of speech tagging and relationship searching, to identify sentence components such as subjects, verbs, and objects, and to disambiguate and identify entities. Example relationship searching technology, which uses natural language processing to determine relationships between subjects and objects in ingested content, is described in detail in U.S. patent application Ser. No. 11/012,089, filed Dec. 13, 2004, and entitled "METHOD AND SYSTEM FOR EXTENDING KEYWORD SEARCHING FOR SYNTACTICALLY AND SEMANTICALLY ANNOTATED DATA," and entity recognition and disambiguation technology is described in detail in U.S. patent application Ser. No. 12/288,158, filed Oct. 15, 2008, and entitled "NLP-BASED ENTITY RECOGNITION AND DISAMBIGUATION," both of which are incorporated herein by reference in their entirety. The use of relationship searching, enables the CRS 200 to establish second order (or greater order) relationships between entities and to store such information.

For example, given a sentence such as "Sean Connery starred in Goldfinger," the identifier 212 may identify "Sean Connery" as the sentence subject, "starred" as the sentence verb, and "Goldfinger" as the sentence object. The identified subjects and objects are then added as disambiguated entities to the entity store 217b. In the above example, "Sean Connery" and "Goldfinger" would be added to the entity store 217b. The identified verbs can then be used to define relationships between the identified entities. These defined relationships (e.g., stored as subject-verb-object or SAO triplets, or otherwise) are then stored in the relationship index 217d. In the above example, a representation of the fact that the actor Sean Connery starred in the film Goldfinger would be added to the relationship index 217d. In some embodiments, the process of identifying entities may be at least in part manual. For example, entities may be provisionally identified by the identifier 212, and then submitted to humans for editing, finalization, review, and/or approval.

The entity and relationship identifier 212 may determine various kinds of information about entities and relationships. In one embodiment, the identifier 212 determines facets, which include finely grained characteristics of entities, such as entity types, roles, qualities, functions, and the like. For example, the entity Sean Connery may have various associated facets, including that of actor, producer, knight, and Scotsman. The facet information for entities may be also stored in the entity store 217b.

A user 202 creates a collection by specifying or otherwise identifying one or more entities. In some embodiments, the user 202 interacts with a Web site or other type of user interface to create a collection by providing a collection name and indicating one or more entities (or other things such as facets or keywords) to be included in the collection. Collections specified by the user 202 are stored in the collection store 217c. Techniques for collection creation and collection management are discussed further with reference to FIGS. 3A-3I, below.

Given a collection of entities, the article recommender 214 determines, with reference to information contained in the data store 217, one or more articles that are related to the collection. As discussed above, determining the one or more articles may include finding one or more articles that cover or otherwise reference entities from the collection. The article recommender 214 then provides the determined articles to the user 202, such as via a Web site, mobile device, or other user interface. Techniques for article recommendation are discussed further with reference to FIGS. 6, 7, 9, and 10, below.

Given a collection of entities, the entity recommender 213 determines, with reference to information contained in the data store 217, one or more entities that are related to the collection. As discussed above, determining the one or more entities may include finding one or more entities that are related to the entities of the collection, based on factors such as whether the determined entities share characteristics (e.g. facets) with the entities of the collection, appear in relationships with entities of the collection, and/or appear in context with entities of the collection. Techniques for entity recommendation are discussed further with reference to FIGS. 6, 8, 9, and 11, below.

The described techniques herein are not limited to the specific architecture shown in FIG. 2. For example, in some embodiments, content ingestion and entity and relationship identification may be performed by another (possibly external or remote) system or component. In other embodiments, the CRS 200 may not interact directly with users, but rather provide user interface components (e.g., collection widgets) that may be embedded or otherwise incorporated in third-party applications or systems, such as Web sites, smart phones, desktop systems, and the like.

In addition, although the described techniques for content recommendation are illustrated primarily with respect to article recommendation and entity recommendation, other types of content are contemplated. For example, other embodiments may utilize at least some of the described techniques to perform or facilitate the recommendation of other types of content, including advertisements, audio (e.g., music), video, images, and the like.

FIGS. 3A-3I illustrate example screen displays provided by an example embodiment of a content recommendation system. More specifically, FIGS. 3A-3I depict a running example, in which a user interacts with a Web site operated by the content recommendation system to create a collection of entities and then obtain information about articles and entities that are related to the collection.

Figure 3A:
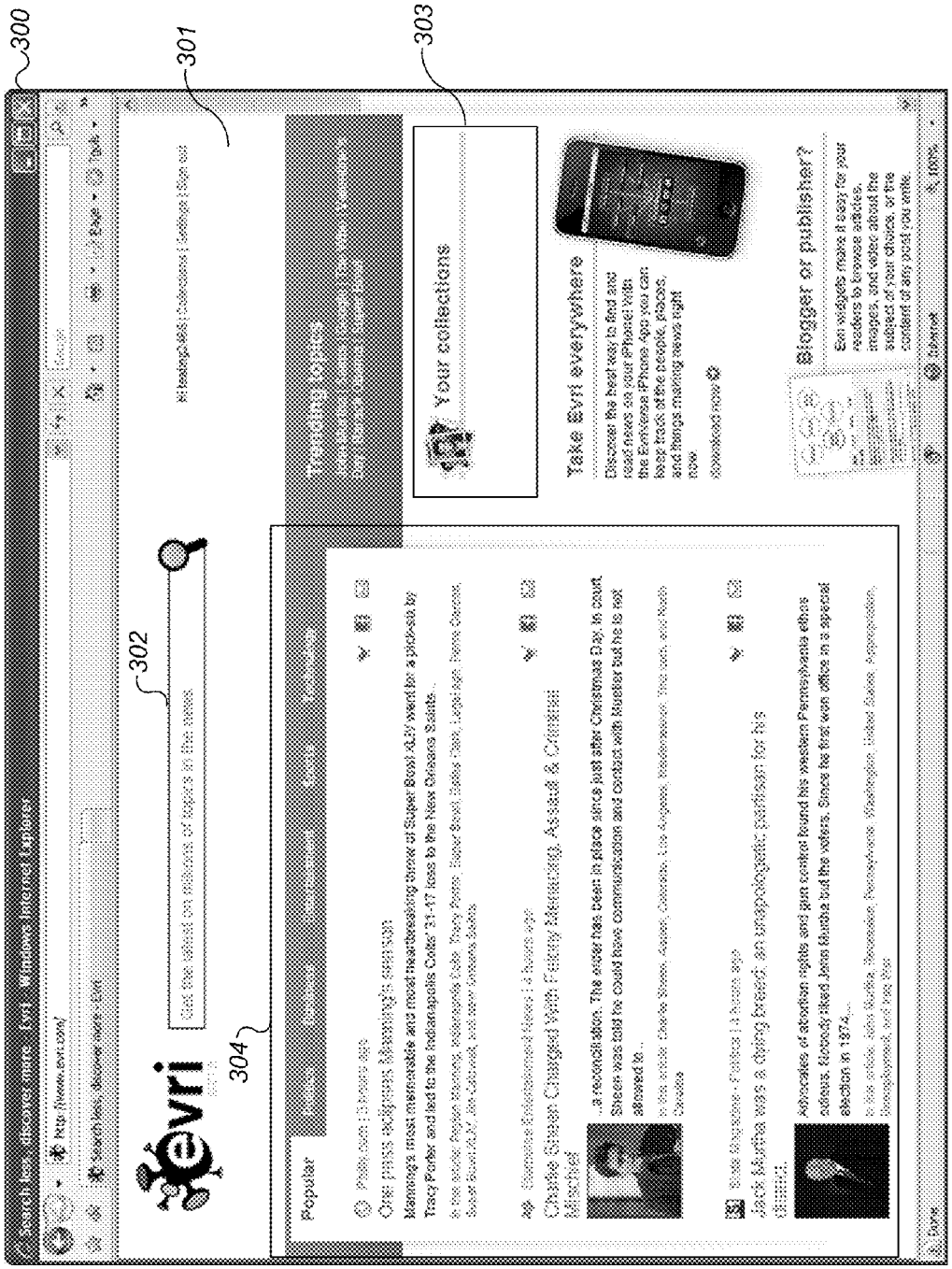
FIGS. 3A-3I illustrate example screen displays provided by an example embodiment of a content recommendation system.

FIG. 3A shows a home page provided by the content recommendation system. In particular, FIG. 3A illustrates a Web browser 300 displaying a screen 301 provided to a user by a content recommendation system. The screen 301 is a home or main page provided by the content recommendation system, such as may be provided to the user when he or she first accesses the content recommendation system. Various examples of different user interfaces for accessing a content recommendation system are described in detail in U.S. patent application Ser. No. 12/288,349, filed Oct. 16, 2008, and entitled "NLP-BASED CONTENT RECOMMENDER," which is incorporated herein by reference in its entirety The screen 301 includes a search tool 302, a collections information area 303, and an articles area 304. As will be described further below, the user can use the search tool 302 to initiate searches for information about content (e.g., articles, entities) known to the content recommendation system. The collections information area 303 provides information about collections that are associated with (e.g., created by) the user. At the point in time the current example is illustrated, the user has not yet defined any collections. The articles area 304 provides information about articles known to the content recommendation system, possibly arranged by categories, such as popular, politics, business, entertainment, sports, technology, and the like.

Figure 3B:
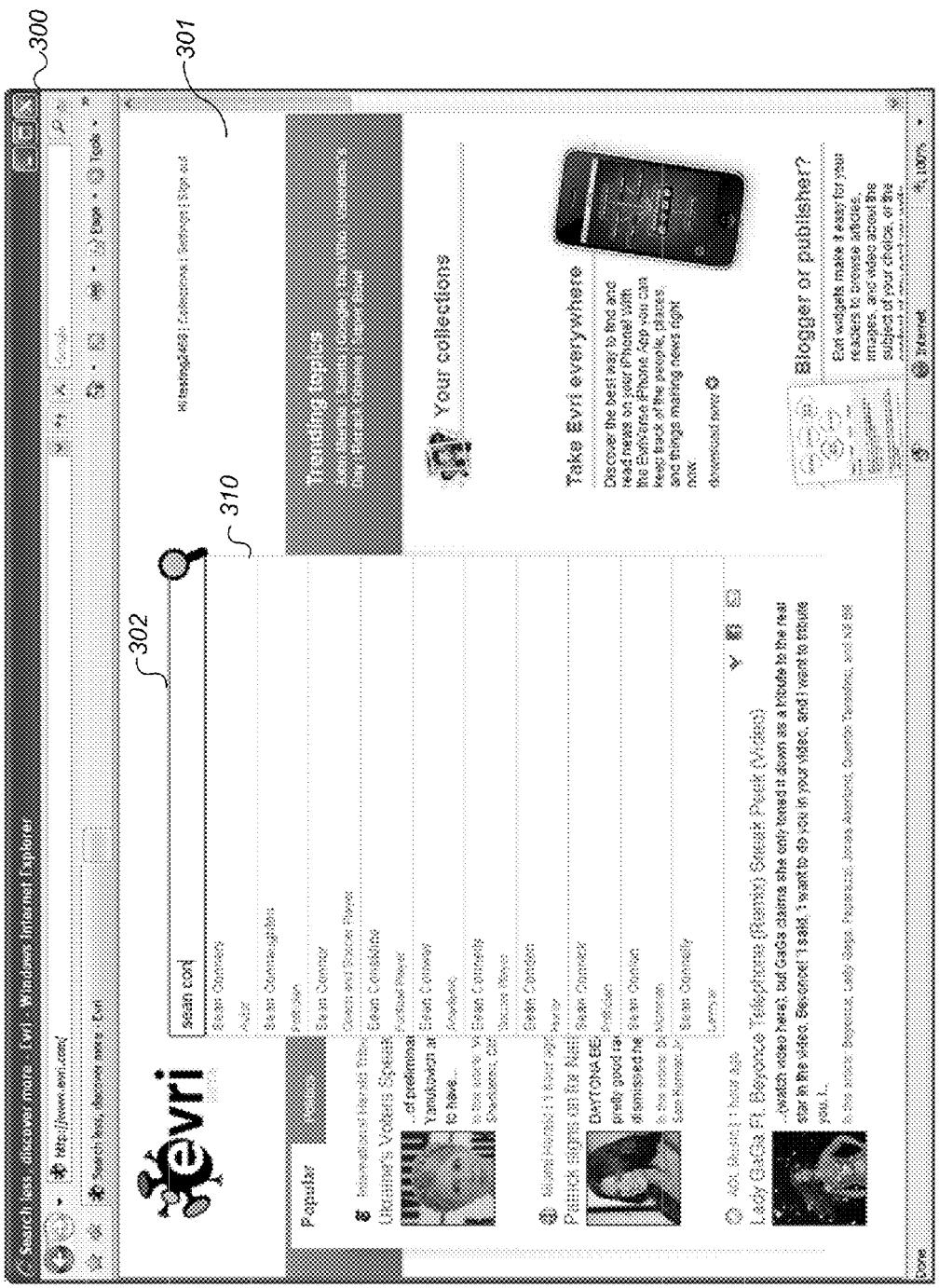

FIG. 3B illustrates initiation of a search via the content recommendation system. In particular, FIG. 3B shows the Web browser 300 displaying screen 301 during the initiation of a search by the user. As the user enters text into the search tool 302, a drop down menu 310 is generated and displayed. The drop down menu 310 displays multiple indications of entities that match a string (e.g., "sean con") entered by the user, such that the user can select one of the entities as the subject of the search. In the present example, the user selects an entity named "Sean Connery."

Figure 3C:
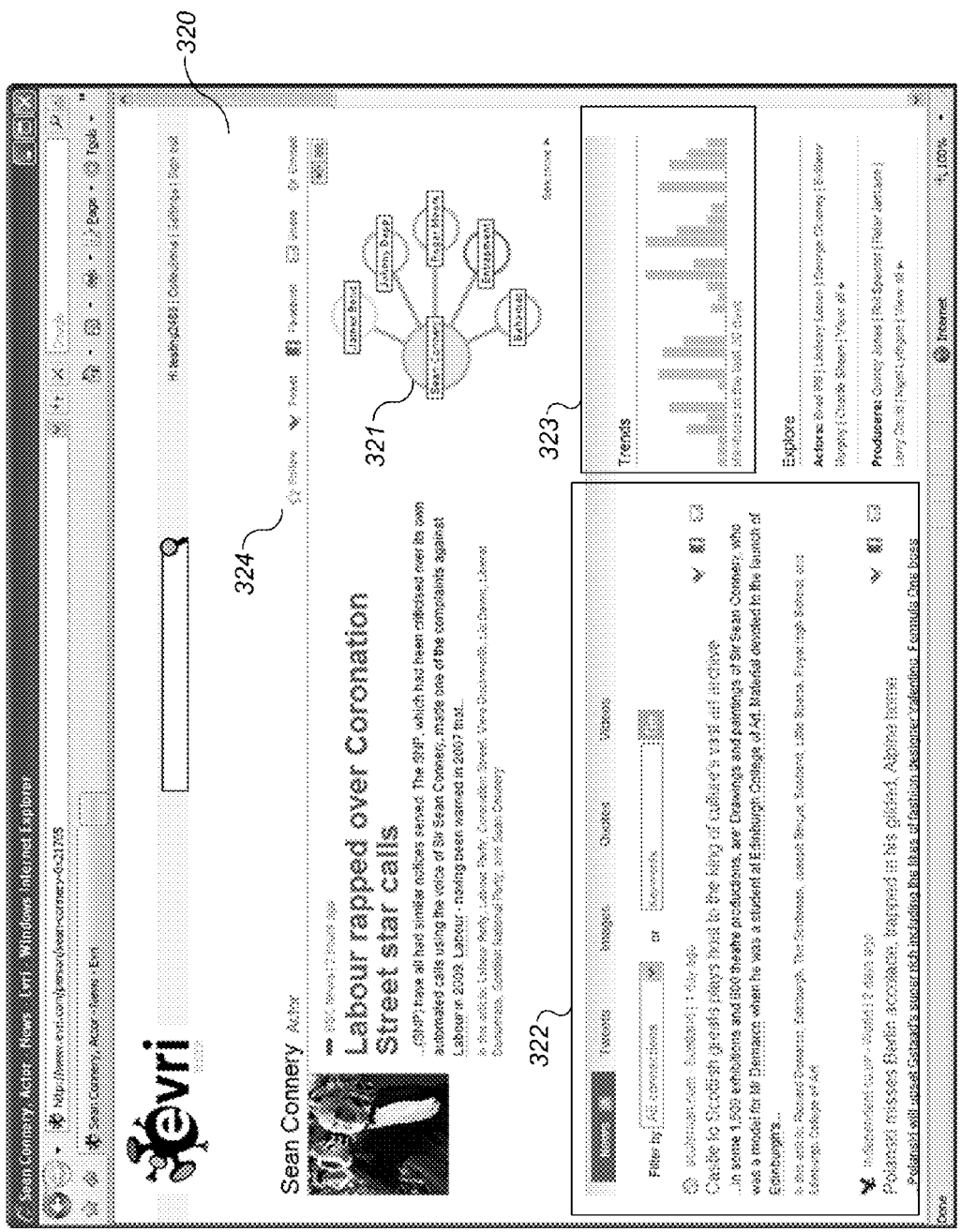

FIG. 3C shows an entity information page provided as a result of the search initiated in FIG. 3B. In particular, FIG. 3C illustrates the Web browser 300 displaying a screen 320 provided in response to a search for the entity named "Sean Connery." The screen 320 is an entity information page that includes an entity relationship graph 321, a related articles area 322, a trend area 323, and a collection creation control 324 (labeled "Follow"). The relationship graph 321 graphically presents relationships between Sean Connery and one or more other entities. The related articles area 322 displays indications of articles that reference Sean Connery. The trend area 323 provides an indication of how frequently Sean Connery as been mentioned over a particular time period (e.g., 30 days). In the present example, the user selects control 324 (e.g., the "Follow" link) to initiate the creation of a new collection.

Figure 3D:
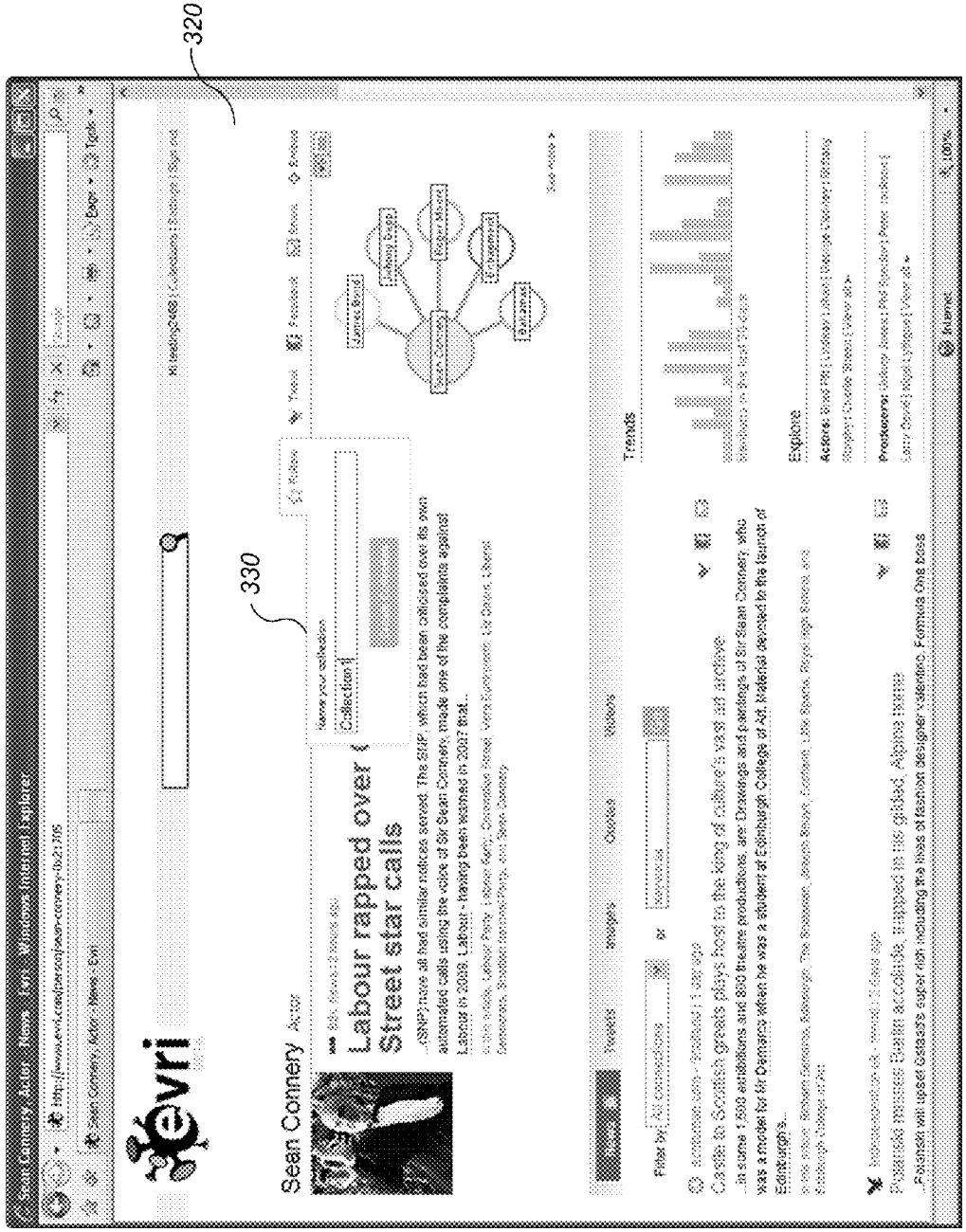

FIG. 3D depicts collection creation. In particular, FIG. 3D illustrates screen 320 with a new collection dialog 330 displayed in response to selection of the collection creation control 324. Using the new collection dialog 330, the user can name a new collection (e.g., "Collection)") that includes the entity Sean Connery.

Figure 3E:
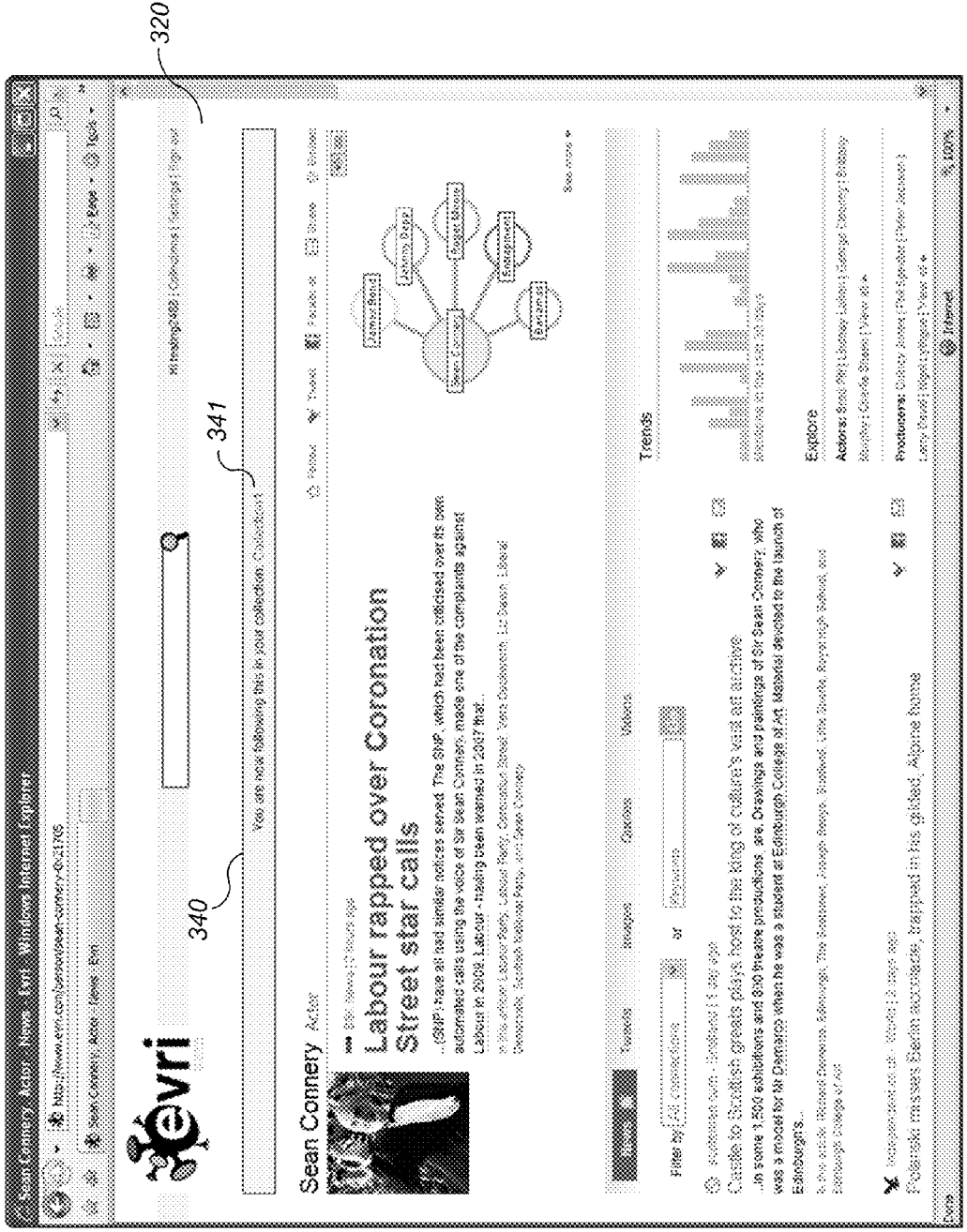

FIG. 3E illustrates a response to the creation of a new collection. In particular, FIG. 3E illustrates screen 320 with a message 340 that informs the user that the entity Sean Connery is part of a collection named Collection1. The message 340 includes a control (e.g., a link) 341 that can be selected by the user to access a collection information page. In the present example, the user selects control 341.

Figure 3F:
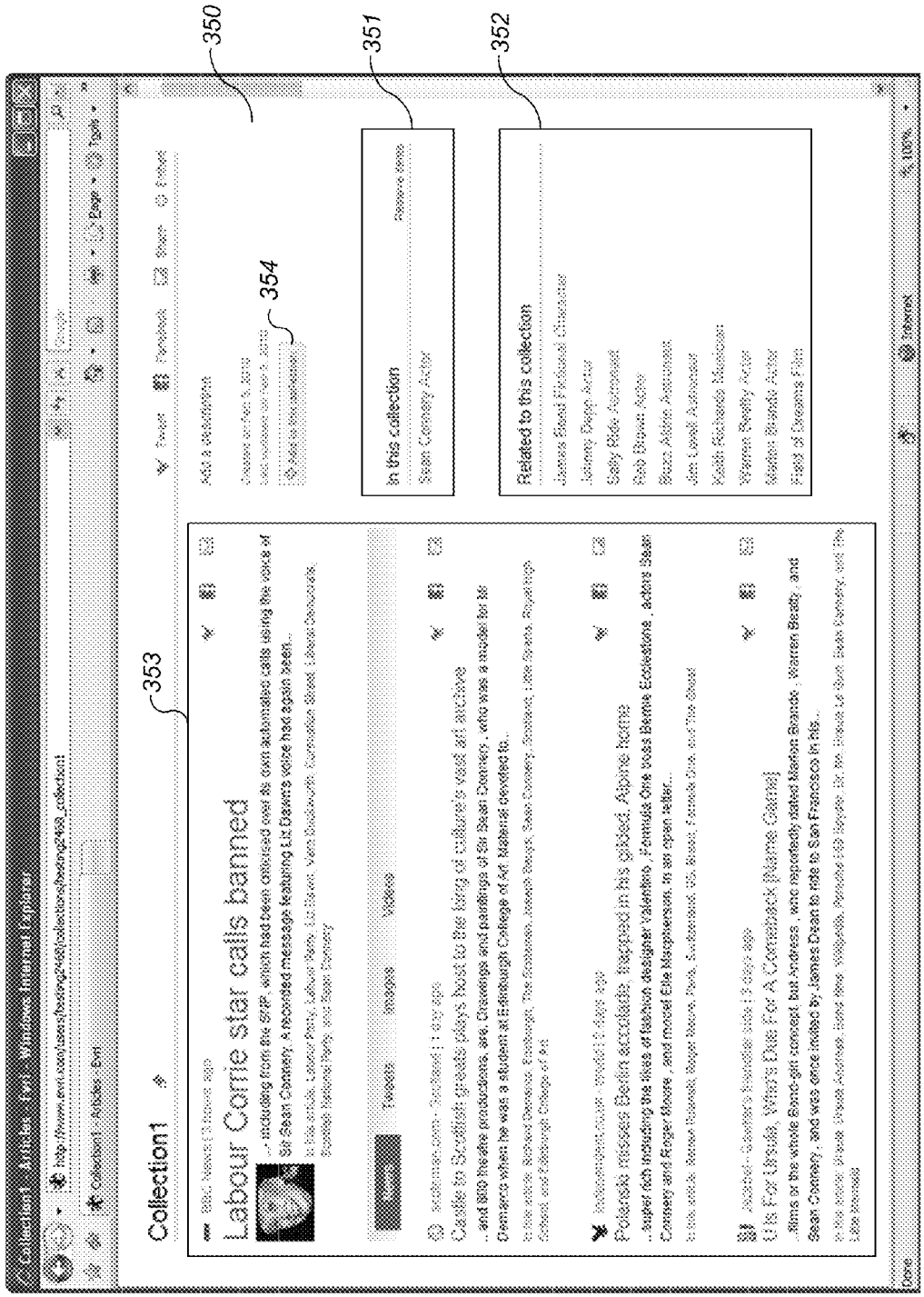

FIG. 3F illustrates a collection information page. In particular, FIG. 3F illustrates a screen 350 that is a collection information page for the collection named Collection1, created as described above. The screen 350 includes a collection membership area 351, a related entity area 352, a related articles area 353, and an add entity control 354. The collection membership area 351 displays information, such as names and facets, about the entities of the current collection. In the present example, the collection membership area 351 indicates that Collection1 includes a single entity named "Sean Connery," who is an actor (e.g., has the facet: actor). The related entity area 352 displays information (e.g., names and facets) about entities that are related to the entities of Collection1. The related articles area 352 displays information (e.g., titles, text snippets, entities referenced) about articles that are related to the entities of Collection1. The entity control area 354 can be selected by the user to add another entity to the current collection, as will be described below in FIG. 3G.

Figure 3G:
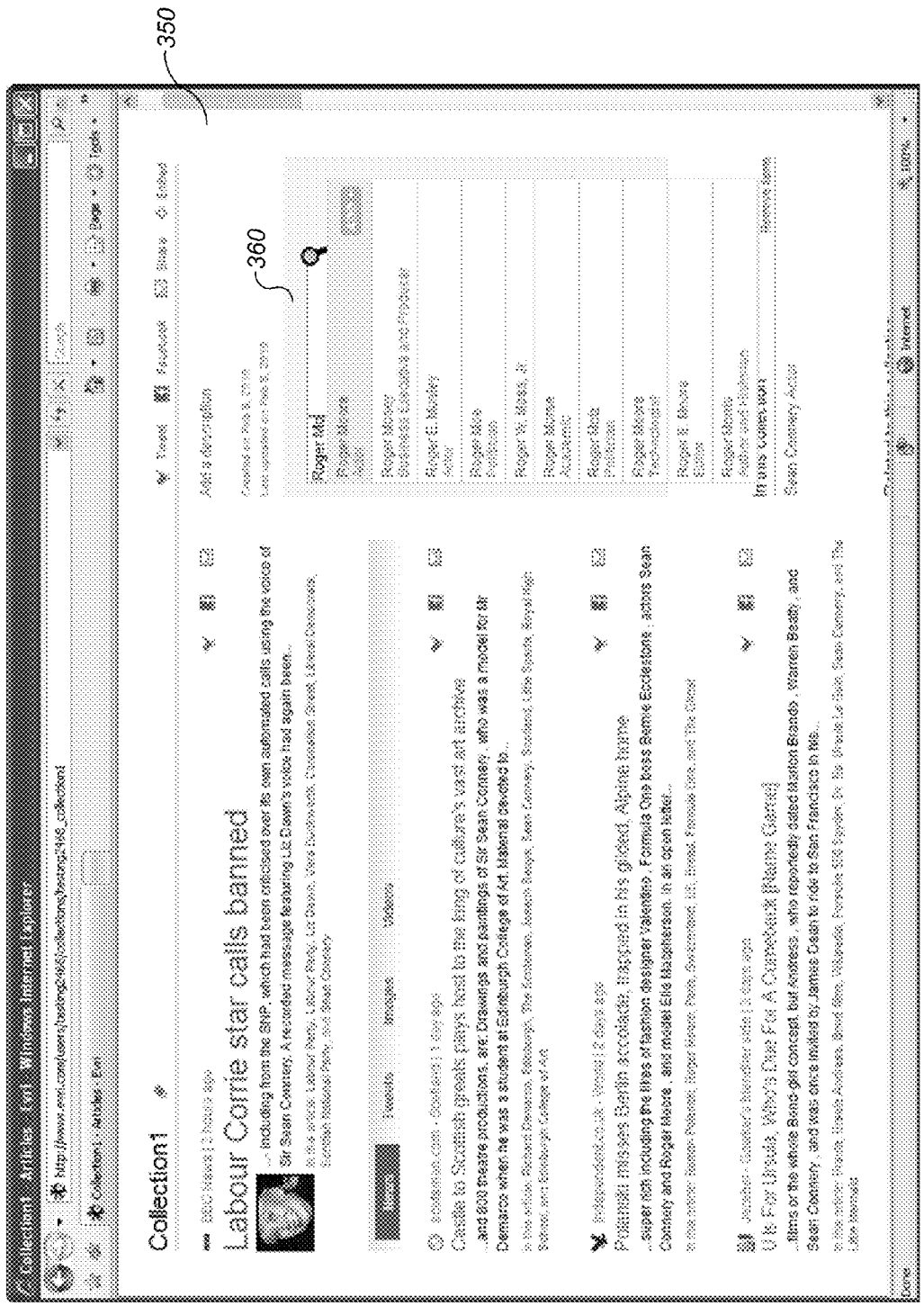

FIG. 3G illustrates the addition of an entity to an existing collection. In particular, FIG. 3G illustrates the collection information page of screen 350 during the addition of an entity to Collection1. Here, the user has selected the add entity control 354 (FIG. 3F) and in response, an entity addition dialog 360 is displayed. The entity addition dialog 360 includes a search tool with a drop down menu that is populated with entities matching a string (e.g., "Roger Mo") entered by the user. In the present example, the user selects the entity named "Roger Moore."

Figure 3H:
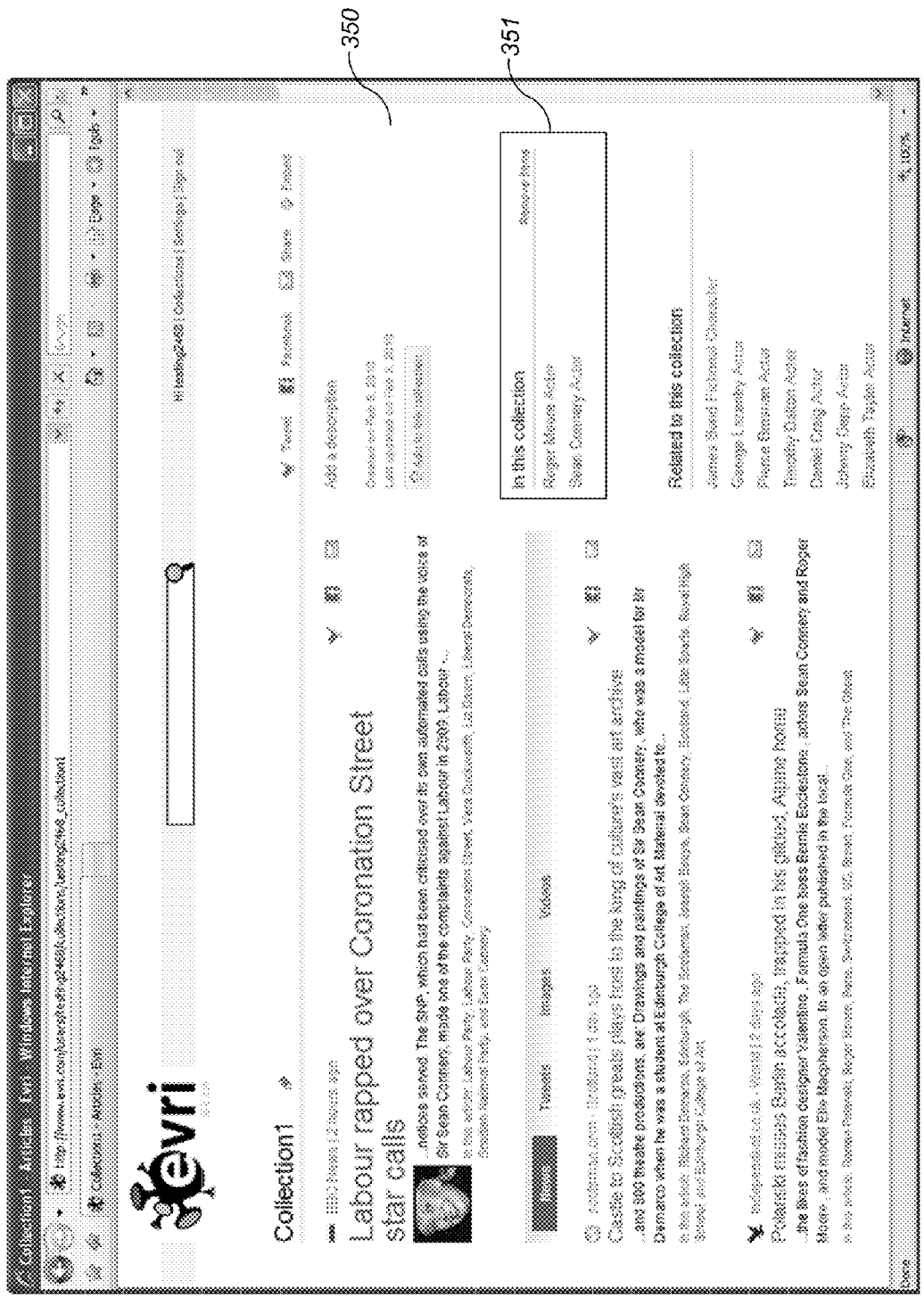

FIG. 3H shows a response to the addition of an entity to a collection. In particular FIG. 3H illustrates the screen 350 and collection information area 351 introduced in FIG. 3F. In the present example, collection information area 351 has been modified to include the entity named "Roger Moore," reflecting the addition to Collection1 performed as described with reference to FIG. 3G.

Figure 3I:
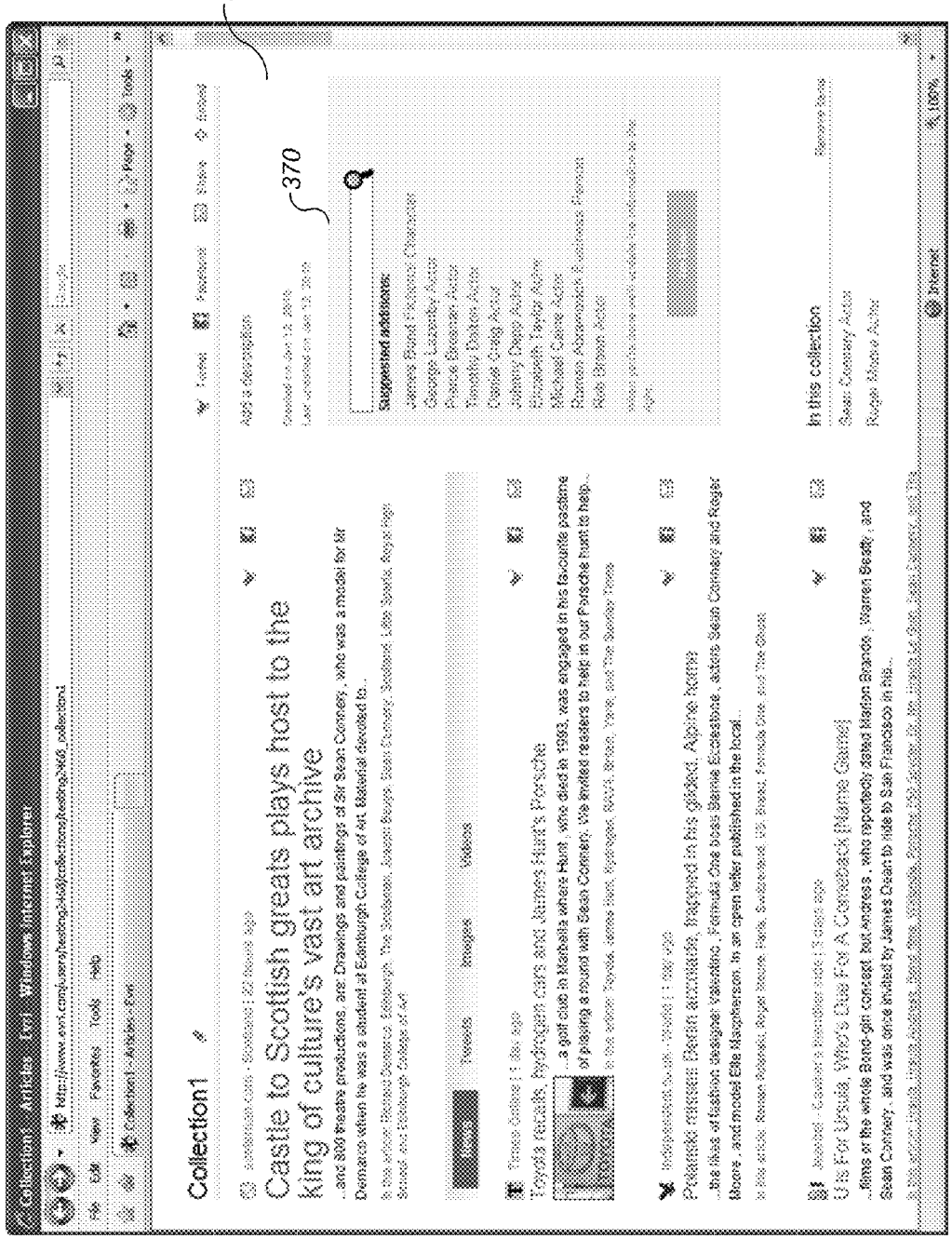

FIG. 3I shows an alternative mechanism for adding an entity to a collection. In particular, FIG. 3I illustrates an entity addition dialog 370 that is configured to present multiple entities that are related to the entities of Collection1. The related multiple entities are presented as suggested additions that can be selected by the user without the need to type the name of a particular entity. Such a user interface control can be provided in addition to, or instead of, the entity addition dialog 360 described with reference to FIG. 3G.

FIGS. 4A-4D illustrate additional example screen displays provided by an example embodiment of a content recommendation system. More specifically, FIGS. 4A-4D depict various additional or alternative Web-based user interface techniques for creating, utilizing, and managing collections.

Figure 4A:
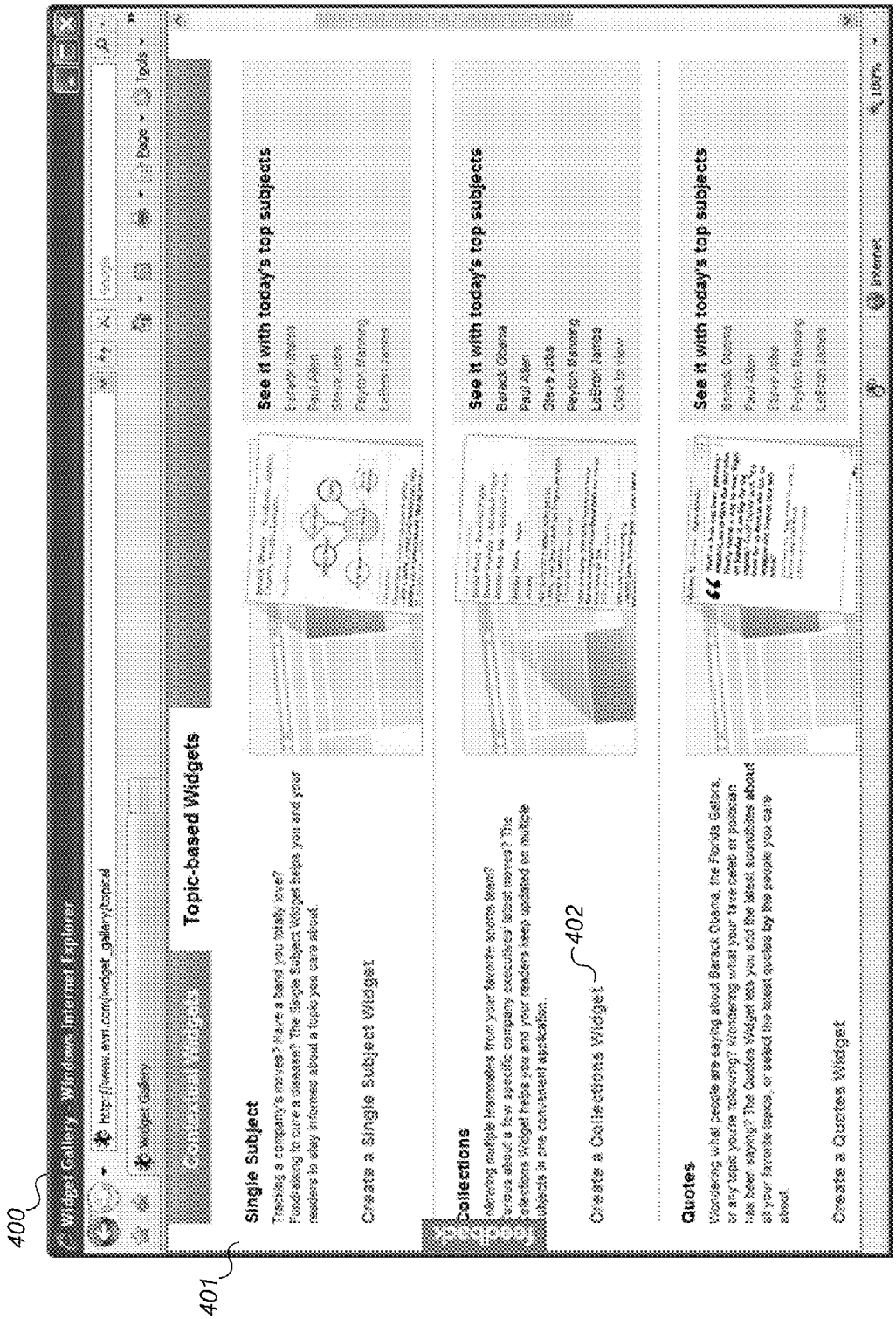
FIGS. 4A-4D illustrate additional example screen displays provided by an example embodiment of a content recommendation system.

FIG. 4A shows a widget gallery provided by a content recommendation system. In particular, FIG. 4A illustrates a Web browser 400 displaying a screen 401 provided to a user by a content recommendation system. The screen 401 is a widget gallery provided by the content recommendation system. Screen 401 includes a control (e.g., a link) 402 that can be selected by a user to create a collections widget. A collections widget is a code module that can be included in an application (e.g., a $3^{rd}$ party application) and that is configured to provide content recommendations based on an associated collection.

Figure 4B:
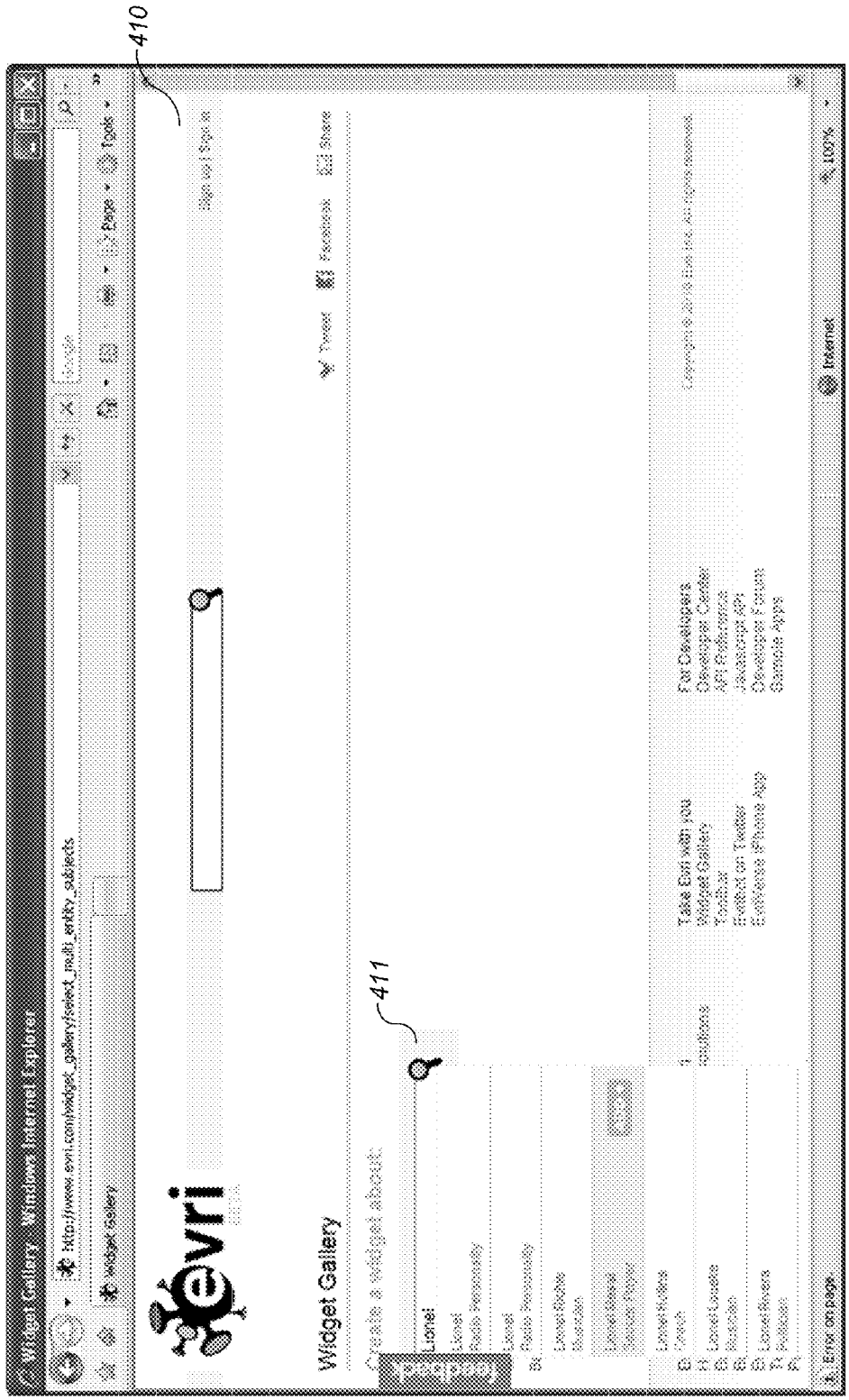

FIG. 4B illustrates the creation of a collections widget. In particular, FIG. 4B illustrates a screen 410 displayed in response to a user selection of control 402. The screen 410 includes a collections widget creation tool 411 that includes a search tool and drop down menu that can be selected by the user to specify one or more entities as members of a new collection. In the present example, the user is creating a collections widget about soccer players, including Lionel Messi and Diego Maradona.

Figure 4C:
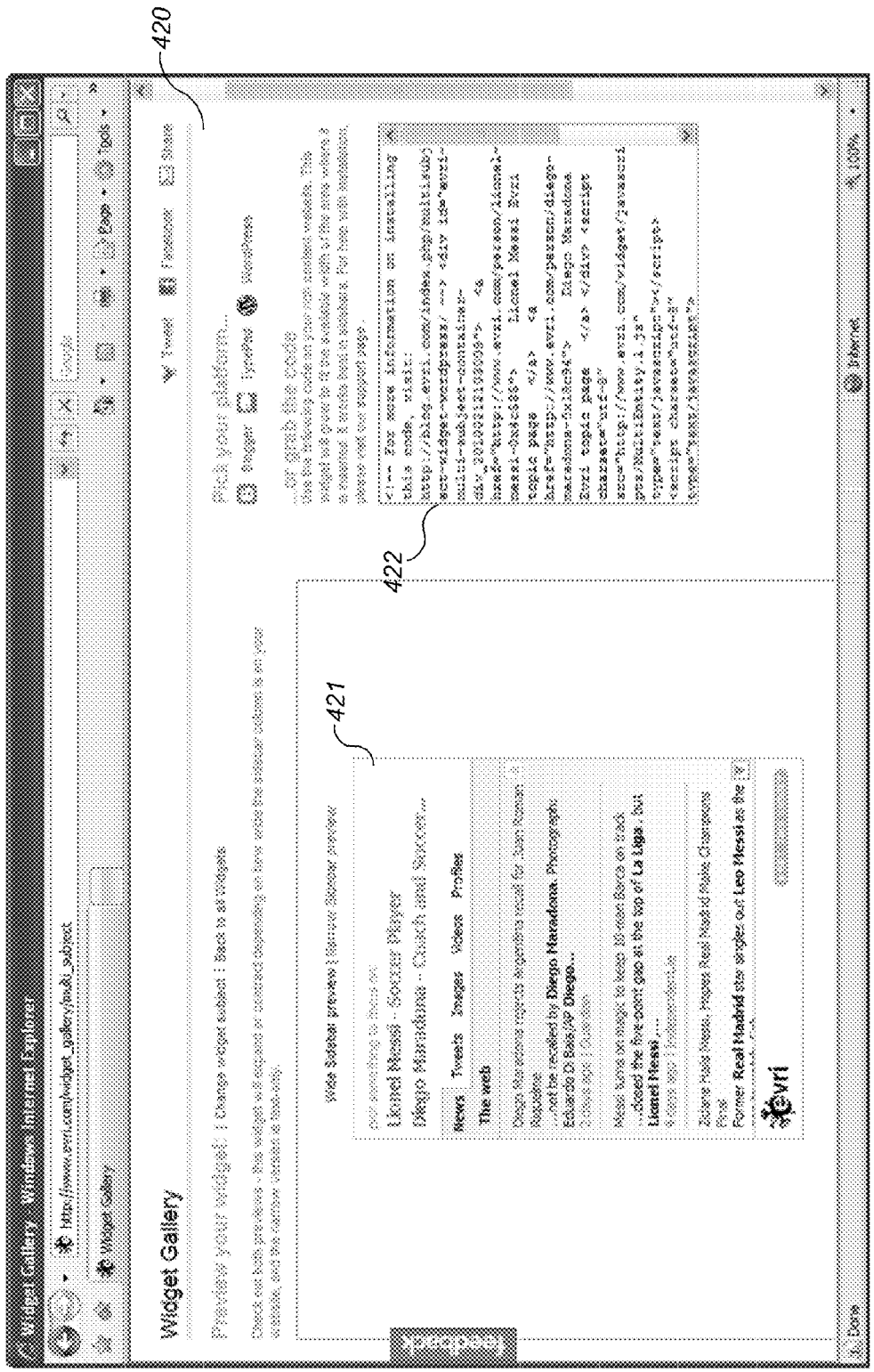

FIG. 4C shows a collections widget preview. In particular, FIG. 4C illustrates a screen 420 that is a collections widget preview page displayed in response to the creation of a collections widget as described with reference to FIG. 4B. The screen 420 includes a widget preview area 421 and a widget code area 422. The preview area 421 displays a preview of the created widget, as it would appear if it were embedded in a third-party application, such as a Web page, blog, or the like. The code area 422 provides instructions (e.g., JavaScript code) that can be copied by a user into some other application. The provided instructions are configured, when executed, to display the collections widget previewed in the preview area 421.

Figure 4D:
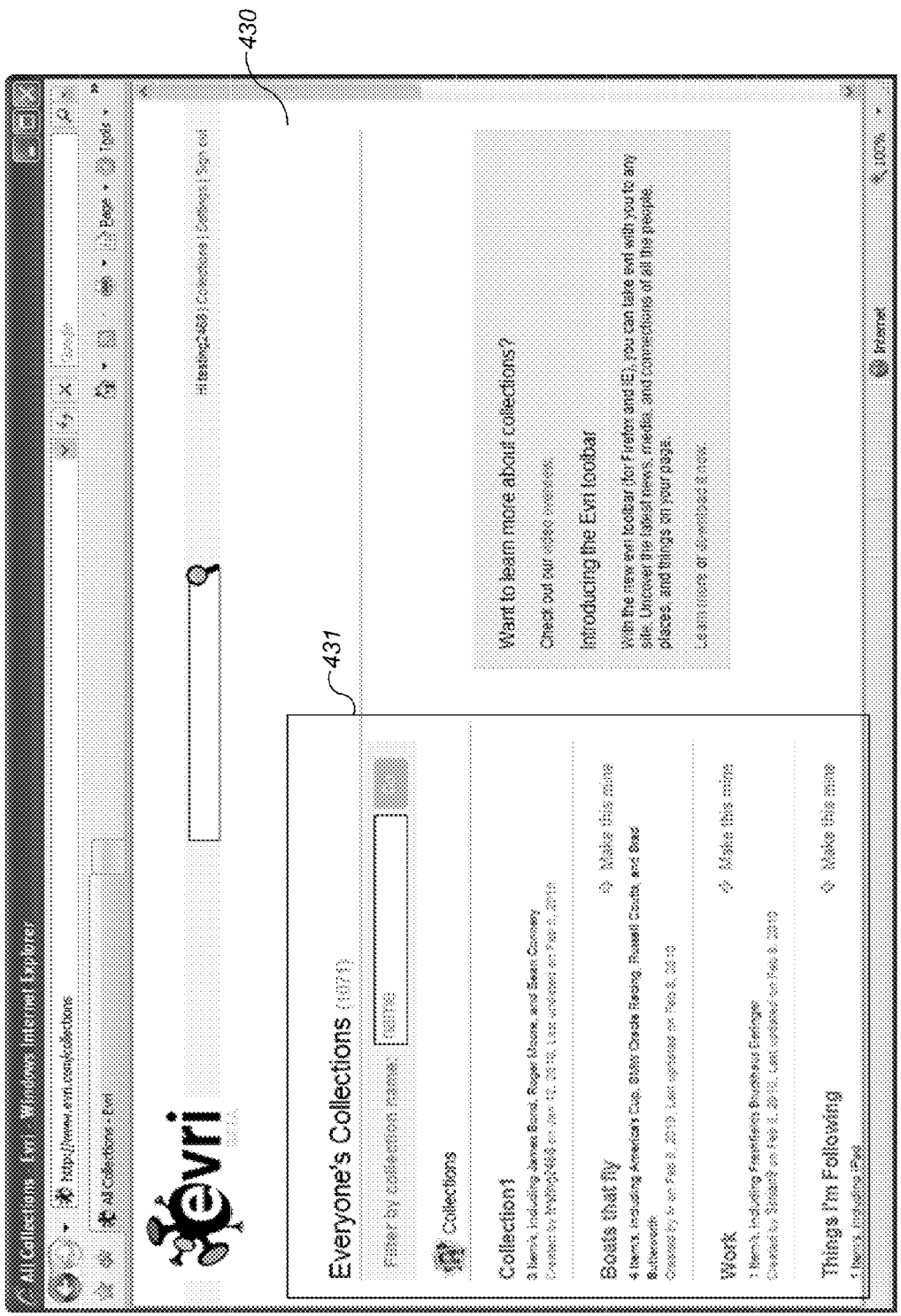

FIG. 4D shows a collections gallery. In particular, FIG. 4D illustrates a screen 430 that includes a collections gallery 431 that displays information about collections created by various users of the content recommendation system. In this manner, users of the content recommendation system can share their own collections and/or learn about collections created by other users. In the illustrated embodiment, a collection created by a user is by default public and thus accessible by all other users of the content recommendation system. Other embodiments provide various types of access control. In one embodiment, a user can indicate or define specific users and/or groups of users that can access some or all of the user's collections. In addition, a user can specify default access control policies that are to be applied to their collections, such as private, public, group accessible, and the like.

Although the user interface techniques of FIGS. 3A-3I and 4A-4D have been described primarily with reference to Web-based technologies, the described techniques are equally applicable in other contexts. For example, a collections widget may be implemented as one or more code objects (e.g., a Java object) that can be embedded within a client-side desktop or mobile application, and configured to interact with the content recommendation system to obtain and display content recommendations based on an associated collection.

Figure 5:
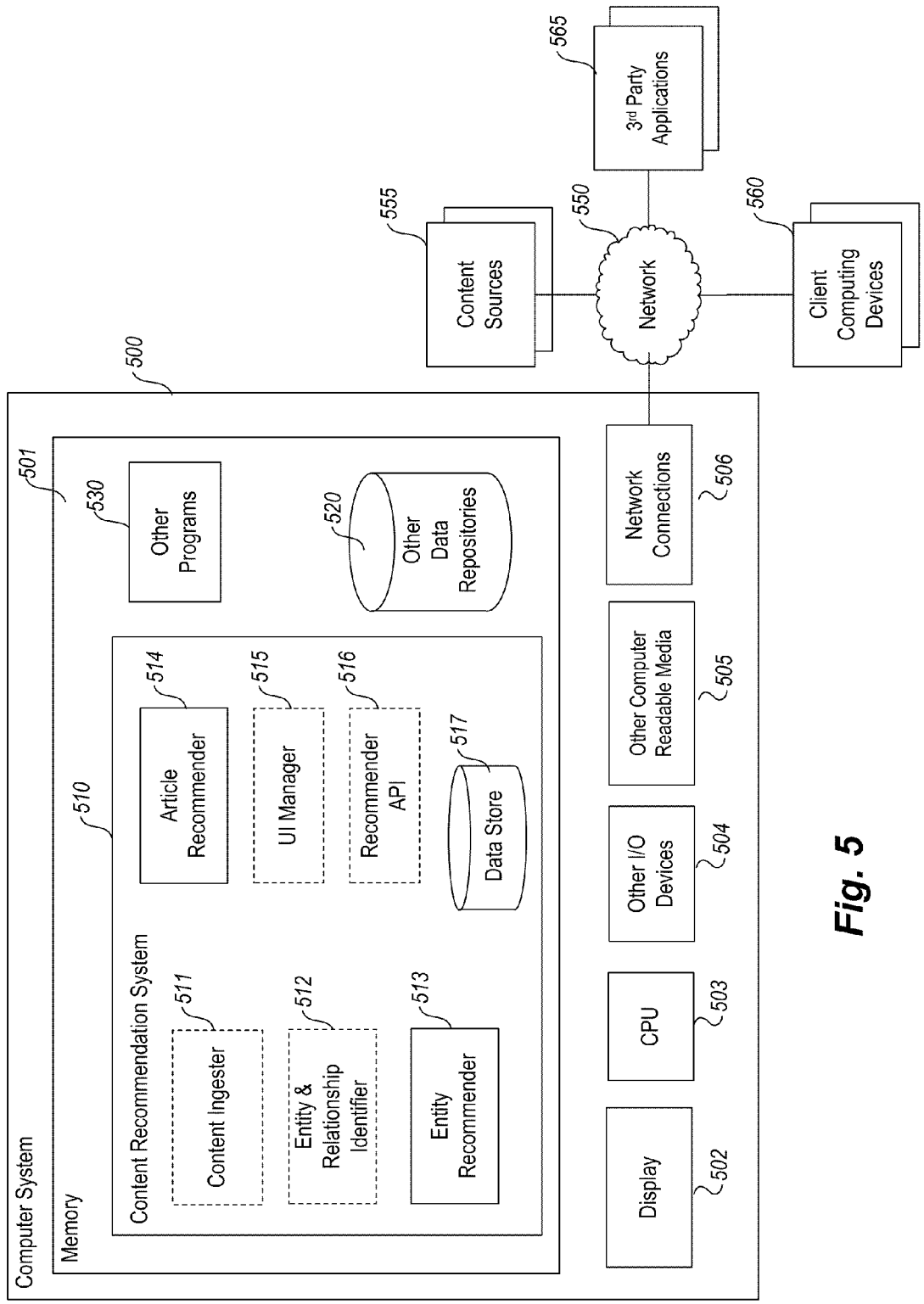
FIG. 5 is an example block diagram of an example computing system for implementing a content recommendation system according to an example embodiment.

FIG. 5 is an example block diagram of an example computing system for implementing a content recommendation system according to an example embodiment. In particular, FIG. 5 shows a computing system 500 that may be utilized to implement a content recommendation system 510.

Note that one or more general purpose or special purpose computing systems/devices may be used to implement the content recommendation system 510. In addition, the computing system 500 may comprise one or more distinct computing systems/devices and may span distributed locations. Furthermore, each block shown may represent one or more such blocks as appropriate to a specific embodiment or may be combined with other blocks. Also, the content recommendation system 510 may be implemented in software, hardware, firmware, or in some combination to achieve the capabilities described herein.

In the embodiment shown, computing system 500 comprises a computer memory ("memory") 501, a display 502, one or more Central Processing Units ("CPU") 504, Input/Output devices 504 (e.g., keyboard, mouse, CRT or LCD display, and the like), other computer-readable media 505, and network connections 506. The content recommendation system 510 is shown residing in memory 501. In other embodiments, some portion of the contents, some or all of the components of the content recommendation system 510 may be stored on and/or transmitted over the other computer-readable media 505. The components of the content recommendation system 510 preferably execute on one or more CPUs 503 and recommend content based on entity collections, as described herein. Other code or programs 530 (e.g., an administrative interface, a Web server, and the like) and potentially other data repositories, such as data repository 520, also reside in the memory 501, and preferably execute on one or more CPUs 503. Of note, one or more of the components in FIG. 5 may not be present in any specific implementation. For example, some embodiments may not provide other computer readable media 505 or a display 502.

In a typical embodiment, the content recommendation system 510 includes a content ingester 511, an entity and relationship identifier 512, an entity recommender 513, an article recommender 514, a user interface manager 515, a recommender application program interface ("API") 516, and a data store 517. The content ingester 511, entity and relationship identifier 512, user interface manager 515, and recommender API 516 are drawn in dashed lines to emphasize that in other embodiments, functions performed by one or more of these components may be performed externally to the content recommendation system 510.

The content ingester 511 performs functions such as those described with reference to the content ingester 211 of FIG. 2. The ingester 511 obtains content items, such as Web pages, Blog postings, videos, audio files, and the like from various content sources 555 via network 550, and stores information about the obtained content items in the data store 517, for use by other components, such as the entity and relationship identifier 512, the entity recommender 513, and/or the article recommender 514.

The entity and relationship identifier 512 performs functions such as those described with reference to the entity and relationship identifier 212 of FIG. 2. The identifier 512 processes the information about content items stored in the data store 517 in order to identify entities and relationships between them. Identified entities and relationships are stored in the data store 517, for use by other components, such as the recommenders 513 and 514.

The UI manager 515 provides a view and a controller that facilitate user interaction with the content recommendation system 510 and its various components. For example, the UI manager 515 may provide interactive access to the content recommendation system 510, such that users can create collections, manage/edit collections, share collections, obtain recommendations based on collections, and the like. In some embodiments, access to the functionality of the UI manager 515 may be provided via a Web server, possibly executing as one of the other programs 530. In such embodiments, a user operating a Web browser executing on one of the client devices 560 can interact with the content recommendation system 510 via the UI manager 515.

The entity recommender 513 and article recommender 514 perform functions such as those described with reference to the entity recommender 213 and article recommender 214, respectively, of FIG. 2. The recommenders 513 and 514 receive, possibly via the UI manager 515, an indication of a collection (e.g., stored in the data store 517). In response, the recommenders 513 and 514 respectively determine one or more content items (e.g., entities and/or articles) that are related to entities of the indicated collection. The determined content items can be cached (e.g., stored in the data store 517) for later use and/or provided directly in response to a received request, such as may be generated by the UI manager 515.

In one embodiment, the recommenders 513 and 514 operate synchronously in an on-demand manner, in that they perform their functions in response to a received request, such as in response to a user interface event processed by the UI manager 515. In another embodiment, the recommenders 513 and 514 operate asynchronously, in that they automatically determine related content items for one or more collections. For example, the recommenders 513 and 515 may automatically execute from time to time (e.g., once per hour, once per day) in order to generate bulk content recommendations for some or all collections stored in the data store 517. The recommenders 513 and 514 may execute upon the occurrence of other types of conditions, such as when a new collection is created, when new content items are indexed, and the like.

The API 516 provides programmatic access to one or more functions of the content recommendation system 510. For example, the API 516 may provide a programmatic interface to one or more functions of the content recommendation system 510 that may be invoked by one of the other programs 530 or some other module. In this manner, the API 516 facilitates the development of third-party software, such as user interfaces, plug-ins, news feeds, adapters (e.g., for integrating functions of the content recommendation system 510 into Web applications), and the like. In addition, the API 516 may be in at least some embodiments invoked or otherwise accessed via remote entities, such as one of the third-party applications 565, to access various functions of the content recommendation system 510. For example, a third-party application may create a collection and/or receive recommendations based on a collection from the content recommendation system 510 via the API 516. The API 516 may also be configured to provide collections widgets (e.g., code modules) that can be integrated into third-party applications and that are configured to interact with the content recommendation system 510 to make at least some of the described functionality available within the context of other applications.

The data store 517 is used by the other modules of the content recommendation system 510 to store and/or communicate information. As discussed above, components 511-516 use the data store 517 to record various types of information, including content, information about stored content including entities and relationships, information about collections, user information, and the like. Although the components 511-516 are described as communicating primarily through the data store 517, other communication mechanisms are contemplated, including message passing, function calls, pipes, sockets, shared memory, and the like.

The content recommendation system 510 interacts via the network 550 with content sources 555, third-party applications 565, and client computing devices 560. The network 550 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The client computing devices 560 include desktop computing systems, notebook computers, mobile phones, smart phones, personal digital assistants, tablet computers, and the like.

Other or additional functions and/or data are contemplated. For example, in some embodiments, the content recommendation system 510 includes additional content recommendation components that are specialized to other types of content, such as for video, quotations, images, audio, advertisements, product information, and the like.

In an example embodiment, components/modules of the content recommendation system 510 are implemented using standard programming techniques. For example, the content recommendation system 510 may be implemented as a "native" executable running on the CPU 503, along with one or more static or dynamic libraries. In other embodiments, the content recommendation system 510 may be implemented as instructions processed by a virtual machine that executes as one of the other programs 530. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the content recommendation system 510, such as in the data store 517, can be available by standard mechanisms such as through C, C++, C#, and Java APIs; libraries for accessing files, databases, or other data repositories; through scripting languages such as XML; or through Web servers, FTP servers, or other types of servers providing access to stored data. The data store 517 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the content recommendation system 510 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Some or all of the system components and data structures may also be stored in one or more non-transitory computer-readable storage mediums. Such computer program products may also take other forms in other embodiments. Accordingly, embodiments of this disclosure may be practiced with other computer system configurations.

Figure 6:
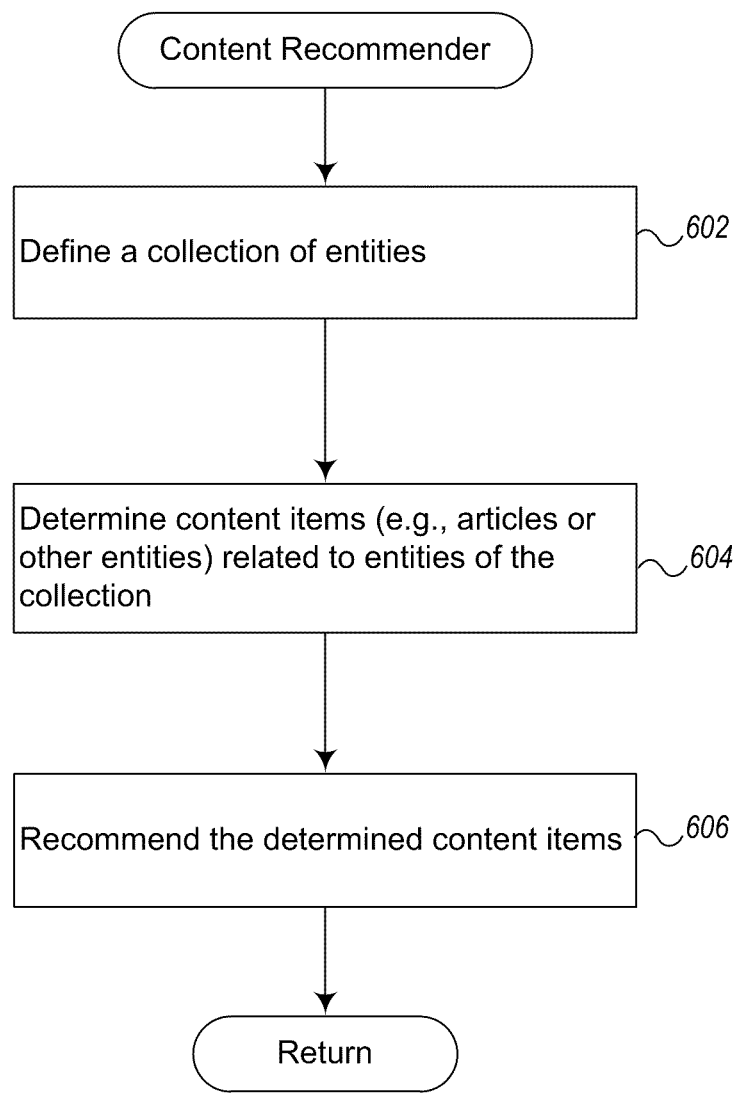
FIG. 6 is an example flow diagram of a content recommendation process performed by an example content recommendation system according to an example embodiment.

FIG. 6 is an example flow diagram of a content recommendation process performed by an example content recommendation system according to an example embodiment. In particular, FIG. 6 illustrates a process that may be implemented by, for example, one or more elements of the content recommendation system 200, such as the entity recommender 213 and/or the article recommender 214, as described with reference to FIG. 2. The process recommends content items based on entities of a collection.

The illustrated process begins at block 602, where it defines a collection of entities. Defining a collection of entities may include receiving indications of one or more entities, such as may be provided by an interactive user interface operated by a user. An indication of an entity may be or include a unique identifier of an entity. In other cases, the indication of the entity may be ambiguous, in that it may refer to more than one entity. In still other cases, a class or group of entities may be specified by a facet. For example, the facet "Actor" could be used to indicate all entities that are known to be actors. In other cases, one or more keyterms that include one or more words or phrases may be used to indicate one or more entities. For example, the keyterms "soccer player" may be used to indicate all entities that have or are associated with textual descriptions that match, or approximately match, the keyterms "soccer player." Defining a collection may further include storing received entity indications in a data structure or other data arrangement, such as a file, database, or the like.

At block 604, the process determines content items, such as articles or entities, related to entities of the collection. In one embodiment, determining related content items includes locating content items that cover, include, or otherwise reference one or more entities of the collection. For example, determining related articles may include locating articles that each reference at least one of the entities of the collection. In another embodiment, determining related content items includes determining content items that are in a relationship with one or more of the entities of the collection. For example, determining related entities may include determining one or more entities that are each in a relationship with at least one of the entities of the collection. In a further embodiment, determining related content items includes locating content items that have characteristics that match, or are in some way similar to, characteristics of one or more entities of the collection. For example, determining related entities may include determining entities that share at least one facet with at least one of the entities of the collection. Determining related content items may also include ordering and/or ranking the content items based on various factors, such as relevance, credibility, recency, and the like. Determining related articles and entities are discussed further with respect to FIGS. 7 and 8, respectively.

At block 606, the process recommends the determined content items. Recommending the determined content items may include providing (e.g., displaying, presenting, transmitting, storing, forwarding) indications of the content items, such as via a user interface screen, as described above with reference to FIGS. 1 and 3A-3I. In some embodiments, indications of the determined content items may be provided indirectly, such as via a user interface widget or other component that is incorporated into a third-party application. In other embodiments, recommending the determined content items includes storing the content items (or indications thereof) in a data store for later consumption or use by another component.

Some embodiments perform one or more operations/aspects in addition to, or instead of, the ones described with reference to the process of FIG. 6. For example, in one embodiment, the process also provides user interface widgets configured to provide content recommendations in the context of a third-party application, such as those described with reference to FIGS. 4A-4D.

Figure 7:
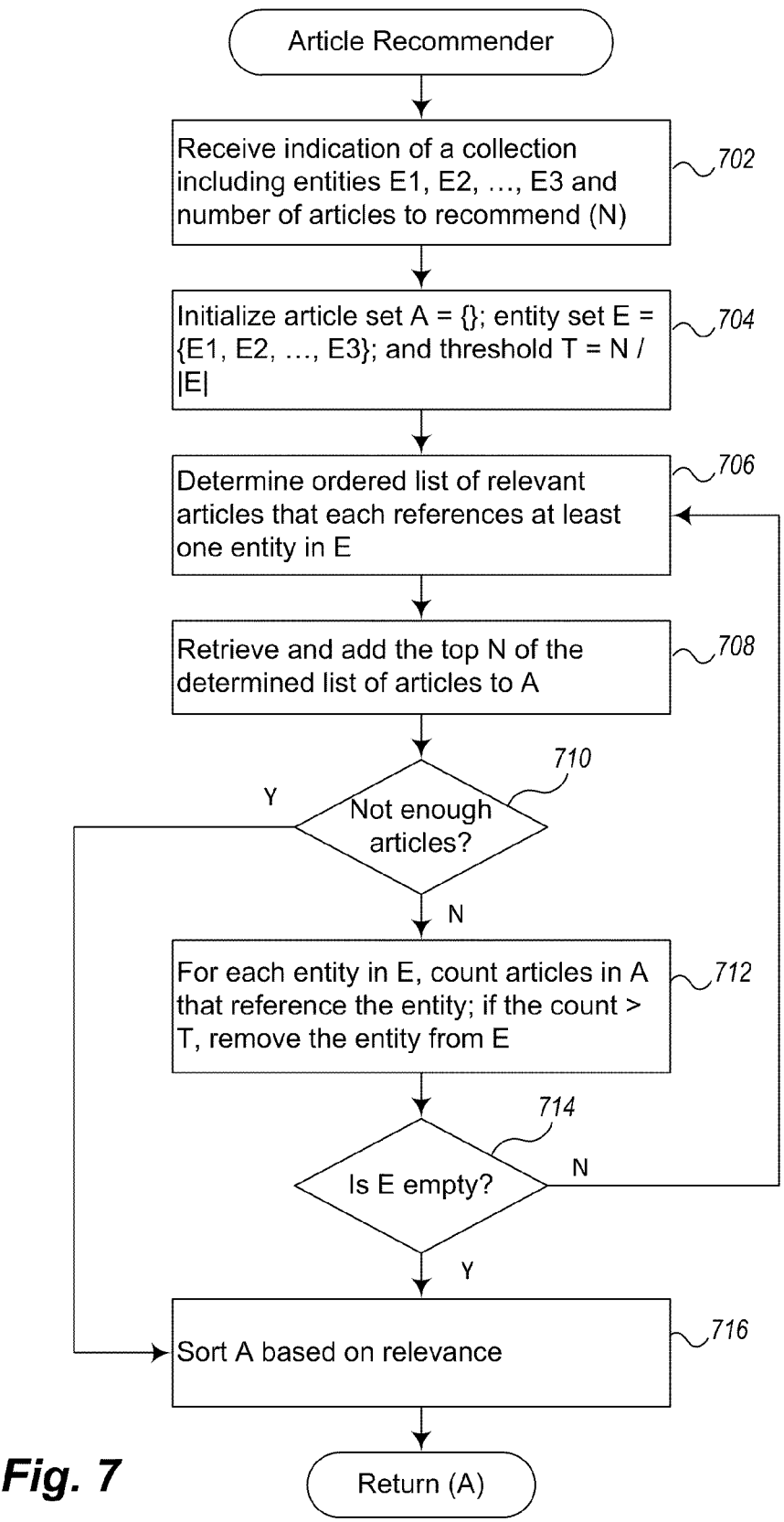
FIG. 7 is an example flow diagram of an article recommendation process performed by an example content recommendation system according to an example embodiment.

FIG. 7 is an example flow diagram of an article recommendation process performed by an example content recommendation system according to an example embodiment. In particular, FIG. 7 illustrates a process that may be implemented by, for example, one or more elements of the content recommendation system 200, such as the article recommender 214, as described with reference to FIG. 2. The process recommends articles based on entities of a collection.

The illustrated process begins at block 702, where it receives an indication of a collection including entities E1, E2, . . . , E3 and number of articles to recommend (N).

At block 704, the process initializes an article set A to be the empty set (A={ }). The process also initializes an entity set E to include all of the entities of the collection (E={E1, E2, . . . , E3}). The process further initializes a threshold T=N/|E|, or in other words initializes T to be the quotient of the number of articles to recommend (N) over the cardinality of the set E (|E|). The process attempts to find, for each entity, at least T articles that reference that entity.

In blocks 706-714, the process performs a loop in which it retrieves articles that are related to one or more of the entities in the set E, and removes entities from E when sufficient articles covering the removed entities have been retrieved, until E is empty, or some other stopping condition occurs.

At block 706, the process determines an ordered list of relevant articles that each reference at least one entity in E. To determine the ordered list of articles, the process performs a query that is a Boolean OR of all of the entities in the set E. For example, if the set E includes entities E1, E2, and E3, the resulting query would be id(E1) OR id(E2) OR id(E3), where the operator id(X) returns a unique identifier for an entity X. If any of the elements of the set E refer to two or more entities (e.g., are ambiguous), facets, or keyterms, the resulting query will incorporate such elements, such as by including the keyterms, facets, or other disambiguating information, as discussed further with respect to FIG. 9, below.

The determined list of articles is ordered based on an information retrieval weighting that is based at least in part on one or more of a credibility score, a recency score, a term frequency, total number of terms in the article, length of the article, and presence of terms in the title of the article. An example process for scoring an article for purposes of ordering the list of articles is described with reference to FIG. 10, below.

At block 708, the process retrieves and adds the top N articles of the determined list of articles to the resultant set A. In some embodiments, determining the list of articles (as in block 706) is computationally less expensive than actually retrieving the articles. For example, determining the list of articles may be performed by one or more database queries that operate against indexed article information, and thus may execute relatively quickly as compared to the cost of actually retrieving article content, which is typically stored external to the database and thus may have a correspondingly larger access and retrieval time. Thus, as illustrated here, the process only retrieves the top N articles indicated in the ordered list of articles, and adds them to the set A, thus adding the N most relevant articles (with respect to the query of block 706) to the set A. In one example embodiment, N is 10. Other example embodiments may incorporate a different number of desired articles.

At block 710, the process determines whether there are not enough articles (the number of articles in the determined list of articles is less than N), and if so, continues at block 716, otherwise at block 712. With this check, the process performs an early exit from the loop of blocks 706-714 in cases when the total number of articles determined in block 706 is less than or equal to the number of articles to recommend (N). It is appropriate to exit the loop of blocks 706-714 in this case because performing additional queries will not result in additional articles being returned. For example, if 10 articles have been requested (N=10) and the query of block 706 only returned four articles, the process would exit, because a subsequent query would not result in any articles other than those four articles being returned.

At block 712, the process, for each entity in the set E, counts the number of articles in the set A that reference the entity. If the count is greater than the threshold T, the process removes the entity from set E. In other words, when an entity has been sufficiently covered by articles in the resultant set A, the entity will be removed from the set E, thereby reducing the size of the set E and moving the process one step closer to its stopping condition of an empty set E. Removing entities from set E will cause the performance of a different query on subsequent iterations of the loop of blocks 706-714, typically resulting in the determination of a list of articles that is different from previous query results in membership and/or order (due to the information retrieval weighting being different due to a different query).

At block 714, the process determines whether the set E is empty, and if so, continues at block 716, otherwise continues the loop of blocks 706-714. When the set of entities (E) is empty, then a sufficient number of articles covering each of the entities of the collection have been retrieved, and the loop terminates. In some embodiments, an additional stopping condition is included to limit the maximum number of iterations of the loop of blocks 706-714. For example, the test at block 714 may instead be to determine whether the set E is empty or whether the loop of blocks 706-714 has iterated a maximum number of times (e.g., four times). Such a test bounds the running time of the process in cases of large collections (e.g., where the set E has many elements).

At block 716, the process sorts the resultant article set A based on article relevance. Article relevance may be based on various factors, including article recency (e.g., publishing date of each article) and entity coverage (e.g., the number of entities of the collection referenced in each article).

After block 716, the process returns an indication of the ordered set of articles A. Returning the set A may include returning a data structure (e.g., an XML record) that includes references to each of the articles in set A. In other embodiments, the details of the set A are stored in a database record (or other persistent data store), and an identifier for the database record is returned.

Some embodiments perform one or more operations/aspects in addition to, or instead of, the ones described with reference to the process of FIG. 7. For example, although the process is described iteratively here, in other embodiments, the process is implemented recursively. Also, instead of consecutively performing separate, different queries, other embodiments may perform multiple different queries in parallel. In addition, other embodiments may perform queries that differ from those discussed above, including queries that connect one or more of the entities using different operators (e.g., logical AND, NOT, etc.). Techniques for article recommendation used in a specific example embodiment are described further below.

Figure 8:
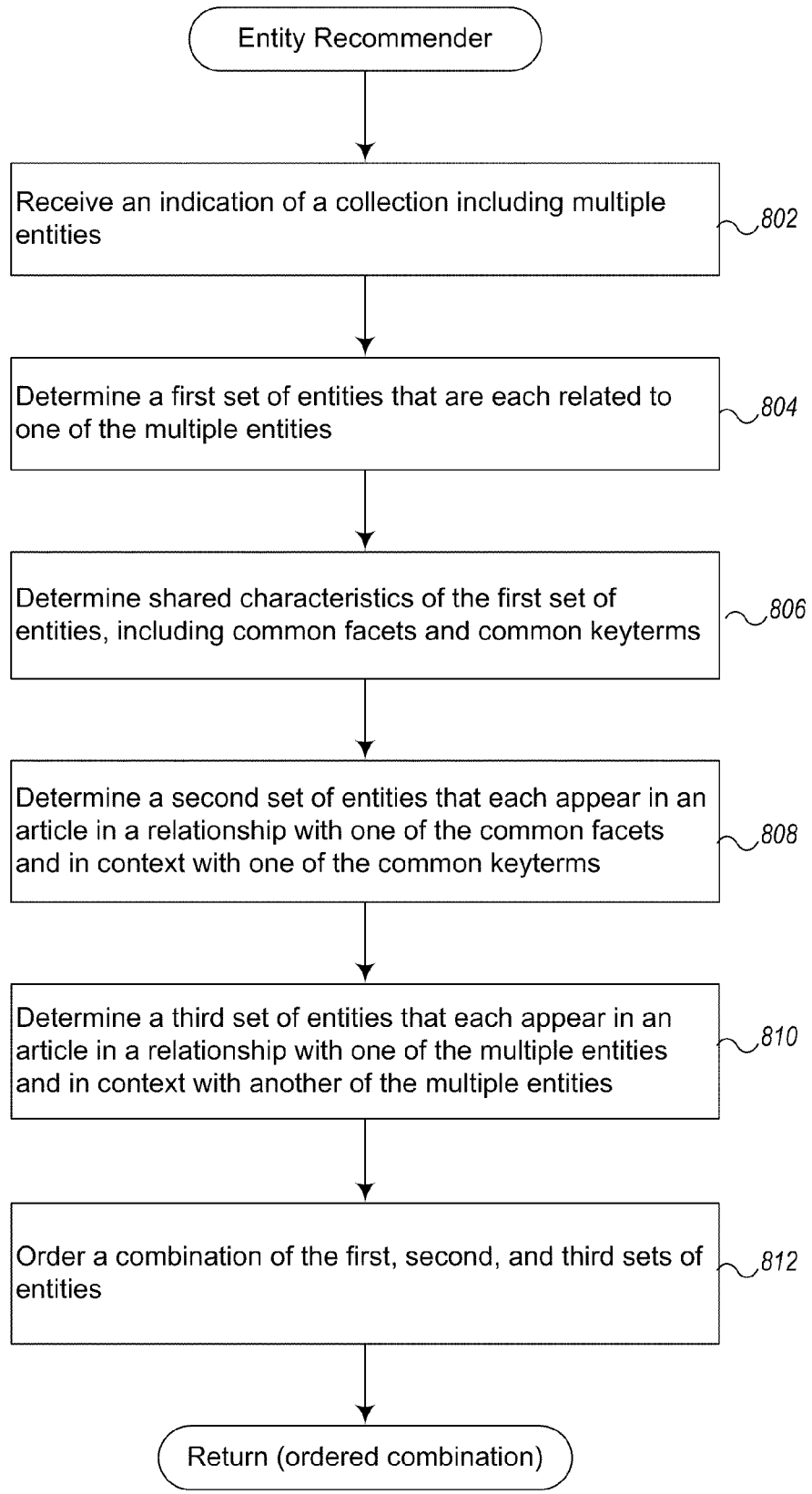
FIG. 8 is an example flow diagram of an entity recommendation process performed by an example content recommendation system according to an example embodiment.

FIG. 8 is an example flow diagram of an entity recommendation process performed by an example content recommendation system according to an example embodiment. In particular, FIG. 8 illustrates a process that may be implemented by, for example, one or more elements of the content recommendation system 200, such as the entity recommender 213, as described with reference to FIG. 2. The process recommends entities based on entities of a collection.

The illustrated process begins at block 802, where it receives an indication of a collection including multiple entities.

At block 804, the process determines a first set of entities that are each related to one of the multiple entities. Determining the first set of entities includes searching for entities that appear in relationships expressed in content items such as articles. As discussed above, the content recommendation system may include an entity and relationship data store that represents relationships between entities. This data store can be searched for all entities that are related to at least one of the entities of the collection. In one embodiment, the process initiates multiple queries, where each query is directed to finding entities related to one of the entities of the collection. More specifically, each query asks for the set of entities that are one of the subject or object of a subject-verb-object relation in which the one entity of the collection appears as the other of the subject or object. Typically, the process executes the multiple queries in parallel, in order to efficiently locate a broad set of entities related to the entities of the collection. For example, given a collection including Sean Connery and Roger Moore, the process would issue two queries: a first one requesting entities in relationships with Sean Connery and a second one requesting entities in relationships with Roger Moore. Examples of these queries and corresponding example search results using an example embodiment are described with reference to FIGS. 11A and 11B, below.

At block 806, the process determines shared characteristics of the first set of entities, including common facets and common keyterms. Determining the shared characteristics of the first set of entities includes iterating over the relationships returned by the multiple queries performed at block 804, and counting the related entities (not the collection entities) occurring in the relationships, facets assigned to the each of the entities of the relationships, and keyterms occurring in the relationships. For example, given a collection that includes Roger Moore and Sean Connery, particular entities may commonly appear in relationships with those entities, such as James Bond. Also, facets that could be common to the example collection include actor and knight.

Determining the shared characteristics (e.g., facets) may also include ranking the shared characteristics. For example, facets may be ranked by frequency counts, such that more commonly appearing facets occur prior to less commonly appearing facets. At the end of block 806, the process has determined a ranked list of the main facets shared by the entities in the collection. For example, given a collection including Roger Moore and Sean Connery, shared facets could include actor and knight.

In addition, keyterms may be ranked based on measures of document frequency, such as based on the product of term document frequency and inverse document frequency, where term document frequency is the number of times a term appears in a given document, and inverse document frequency is the logarithm of the quotient of the total number of documents and the number of documents containing the term. In this manner, the keyterms that are most relevant and specific to the given collection can be identified. For example, given a collection including Roger Moore and Sean Connery, example keyterms could include "007" and "bond actor."

At block 808, the process determines a second set of entities that each appear in an article in a relationship with one of the shared/common facets identified in block 806 and in context with one of the common keyterms identified in block 806. This block results in finding other entities that are potentially similar to the first set, through their common facets and/or keywords. Determining the second set of entities includes performing a query that searches for entities that are in a relationship with an entity having at least one of the common facets (e.g., find entities that are in a relationship with an actor), the relationship appearing in an article in context with at least one of the keyterms (e.g., the keyterm "007"), where the common facets and keyterms are those identified at block 806, above. One entity appears in context with another entity or keyterm if it appears in an article within a predefined window of text (e.g., 50 characters, three sentences, same paragraph) around the other entity. For example, given a collection including Roger Moore and Sean Connery, the process finds a second set of entities that are in a relationship with a common facet, such as actor, the relationships appearing in an article in context with a common keyterm, such as "007." Such entities could include, for example, James Bond, Daniel Craig, Pierce Brosnan, and the like. After performing the above queries, the process iterates through the returned relationships and collects entities and their frequency counts. An example of the type of query performed at block 808 and corresponding example search results using an example embodiment are described with reference to FIG. 11C, below. Additional examples of the kinds of queries performed at block 808 are described further below.

At block 810, the process determines a third set of entities that each appear in an article in a relationship with one of the multiple entities and in context with another of the multiple entities. Determining the third set of entities includes performing multiple queries to capture inter connections between the entities in the collection. Performing the multiple queries includes, for each entity of the collection, performing a query that searches for entities that are in a relationship with the entity of the collection, the relationship appearing in an article in context with one of the other entities of the collection. Again, these multiple queries can be performed in parallel. For example, given a collection including Roger Moore and Sean Connery, the process here performs two queries: first, a query that searches for entities related to Roger Moore and appearing in context with Sean Connery, and second, a query that searches for entities related to Sean Connery and appearing in context with Roger Moore. Examples of these queries and corresponding example search results using an example embodiment are described with reference to FIGS. 11D and 11E, below. After performing the multiple queries, the process again iterates through the returned relationships and collects entities and their frequency counts.

At block 812, the process orders a combination of the first, second, and third sets. In some embodiments, ordering the combination of the three sets is based on entity frequency counts and whether entities of the combination share one or more of the common facets identified in block 806. For example, entities of the combination may be ordered by their frequency score (e.g., more frequently occurring entities occurring earlier in the combination) multiplied by a facet score, which is a measure of how many entities in the original collection also have a particular facet. For example, given a collection containing Roger Moore and Sean Connery, which both have the actor facet, the process may find two related entities, Daniel Craig and James Bond. As between Daniel Craig and James Bond, Daniel Craig would have a higher facet score than James Bond, because Daniel Craig also has the actor facet.

After block 812, the process returns the ordered combination of entities. Returning the ordered combination may include returning a data structure (e.g., an XML record) that includes references to each entity in the combination. In other embodiments, the details of the ordered combination are stored in a database record (or other persistent data store), and an identifier for the database record is returned.

Some embodiments perform one or more operations/aspects in addition to, or instead of, the ones described with reference to the process of FIG. 8. For example, in one embodiment, the process constrains its execution time by considering a predetermined number of entities, facets, keyterms, and the like. For example, at block 806, the process may elect to iterate over a predetermined number of relationships (e.g., the top 10) returned by the multiple queries returned at block 804, where the relationships returned by the multiple queries are ranked in order of relevance. As another example, at block 808 the process may generate a query that includes only a predetermined number of the most common facets and/or keyterms. Techniques for entity recommendation used in a specific example embodiment are described further below.

Figure 9:
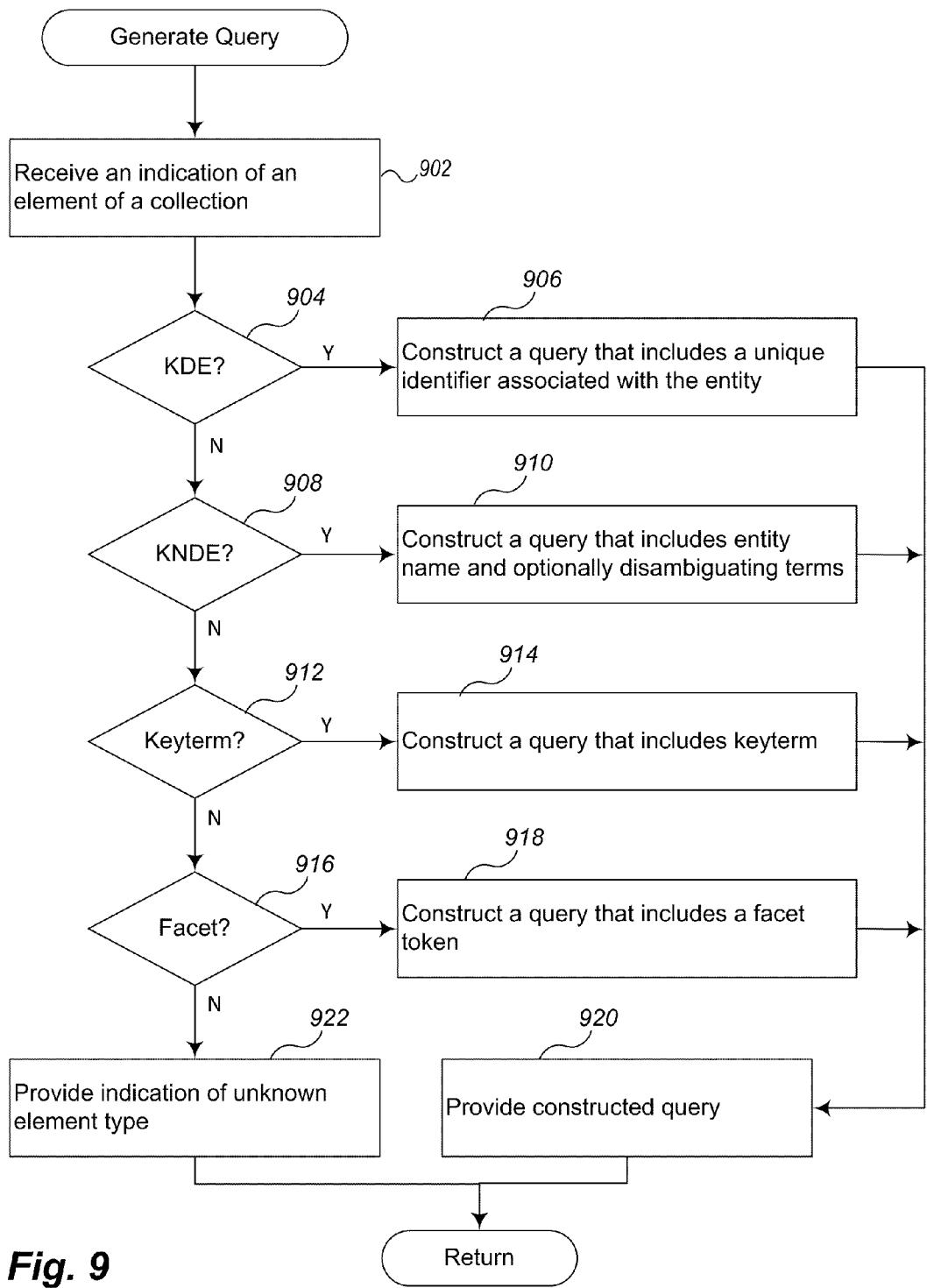
FIG. 9 is an example flow diagram of a query generation process performed by an example content recommendation system according to an example embodiment.

FIG. 9 is an example flow diagram of a query generation process performed by an example content recommendation system according to an example embodiment. In particular, FIG. 9 illustrates a process that may be implemented by, for example, one or more elements of the content recommendation system 200, as described with reference to FIG. 2. The process generates a query or a portion of a query that can be used to determine (e.g., search) for entities, relationships, and/or articles, as described with reference to FIGS. 7 and/or 8, above.

The illustrated process begins at block 902, where it receives an indication of an element of a collection. As noted, in some embodiments, collections include various types of indications of singular or plural entities. Thus, the collection element may be or include a name of one or more entities (e.g., the string "Sean Connery," "James Bond," "Michael Jackson"), a facet of one or more entities (e.g., actor, politician, book, film), or a keyterm (e.g., one or more words describing one or more entities, including "soccer player," "good actor," and "prescription drugs").

At block 904, the process determines whether the element refers to a known and disambiguated entity ("KDE"), and if so, continues at block 906, otherwise at block 908. The element refers to a KDE if it refers to an entity that has been uniquely identified and/or indexed by the content recommendation system. If this is the case, then the entity is associated with a unique identifier (e.g., in the entity data store 217b) that can be used within a query.

At block 906, the process constructs a query that includes a unique identifier associated with the entity. As noted, a KDE is associated with a unique identifier that can be used in a query. Thus, constructing the query includes obtaining (e.g., looking up in the entity data store 217b) the unique identifier and generating a query (or portion thereof) that includes the identifier. Then, the process continues at block 920.

At block 908, the process determines whether the element refers to a known but not-disambiguated entity ("KNDE"), and if so, continues at block 910, otherwise at block 912. The element refers to a KNDE if it refers to one or more entities that are known to the content recommendation system but have not yet been indexed or otherwise assigned a unique identifier.

At block 910, the process constructs a query that includes the name of the entity and optionally disambiguating terms. Constructing the query includes determining whether the entity needs to be disambiguated. In some cases, such as when the entity name is at least substantially unique (e.g., as determined based on inverse document frequency, where names with a higher inverse document frequency are typically more unique), there is no need to disambiguate the entity, and using the entity name alone may suffice. Other cases where disambiguation may not be needed include entities that are emerging popular entities that are currently widely covered in the news and thus typically do not need disambiguation. Emerging popular entities can be determined with reference to various sources, such as Wikipedia page view counts, Wikipedia in-bound link counts, popular queries on major search engines, trending topics on social networks (e.g., Twitter), and the like. If the entity does not need to be disambiguated, the constructed query will typically include just the entity name.

Cases where the entity needs to be disambiguated may include entity names that refer to multiple entities, entity names that are common names (e.g., "Will Smith"), entities that are not emerging popular entities, or the like. When the entity needs to be disambiguated, the constructed query includes the entity name and one or more disambiguating terms. The disambiguating terms may be based on the entity's facets and/or related entities. For example, to query Will Smith the football player (as opposed to Will Smith the actor), a constructed query could include the string "Will Smith" and various keyterms that express facets (e.g., "football player") and/or entities (e.g., "New Orleans Saints," "Super Bowl") that are associated with and/or related to the entity Will Smith the football player. After constructing the query, the process continues at block 920.

At block 912, the process determines whether the element is a keyterm, and if so, continues at block 914, otherwise at block 916. At block 914, the process constructs a query that includes all or some of the keyterm. In some embodiments, variations and/or stems of the keyterms may be included in the query. Then, the process continues at block 920.

At block 916, the process determines whether the element is a facet, and if so, continues at block 918, otherwise at block 922. In some embodiments, a facet may be identified by particular syntax, such as square brackets (e.g., [actor], [football_player], [athlete]). At block 918, the process constructs a query that includes a facet token. A facet token identifies the facet such that articles that cover or otherwise refer to the facet can be efficiently obtained. In some embodiments, articles are annotated with one or more facet tokens prior to indexing, such that articles can searched based on facet coverage. The one or more facet tokens that annotate an article may be limited to a predetermined number of facets, such as those associated with the primary (e.g., most relevant or important) entities referenced in an article. In this manner, the content recommendation system is configured to return articles that are substantially related to queried facet. Then, the process continues at block 920.

At block 922, the process provides an indication of an unknown element type. At this point, the process has been unable to match any of the known element types, and returns an error or other indication (e.g., raises an exception) that the collection element is not of a recognized type.

At block 920, the process provides the constructed query. Providing the constructed query includes returning all or part of a query string that can be used by another process (e.g., the article recommendation process of FIG. 7) to search for content items such as articles or entities.

After blocks 920 and 922, the process returns. Some embodiments perform one or more operations/aspects in addition to, or instead of, the ones described with reference to the process of FIG. 9. Also, in some embodiments, not all of the discussed collection element types are supported or required in every embodiment. For example, the process may handle only known disambiguated entities (KDEs) and known but not-disambiguated entities (KNDEs).

Figure 10:
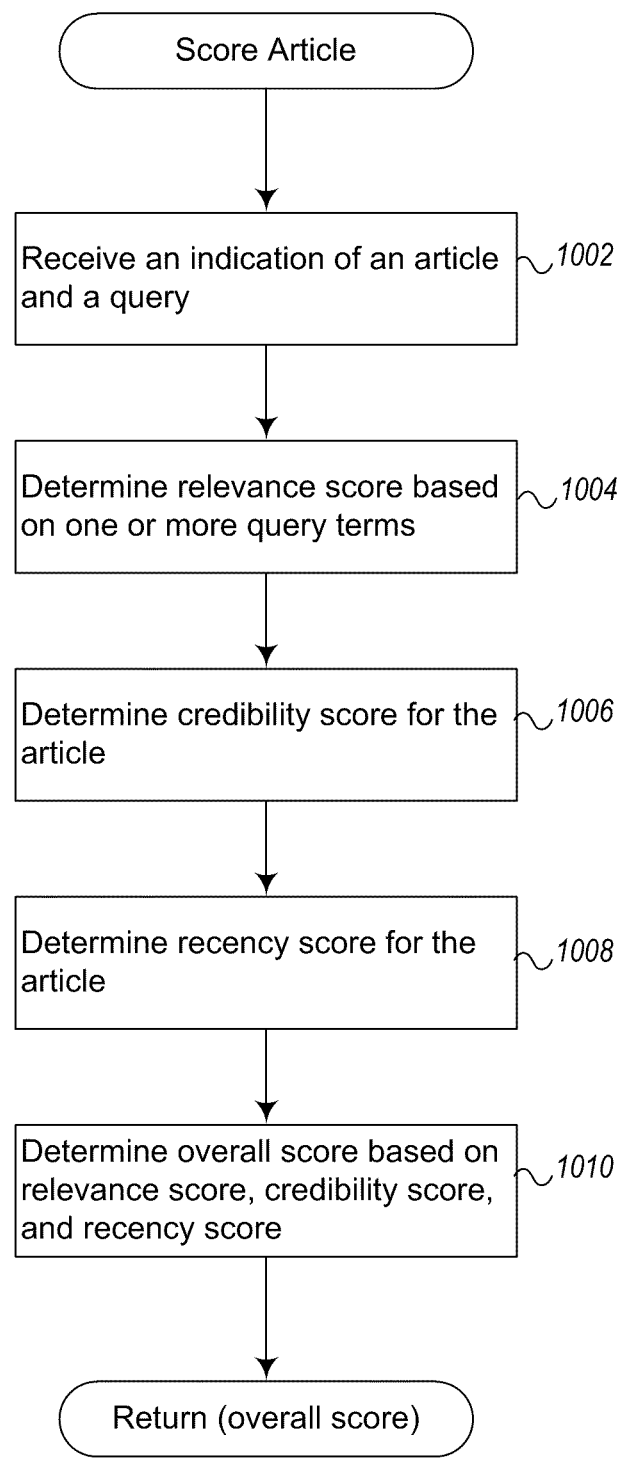
FIG. 10 is an example flow diagram of an article scoring process performed by an example content recommendation system according to an example embodiment.

FIG. 10 is an example flow diagram of an article scoring process performed by an example content recommendation system according to an example embodiment. In particular, FIG. 10 illustrates a process that may be implemented by, for example, one or more elements of the content recommendation system 200, as described with reference to FIG. 2. The process scores an article (e.g., determines a weight or rank for an article) for purposes of ordering multiple articles during article recommendation, as described with reference to FIG. 7, above.

The illustrated process begins at block 1002, where it receives an indication of an article and a query.

At block 1004, the process determines a relevance score based on one or more query terms. Determining the relevance score includes calculating a score for the article with respect the query, based on one or more information retrieval relevance metrics. One such metric is the product of term document frequency and inverse document frequency, where term document frequency is the number of times a term from the query appears in the article, and inverse document frequency is the logarithm of the quotient of the total number of documents in a corpus (e.g., the document store 217a) of the content recommendation system and the number of documents in the corpus that contain the term.

At block 1006, the process determines a credibility score for the article. In some embodiments, the article credibility score can be determined based on properties of the source of the article. For example, if the source of the article is a Website that receives a high volume of traffic and/or is ranked highly by one or more search engines (e.g., via Google's PageRank or similar metrics), the article may be considered more credible than an article having a source Website with minimal traffic or low search engine rank.

At block 1008, the process determines a recency score for the article. In one embodiment, the recency score is based on the difference between the article date (e.g., publication date, last edit date) and the date of article ingestion by the content recommendation system, such that articles having a smaller such difference will have a greater recency score. In other embodiments, recency score may be based on individual factors, such as ingestion date or publication date, taken alone.

At block 1010, the process determines an overall score based on the relevance score, credibility score, and recency score. In one embodiment, the overall score is computed by multiplying the relevance score, credibility score, and recency score together, along with appropriate scaling or normalization factors.

After block 1010, the process returns. Some embodiments perform one or more operations/aspects in addition to, or instead of, the ones described with reference to the process of FIG. 10. For example, in some embodiments, the process does not compute its own article relevance score. Instead, such a score is computed by an underlying document search and retrieval system, and the process instead calculates an article boosting score based on the product of the credibility score and recency score. The document boosting score is then passed along to the underlying document search and retrieval system for purposes of ranking search results. One such embodiment utilizes the Apache Lucene document search library/system, as described in more detail below.

FIGS. 11A-11E illustrate example screen displays generated by queries executed for content recommendation provided by an example embodiment of a content recommendation system. In particular, FIGS. 11A-11E illustrate search results provided by an example content recommendation system in response to received entity relationship queries, such as may be generated by the entity recommendation process of FIG. 8, above. For illustrative purposes, the entities and relationships of FIGS. 11A-11E are presented and described in the context of a human-readable user interface, whereas an automatic process such as that of FIG. 8 would programmatically access the same or similar information via an application program interface or other mechanism.

Figure 11A:
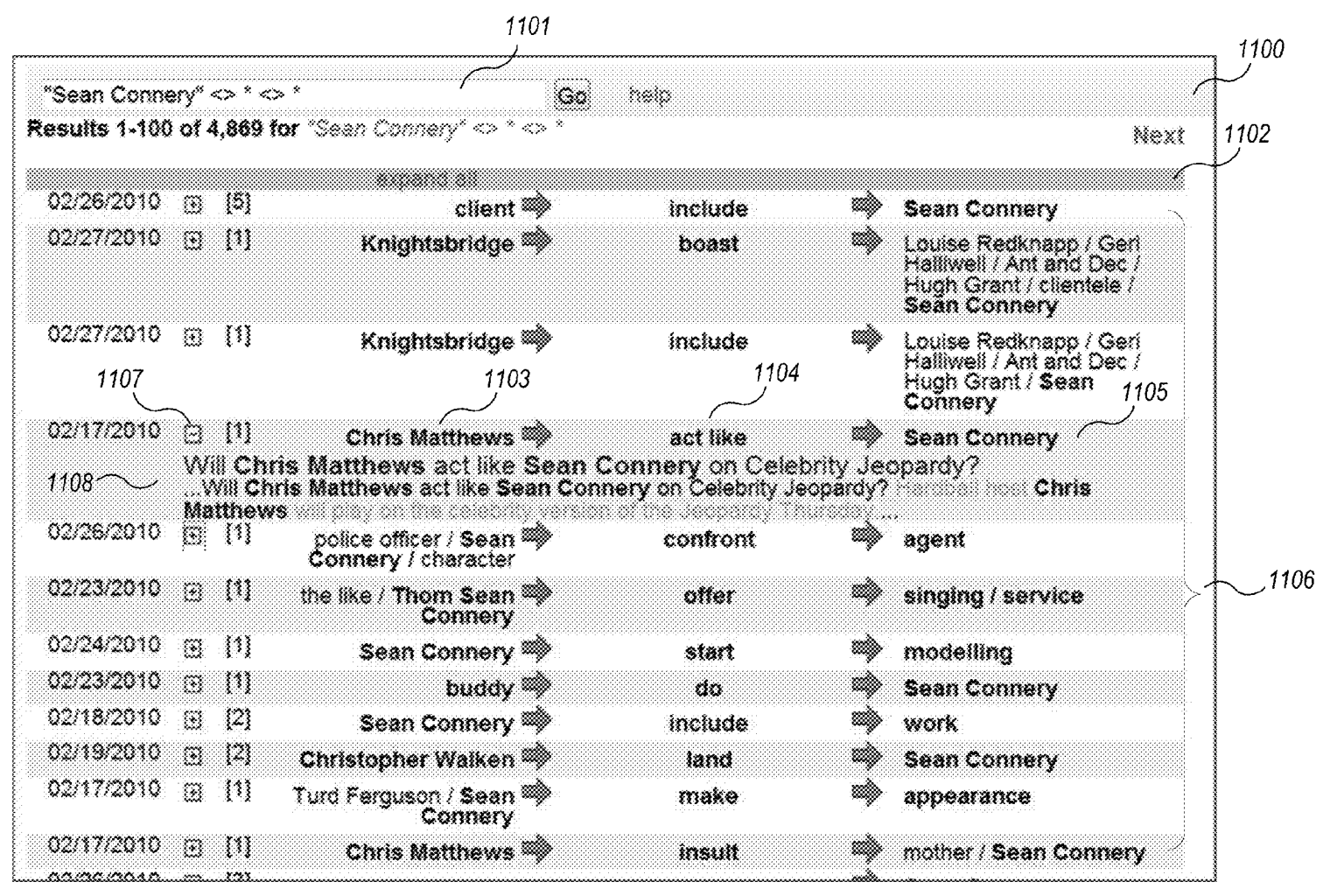

FIG. 11A shows a screen 1100 (e.g., a Web page) that displays search results returned in response to a first search for all entities related to a specified entity. The screen 1100 includes a search tool used to specify a query 1101 and search results 1102. The search results 1102 include multiple relationship records, e.g., records 1106, that each describe one relationship. In this case, the query 1101 is of the form "Sean Connery"< >* < >*, which requests all relationships that include the entity Sean Connery, using a relationship search query language, such as "EQL" provided by Evri Inc. In response, the content recommendation system has returned multiple relationship records, including records 1106. Each of the records includes indicators of a subject 1103 (e.g., Chris Matthews), action 1104 (e.g., acts like), and object 1105 (e.g., Sean Connery), as well as an expansion control 1107. In response to a user selection of the expansion control 1107, the screen 1100 provides a context snippet 1108, which presents textual context taken from the article (or other content) in which the displayed relationship originally appeared. In some embodiments, the entity recommendation process of FIG. 8 makes queries of this sort at block 804.

FIG. 11B shows search results 1112 returned in response to a second search for all entities related to a specified entity. The example of FIG. 11B is similar to that of FIG. 11A, except that in FIG. 11B, the user has entered a query 1111 of the form "Roger Moore"< >*< >*. In response, the content recommendation system has returned search results 1112. In some embodiments, the entity recommendation process of FIG. 8 makes queries of this sort at block 804.

FIG. 11C shows search results 1122 returned in response to a search for entities in relationships with an entity having a specified facet, where the relationships appear in context with one or more specified keyterms. In particular, a user has entered query 1121 ("[actor]< >*< >* context contains "007" or "Bond actor"), which requests all entities in relationships with an entity that has the facet actor, where the relationships appear in context with either the keyterm "007" or the keyterm "Bond actor." In response, the content recommendation system has returned the search results 1122. One example relationship record 1123 has been expanded to show a context snippet 1124 illustrating the presence of both keyterms "007" and "Bond actor" in the article that describes the corresponding relationship. Context is typically defined according to the query language, for example, as some number of surrounding paragraphs, sentences, words, characters, etc. In some embodiments, the entity recommendation process of FIG. 8 makes queries of this sort at block 808.

FIG. 11D shows search results 1132 returned in response to a first search for entities in relationships with a specified entity, where the relationships appear in context with one or more specified entities. In particular, a user has entered query 1131 ("Sean Connery"< >*< >* context contains "Roger Moore"), which requests all entities in relationships with the entity Sean Connery, where the relationships appear in context with the entity "Roger Moore." In response, the content recommendation system has returned the search results 1132 including relationship records 1133 and 1135. Relationship record 1133 has been expanded to show a context snippet 1134 illustrating the presence of the entity "Roger Moore" in the article that describes the corresponding relationship. In some embodiments, the entity recommendation process of FIG. 8 makes queries of this sort at block 810.

FIG. 11E shows search results 1142 returned in response to a second search for entities in relationships with a specified entity, where the relationships appear in context with one or more specified entities. In particular, a user has entered query 1141 ("Roger Moore"< >*< >* context contains "Sean Connery"), which requests all entities in relationships with the entity Roger Moore, where the relationships appear in context with the entity "Sean Connery." In response, the content recommendation system has returned the search results 1142 including relationship record 1143. Note that relationship record 1143 describes the same relationship as relationship record 1135 (FIG. 11D). Typically, during the entity recommendation process, the content recommendation system will remove duplicate relationships and/or entities. For example, prior to providing a set of recommended entities, the content recommendation system may remove or coalesce duplicate entities. In some embodiments, the entity recommendation process of FIG. 8 makes queries of this sort at block 810.

In the following, additional example techniques for article recommendation, entity recommendation, and query construction are discussed.

Article Recommendation in an Example Embodiment

The following describes an approach to article recommendation used by one example embodiment. Similar techniques could be applied to other media, including videos, images, advertisements, and the like.

1. Article Retrieval and Ranking

For the underlying information retrieval capability, the content recommendation system of this embodiment uses Lucene, which is an example of a Vector Space Model (VSM) based information retrieval system. Lucene retrieves and ranks documents in an index by determining how relevant a given document is to a user's query. Additional details regarding Lucene's ranking are available at: http://lucene.apache.org/java/2_1_0/scoring.html and http://lucene.apache.org/java/2_1_0/api/org/apache/lucene/search/Similarity.html.

In general, the more times a query term appears in a document relative to the number of times the term appears in all the documents in the collection, the more relevant that document is to the query. This is accomplished by using the TF-IDF ("term frequency—inverse term frequency") weighting in the scoring of documents.

In addition, Lucene allows influencing of search results by a process known as "boosting." The content recommendation system applies document level boosting—while indexing, the function document.setBoost( ) is invoked before a document is added to the index (such as may be represented by document store 217a).

The boost value for each document is computed as a combination of the document's source credibility and date.

The content recommendation system prefers to retrieve documents from credible sources and documents that are recent. In order to do so, the document recommendation system assigns to each document source a credibility score (e.g., 1 to 5), which is translated into a credibility weight. Document credibility can be assigned manually or computed based on some properties of a source (e.g., Google PageRank of the source Web page, Internet traffic to the source Web page, etc.). Credibility weight is multiplied by recency weight to form document boost.

Recency weight is based on the difference between the date of a document and the date when ingestion started. For example:

TABLE 1

| | |
|---|---|
| 1. | int dateDifference = docDate − ingestionStartDate; |
| 2. | if ( dateDifference < −185 ) dateDifference = −66; |
| 3. | // Dateboost for docs older than 185 days is identical |
| 4. | else if ( dateDifference < −35 ) |
| 5. | dateDifference = −35 + ( ( dateDifference + 35 ) / 5 ) ; |
| 6. | // Dateboost for docs older than 35 days has |
| 7. | // a smaller gradient |
| 8. | dateBoost = 1.1 ^ dateDifference |
| 9. | documentBoost = credibilityBoost * dateBoost |

2. Article Recommendation

The goal of article recommendation is to return a set of articles that cover the set of entities in a collection. The content recommendation system prefers articles that: cover multiple entities than just about a single entity; provide more recent information or news about the entities; and/or are relevant to the entities (e.g., the articles are about one or more of the entities, instead of simply mentioning them in passing).

Also, the content recommendation system prefers that most of the entities are covered by the returned articles, instead of only the dominant entities being covered by the returned articles. To do that, the content recommendation system issues multiple queries. Each time when constructing a new query, the content recommendation system removes the entities that have been well covered by articles from previous queries. This recursive algorithm is described as below.

Initialization:

Set threshold T=number of requested articles (nReqArticles)/collection size.

Set maximum number of recursions=N (currently set to 4).

Start with an empty article set A, and an entity set S that contains all the entities in the given collection (E1, E2, . . . , Ek).

Step 1:

Given the entity set S={E1, E2, . . . , Ek}, issue a query that is a boolean OR of all the entities: e.g., query(E1) OR query(E2) OR . . . OR query(Ek). See below for a description of how queries are constructed for each entity according to one embodiment.

The query will return a list of articles. The order of retrieved articles is based on information retrieval weighting, described above, taking into account the credibility score, the recency score, term frequency, number of terms in the article, length of the article, and presence of terms in the title of the article.

Then place the first nReqArticles articles to set A. The content recommendation system does not retrieve all articles returned by the query because the retrieval of an article is computationally expensive.

If a total number of articles returned for the query is smaller or equal to nReqArticles, jump to Step 3, because shorter queries will not return additional articles.

Step 2:

For each entity in set S, count total number of articles in set A that include the entity; and if the count exceeds the threshold T, remove the entity from the set S.

If the entity set S is not empty AND number of recursions is less than threshold N, then go to Step 1, otherwise continue to Step 3.

Step 3:

Sort the articles in set A based on a measure that combines recency of each article (e.g., publishing date) and number of collection entities covered in the article. Return the sorted article list.

As an example of the operation of the above process, if a user wants to retrieve 6 articles for a collection that includes Roger Moore and Sean Connery the content recommendation system submits a query: did123 AND did456, where did123 is a unique id for Roger Moore, and did456 is a unique id for Sean Connery. If the underlying information retrieval system (e.g., Lucene) returns total of 20 articles the content recommendation system retrieves detailed information about the first 6 articles. It may be found that 4 articles are about Sean Connery, 1 article is about Roger Moore, and 1 article is about both of them. As the number of articles for Sean Connery exceeds the threshold T, he is removed from the set S and a second query is executed: did123. The content recommendation system then combines results of the second query with the results of the first query, taking care that it does not add articles present in results for both queries twice.

Entity Recommendation in an Example Embodiment

The following describes an approach to recommending other entities that might be of interest to the user, as used by one example embodiment. The goal is to suggest other entities that are either related to or similar to the entities in the collection. The content recommendation system attempts to understand the user's interest based on the existing entities in a collection. Furthermore, the entity suggestion should adapt to user actions, such as addition/deletion of entities. The content recommendation system prefers entities that are related to multiple entities in the collection and/or entities of the same type as the ones in the collection.

Process Summary
1) Run independent queries for each entity.
2) From search results, determine characteristics of the collection, e.g., main facets, common keyterms, and the like.
3) Run secondary queries to find other entities that are similar.
4) Collect top entities from all query results, put them in a bucket, and count them.
5) Give more weight to entities that match the main facets in the collection.

Process Details:
Step 1: Run parallel relationship search queries using each entity in the collection:

---
E1 < >* < >*
E2 < >* < >*
......
Ek < >* < >*
---

The relationship query examples are shown in a syntax defined according to the relationship query language (EQL) of Evri™ Corporation. Other queries as defined by other languages may be similarly incorporated. Again, depending on the collection element type (e.g., a KDE or KNDE), the content recommendation system either uses the entity's ID or name (plus disambiguating terms, if necessary) when constructing the query. A discussion of how queries may be constructed for each entity is described further below.

Step 2: Iterate through the top N relationship search results from each query, and collect the following pieces of information:

1) Facet counts—frequency count of facets assigned to each query entity in the returned relationships. The facet refers to the type or role that an entity has in a given context. For example, Arnold Schwarzenegger could be referred to as a politician, an actor, a producer, or a body builder, etc. The facet counts allow the content recommendation system to identify the main facets shared by the entities in the given collection.

2) Related entity counts—collect other entities co-occurring in each returned relationship, and count their occurrences.

3) Keyterm counts—count frequency of keyterms (e.g., words and phrases) that occur in the returned relationships.

As a result of this step, the content recommendation system has a list of main facets shared by entities in the collection. The facets are ranked by their frequency counts.

Then, the keyterms are ranked by a measure of (term-frequency*IDF), where IDF is inverse-document frequency. IDF is a measure of the general importance of the term (obtained by dividing the number of all documents by the number of documents containing the term, and then taking the logarithm of that quotient). The goal is to identify the keyterms that are most relevant and specific to the given collection.

Step 3: Take the most common facets shared by the entities in the collection, as well as the most common keyterms, in order to find other entities that are potentially similar. The content recommendation system constructs the following query:

[Facet1] OR [Facet2]< >*< >* CONTEXT CONTAINS Term1 OR Term2 OR . . . OR TermN

The "CONTEXT CONTAINS" parameter indicates the terms must appear within a small window of sentences around the relationship. In one embodiment, the default window size is 3 sentences. Again, the content recommendation system iterates through the returned relationships and collects occurring entities and their frequency counts.

Step 4: Run parallel joint queries to capture the interconnection between entities in the collection:

---
E1 < > * < >* CONTEXT CONTAINS E2 OR E3 •••••• OR Ek
E2 < > * < > * CONTEXT CONTAINS E1 OR E3 ...... OR Ek
...
Ek < > * < > * CONTEXT CONTAINS E1 OR E2 ...•• OR Ek-1
---

Again, the content recommendation system collects and counts frequency of other entities occurring in each returned relationship.

Step 5: Given all the entities collected from Step 2-4, the content recommendation system places all of them in a bucket, and accumulates a total frequency count for each entity. Then, for each entity, the content recommendation system checks whether it shares the same facet with the ones in the top facet list.

If yes, the entity weight is boosted by: frequency*facet score, where the facet score is defined as number of entities in the collection that have this facet.

Finally, the content recommendation system sorts the entities by their weights, and returns a ranked list of suggested entities As one example, the entities in a first collection are Roger Moore and Sean Connery. The top entities suggested to the user by the above process are Pierce Brosnan, Timothy Dalton, and Daniel Craig, all of whom have played the character (entity) James Bond.

As another example, the entities in a second collection are Sean Connery and one of his Bond movies, "Dr. No". Under the above process, the user will be provided some of the other Bond movies played by Connery, including "From Russia with Love," "Gold Finger" and "You Only Live Twice." Once the user selects one of the movies to add to the collection, more similar movies will show up on the top of the suggestion list, such as "Thunderball."

Extensions and Variations

As discussed, each user-created collection represents certain information interest or topic that users want to keep track. The content recommendation system returns the latest news that is relevant to the collection.

In addition to the described entity-centric profile pages, profile pages may be created that are centered around topics, stories, or events. Those topics will be represented as collections.

The definition of collection may be extended to include not only named entities, but also concepts, key terms and facets. Users will be able to add concepts (e.g., Global Warming, financial crisis) and/or arbitrary key terms (words or phrases) to be included in a collection. The concepts/keyterms are handled similarly as entities. The above algorithms for recommending articles and related entities/concepts still apply. Allowing key-terms or concepts would let users define information request more precisely. For example, suppose a user is interested in following any engagement between China and Russia in terms of oil, a collection could be created including entities China and Russia, as well as a keyterm "oil."

In addition, users can add one or more facets to a collection. This is useful when user is interested in a certain category of entities, instead of specific entities. For example, suppose a user wants to keep track of college football Heisman Trophy candidates and winners, a collection could be created as (Heisman Trophy, [College_Football_Player]). When searching for articles, the content recommendation system returns articles that contain the term "Heisman Trophy" and mentions of any college football players. When recommending related entities, the content recommendation system may restrict the suggested entities to belong to the given facets. In this case, the facets in a collection are treated as filter.

The handling of such extensions for the purpose of query construction is discussed further below.

Query Construction in an Example Embodiment

In one example embodiment, a collection may comprise of any combination of: entities (KDE or KNDE), keyterms, or facets. The following describes on approach to query building for each type of collection members.

1. KDEs ("Known and Disambiquated Entities")

KDEs are associated with their unique ID in the index. Therefore, during query time, KDEs can be searched by their ID. For example, the ID for Sean Connery is 136965. The actual query being issued for retrieving documents is "did_136965"

2. KNDEs ("Known but Not-Disambiquated Entities")

KNDEs are entities that are included in the Entity Store, but they have not been disambiguated/identified in the index. During query time, they can only be searched by their name string.

For entities that have ambiguous name, such as those that share a same name with other entities, context constraints can be included in the query in order to perform disambiguation. The disambiguating queries are in the form of:

Name (Entity) AND Disambiguating Terms

In other words, given information known about the KNDE in the entity store (e.g., properties of the entity), a query can be constructed that will return relevant results about the entity.

First, it is determined whether to apply disambiguating terms based on the uniqueness of an entity's name. If the name is substantially unique, then no disambiguation is needed. The uniqueness is determined based on at least some of the following factors:

1) IDF ("inverse document frequency") weight of the name, computed from a large corpus; the higher the IDF weight, the more unique the name.

2) If the entity is a person name, determining whether it has a common family name or given name. The common family and given names are readily available from external sources.

3) The total number of entities in the entity store that share the same name

Example pseudo-code for determining whether an entity needs disambiguation follows:

TABLE 2

1. needDisambiguation (Entity) :
2.     If isCommonPersonName (Entity) = true, return true;
3.     Else if IDF-weight (Entity) > 11, return false;
4.     Else if IDF-weight (Entity) > 8.5 AND
5.         Number_of_entities_with_same_name (Entity) < 3,
6.         return false;
7.     Else if is_Emerging_Popular_Entity(entity) = true,
8.         return false;
9.     Else, return true;

The goal of the function is_Emerging_Popular_Entity (entity) is to catch entities that are popular or suddenly emerging (e.g., Susan Boyle, balloon boy) all over the news. Emerging popular entities typically do not need disambiguation.

Popularity of entities may be determined based on external sources, such as Wikipedia page view counts (Wikipedia traffic statistics on hourly basis are publicly available from sources such as http://stats.grok.se), Wikipedia in-bound link counts (i.e., how many pages link to the given page), popular queries from major search engines, trending topics from sources like Twitter, or the like.

The function is_Emerging_Popular_Entity (Entity) would return true if a) its popularity measure exceeds a pre-determined threshold; and b) the entity has highest popularity score compared to other entities that have the same name. For example, Will Smith the football player might be popular due to his team is playing the 2010 Super Bowl, but Will Smith the actor still has higher overall popularity score.

Next, for entities that need disambiguation, disambiguation terms are selected based on the given entity's facet. Suppose the KNDE is Will Smith, the American football player of the NFL's New Orleans Saints. It is known that football players are usually associated with related facets (e.g., Football teams, Football coaches, Football players) and/or keywords (e.g., NFL, Super bowl, quarterback, tackle, linebacker, touchdown).

The above related facets and keyterms can be termed "facet profiles." Facet profiles can be generated automatically off-line, using the KDEs that have been tagged in the index. For example, the entities that have been tagged as football player may be analyzed to determine which facets and keyterms are mostly correlated to football players. Of course, facet profiles can also be generated manually by a human, or by a combination of manual and automated processes.

In the entity store, each KNDE is associated with a number of static properties that are extracted from structured or semi-structured sources (e.g., Wikipedia). Some of the properties are links to other entities (e.g., for a football player, the list of teams he has played for, the college he went to, birthplace, spouse, etc.). The content recommendation system processes the linked entities, and selects the ones that match the related facets above. For example, for Will Smith, the content recommendation system would select "New Orleans Saints" the football team as a related entity.

As the result, the disambiguation terms include facet-related keywords, plus linked entities. For example, the query for Will Smith could be:

"Will Smith" AND ("New Orleans Saints" OR "NFL" OR "Super bowl" OR "Defensive end" OR "tackle")

3. Keyterms

If a collection entry is a keyterm (word or phrase), the content recommendation system uses the term as keyword query for retrieving documents.

4. Facets

When a collection entry is a facet, such as a football player, one approach is to use the facet directly in the query. In the Evri Query Language (EQL), the syntax for searching for a facet is using square bracket, such as [Football_Team]. In the index, tagged/disambiguated entities are annotated with their facets. Thus, a facet query like [Football_Team] would return articles that contain mentions of any football teams.

This approach may have some drawbacks. The ranking of the retrieved articles is based on factors such as TF-IDF weighting and article recency. Therefore, this approach may result in less relevant articles due to:

(a) Articles containing many mentions of different entities with the given facet. For example, for the query [Football_Team], articles that cover many games and teams would get ranked higher, but those articles are usually less interesting.

b) Articles that are very recent but only mention the facet in passing.

c) For news articles and blogs on the Web, the facet appears in news headlines or other boiler-plate part of the web page that are not related to the main article.

To address this issue, the content recommendation system may restrict the facets to the main entities in a given article. In one approach, during indexing of each article, the content recommendation system first identifies the top K entities in the article, then collects all the facets assigned to the top entities, and then annotates the article with those facets using special tokens (e.g., "facet.football.team").

Later at search time, given a facet Football_Team, the content recommendation system translates it into the query term "facet.football.team." By doing this, the content recommendation system obtains articles that tend to be about the facet.

The top entities in an article are ranked and selected by an importance measure (e.g., how important an entity is with respect to the main topic of the article), which is computed based on: total number of occurrences of each entity in the article, giving boost to entities appearing in the article title, and giving penalty to entities that are place names or publisher names.

Example Entity Types

The following Table defines several example entity types in an example embodiment. Other embodiments may incorporate different types.

TABLE 3

| |
| --- |
| Person |
| Organization |
| Location |
| Concept |
| Event |
| Product |
| Condition |
| Organism |
| Substance |

Example Facets

The following Table defines several example facets in an example embodiment. Other embodiments may incorporate different facets.

TABLE 4

| |
| --- |
| PERSON actor Evri/Person/Entertainment/Actor |
| PERSON animator Evri/Person/Entertainment/Animator |
| PERSON cinematographer Evri/Person/Entertainment/Cinematographer |
| PERSON comedian Evri/Person/Entertainment/Comedian |
| PERSON fashion_designer Evri/Person/Entertainment/Fashion_Designer |
| PERSON musician Evri/Person/Entertainment/Musician |
| PERSON composer Evri/Person/Entertainment/Musician/Composer |
| PERSON producer Evri/Person/Entertainment/Producer |
| PERSON director Evri/Person/Entertainment/Director |
| PERSON radio_personality Evri/Person/Entertainment/Radio_Personality |
| PERSON television_personality Evri/Person/Entertainment/Television_Personality |
| PERSON author Evri/Person/Entertainment/Author |
| PERSON model Evri/Person/Entertainment/Model |
| PERSON screenwriter Evri/Person/Entertainment/Screenwriter |
| PERSON playwright Evri/Person/Entertainment/Playwright |
| PERSON conductor Evri/Person/Entertainment/Conductor |
| PRODUCT film Evri/Product/Entertainment/Movie |
| PRODUCT television_show Evri/Product/Entertainment/Television_Show |
| PRODUCT album Evri/Product/Entertainment/Album |
| PRODUCT musical Evri/Product/Entertainment/Musical |
| PRODUCT book Evri/Product/Entertainment/Book |
| PRODUCT newspaper Evri/Product/Publication |
| PERSON politician Evri/Person/Politics/Politician |
| PERSON cabinet_member Evri/Person/Politics/Cabinet_Member |
| PERSON government_person Evri/Person/Politics/Government_Person |
| PERSON political_party_leader Evri/Person/Politics/Political_Party_Leader |
| PERSON judge Evri/Person/Politics/Judge |
| PERSON country_leader Evri/Person/Politics/Politician/World_Leader |
| PERSON joint_chiefs_of_staff Evri/Person/Politics/Politician/Joint_Chiefs_of_Staff |
| PERSON white_house_staff Evri/Person/Politics/White_House_Staff |
| PERSON activist Evri/Person/Politics/Activist |
| PERSON lobbyist Evri/Person/Politics/Lobbyist |
| PERSON ambassador Evri/Person/Politics/Ambassador |
| PERSON analyst Evri/Person/Analyst |
| PERSON journalist Evri/Person/Journalist |
| PERSON blogger Evri/Person/Blogger |
| ORGANIZATION band Evri/Organization/Entertainment/Band |
| ORGANIZATION political_party Evri/Organization/Politics/Political_Party |
| ORGANIZATION advocacy_group Evri/Organization/Politics/Advocacy_Group |
| EVENT film_award_ceremony Evri/Event/Entertainment/Film_Award_Ceremony |

TABLE 4-continued

```
EVENT music_award_ceremony Evri/Event/Entertainment/Music_Award_Ceremony
EVENT television_award_ceremony Evri/Event/Entertainment/Television_Award_Ceremony
EVENT court_case Evri/Event/Politics/Court_Case
ORGANIZATION television_network
Evri/Organization/Entertainment/Company/Television_Network
ORGANIZATION music_production_company
Evri/Organization/Entertainment/Company/Music_Production_Company
ORGANIZATION film_production_company
Evri/Organization/Entertainment/Company/Film_Production_Company
LOCATION congressional_district Evri/Location/Politics/Congressional_District
LOCATION military_base Evri/Location/Politics/Military_Base
ORGANIZATION congressional_committee Evri/Organization/Politics/Congressional_Committee
ORGANIZATION international_organization
Evri/Organization/Politics/International_Organization
ORGANIZATION government_agency Evri/Organization/Politics/Government_Agency
ORGANIZATION armed_force Evri/Organization/Politics/Armed_Force
ORGANIZATION terrorist_organization
Evri/Organization/Politics/Terrorist_Organization
ORGANIZATION us_court Evri/Organization/Politics/US_Court
ORGANIZATION cabinet_department Evri/Organization/Politics/Cabinet_Department
LOCATION continent Evri/Location/Continent
LOCATION geographic_region Evri/Location/Geographic_Region
LOCATION country Evri/Location/Country
LOCATION province Evri/Location/Province
LOCATION state Evri/Location/State
LOCATION city Evri/Location/City
LOCATION us_city Evri/Location/City
LOCATION neighborhood Evri/Location/Neighborhood
LOCATION building Evri/Location/Structure/Building
LOCATION island Evri/Location/Island
LOCATION mountain Evri/Location/Mountain
LOCATION body_of_water Evri/Location/Body_of_Water
ORGANIZATION media_companyEvri/Organization/Entertainment/Company/Media_Company
ORGANIZATION haute_couture_house
Evri/Organization/Entertainment/Company/Haute_Couture_House
ORGANIZATION publishing_company
Evri/Organization/Entertainment/Company/Publishing_Company
ORGANIZATION entertainment_company Evri/Organization/Entertainment/Company
CONCEPT fictional_character Evri/Concept/Entertainment/Fictional_Character
PERSON military_leader Evri/Person/Politics/Military_Leader
PERSON military_person Evri/Person/Politics/Military_Person
EVENT military_conflict Evri/Event/Politics/Military_Conflict
PERSON terrorist Evri/Person/Politics/Terrorist
PERSON criminal Evri/Person/Criminal
PERSON explorer Evri/Person/Explorer
PERSON inventor Evri/Person/Technology/Inventor
PERSON lawyer Evri/Person/Lawyer
PERSON artist Evri/Person/Artist
PERSON painter Evri/Person/Artist/Painter
PERSON revolutionary Evri/Person/Revolutionary
PERSON spiritual_leader Evri/Person/Spiritual_Leader
PERSON philosopher Evri/Person/Philosopher
PERSON anthropologist Evri/Person/Anthropologist
PERSON architect Evri/Person/Architect
PERSON historian Evri/Person/Historian
PERSON editor Evri/Person/Editor
PERSON astronaut Evri/Person/Astronaut
PERSON photographer Evri/Person/Photographer
PERSON scientist Evri/Person/Technology/Scientist
PERSON economist Evri/Person/Economist
PERSON technology_person Evri/Person/Technology/Technology_Person
PERSON business_person Evri/Person/Business/Business_Person
PERSON stock_trader Evri/Person/Business/Business_Person/Stock_Trader
PERSON first_lady Evri/Person/Politics/First_Lady
ORGANIZATION us_state_legislature
Evri/Organization/Politics/Legislative_Body/State_Legislature
ORGANIZATION legislative_body Evri/Organization/Politics/Legislative_Body
ORGANIZATION executive_body Evri/Organization/Politics/Executive_Body
PERSON team_owner Evri/Person/Sports/Team_Owner
PERSON sports_announcer Evri/Person/Sports/Sports_Announcer
PERSON sports_executive Evri/Person/Sports/Sports_Executive
PERSON olympic_medalist Evri/Person/Sports/Olympic_Medalist
PERSON athlete Evri/Person/Sports/Athlete
PERSON coach Evri/Person/Sports/Coach
PERSON sports_official Evri/Person/Sports/Sports_Official
PERSON motorcycle_driver Evri/Person/Sports/Athlete/Motorcycle_Rider
PERSON race_car_driver Evri/Person/Sports/Athlete/Race_car_Driver
ORGANIZATION auto_racing_team Evri/Organization/Sports/Auto_Racing_Team
PERSON baseball_player Evri/Person/Sports/Athlete/Baseball_Player
ORGANIZATION baseball_team Evri/Organization/Sports/Baseball_Team
```

TABLE 4-continued

```
PERSON basketball_player Evri/Person/Sports/Athlete/Basketball_Player
ORGANIZATION basketball_team Evri/Organization/Sports/Basketball_Team
PERSON football_player Evri/Person/Sports/Athlete/Football_Player
ORGANIZATION football_team Evri/Organization/Sports/Football_Team
PERSON hockey_player Evri/Person/Sports/Athlete/Hockey_Player
ORGANIZATION hockey_team Evri/Organization/Sports/Hockey_Team
PERSON soccer_player Evri/Person/Sports/Athlete/Soccer_Player
ORGANIZATION soccer_team Evri/Organization/Sports/Soccer_Team
ORGANIZATION sports_league Evri/Organization/Sports/Sports_League
PERSON cricketer Evri/Person/Sports/Athlete/Cricketer
ORGANIZATION cricket_team Evri/Organization/Sports/Cricket_Team
PERSON cyclist Evri/Person/Sports/Athlete/Cyclist
ORGANIZATION cycling_team Evri/Organization/Sports/Cycling_Team
PERSON volleyball_player Evri/Person/Sports/Athlete/Volleyball_Player
ORGANIZATION volleyball_team Evri/Organization/Sports/Volleyball_Team
PERSON rugby_player Evri/Person/Sports/Athlete/Rugby_Player
ORGANIZATION rugby_team Evri/Organization/Sports/Rugby_Team
PERSON boxer Evri/Person/Sports/Athlete/Boxer
PERSON diver Evri/Person/Sports/Athlete/Diver
PERSON golfer Evri/Person/Sports/Athlete/Golfer
PERSON gymnast Evri/Person/Sports/Athlete/Gymnast
PERSON figure_skater Evri/Person/Sports/Athlete/Figure_Skater
PERSON horse_racing_jockey Evri/Person/Sports/Athlete/Horse_Racing_Jockey
PERSON lacrosse_player Evri/Person/Sports/Athlete/Lacrosse_Player
ORGANIZATION lacrosse_team Evri/Organization/Sports/Lacrosse_Team
PERSON rower Evri/Person/Sports/Athlete/Rower
PERSON swimmer Evri/Person/Sports/Athlete/Swimmer
PERSON tennis_player Evri/Person/Sports/Athlete/Tennis_Player
PERSON track_and_field_athlete Evri/Person/Sports/Athlete/Track_and_Field_Athlete
PERSON wrestler Evri/Person/Sports/Athlete/Wrestler
PERSON triathlete Evri/Person/Sports/Athlete/Triathlete
EVENT sports_competition Evri/Event/Sports/Sports_Event/Sporting_Competition
EVENT sports_event Evri/Event/Sports/Sports_Event
EVENT olympic_sport Evri/Event/Sports/Olympic_Sports
EVENT election Evri/Event/Politics/Election
LOCATION sports_venue Evri/Location/Sports/Sports_Venue
ORGANIZATION sports_division Evri/Organization/Sports/Sports_Division
ORGANIZATION sports_event_promotion_company
Evri/Organization/Sports/Sports_Event_Promotion_Company
ORGANIZATION sports_organization Evri/Organization/Sports/Sports_Organization
ORGANIZATION company Evri/Organization/Business/Company
ORGANIZATION news_agency Evri/Organization/Business/Company/News_Agency
PRODUCT cell_phone Evri/Product/Technology/Cell_Phone
PRODUCT computer Evri/Product/Technology/Computer
PRODUCT software Evri/Product/Technology/Software
PRODUCT video_game Evri/Product/Technology/Software/Video_Game
PRODUCT video_game_console Evri/Product/Technology/Video_Game_Console
PRODUCT media_player Evri/Product/Technology/Media_player
ORGANIZATION website Evri/Organization/Technology/Website
ORGANIZATION technology_company Evri/Organization/Technology/Company
PRODUCT magazine Evri/Product/Publication
ORGANIZATION financial_services_company
Evri/Organization/Business/Company/Financial_Services_Company
ORGANIZATION radio_network Evri/Organization/Entertainment/Company/Radio_Network
ORGANIZATION futures_exchange Evri/Organization/Business/Futures_Exchange
ORGANIZATION stock_exchange Evri/Organization/Business/Stock_Exchange
ORGANIZATION government_sponsored_enterprise
Evri/Organization/Politics/Government_Sponsored_Enterprise
ORGANIZATION political_organization Evri/Organization/Politics/Political_organization
ORGANIZATION labor_union Evri/Organization/Politics/Labor_Union
ORGANIZATION nonprofit_corporation
Evri/Organization/Business/Company/Nonprofit_Corporation
ORGANIZATION nonprofit_organization Evri/Organization/Nonprofit_Organization
ORGANIZATION national_laboratory Evri/Organization/Politics/National_Laboratory
ORGANIZATION unified_combatant_commands
Evri/Organization/Politics/Unified_Combatant_Commands
ORGANIZATION research_institute Evri/Organization/Research_Institute
CONCEPT stock_market_index Evri/Concept/Business/Stock_Market_Index
PERSON business_executive Evri/Person/Business/Business_Person/Business_Executive
PERSON corporate_director Evri/Person/Business/Business_Person/Corporate_Director
PERSON banker Evri/Person/Business/Business_Person/Banker
PERSON publisher Evri/Person/Business/Business_Person/Publisher
PERSON us_politician Evri/Person/Politics/U.S._Politician
PERSON nobel_laureate Evri/Person/Nobel_Laureate
PERSON chemist Evri/Person/Chemist
PERSON physicist Evri/Person/Physicist
ORGANIZATION business_organization Evri/Organization/Business/Business_Organization
ORGANIZATION consumer_organization Evri/Organization/Business/Consumer_Organization
ORGANIZATION professional_association Evri/Organization/Business/Professional_Association
PERSON investor Evri/Person/Business/Business_Person/Investor
```

TABLE 4-continued

```
PERSON financier Evri/Person/Business/Business_Person/Financier
PERSON money_manager Evri/Person/Business/Business_Person/Money_Manager
ORGANIZATION aerospace_company
Evri/Organization/Business/Company/Aerospace_Company
ORGANIZATION advertising_agency
Evri/Organization/Business/Company/Advertising_Company
ORGANIZATION agriculture_company
Evri/Organization/Business/Company/Agriculture_Company
ORGANIZATION airline Evri/Organization/Business/Company/Airline
ORGANIZATION architecture_firm Evri/Organization/Business/Company/Architecture_Firm
ORGANIZATION automotive_company
Evri/Organization/Business/Company/Automotive_Company
ORGANIZATION chemical_company Evri/Organization/Business/Company/Chemical_Company
ORGANIZATION clothing_company Evri/Organization/Business/Company/Clothing_Company
ORGANIZATION consulting_company
Evri/Organization/Business/Company/Consulting_Company
ORGANIZATION cosmetics_company
Evri/Organization/Business/Company/Cosmetics_Company
ORGANIZATION defense_company Evri/Organization/Business/Company/Defense_Company
ORGANIZATION distribution_company
Evri/Organization/Business/Company/Distribution_Company
ORGANIZATION gaming_company Evri/Organization/Business/Company/Gaming_Company
ORGANIZATION electronics_company
Evri/Organization/Business/Company/Electronics_Company
ORGANIZATION energy_company Evri/Organization/Business/Company/Energy_Company
ORGANIZATION hospitality_company
Evri/Organization/Business/Company/Hospitality_Company
ORGANIZATION insurance_company Evri/Organization/Business/Company/Insurance_Company
ORGANIZATION law_firm Evri/Organization/Business/Company/Law_Firm
ORGANIZATION manufacturing_company
Evri/Organization/Business/Company/Manufacturing_Company
ORGANIZATION mining_company Evri/Organization/Business/Company/Mining_Company
ORGANIZATION pharmaceutical_company
Evri/Organization/Business/Company/Pharmaceutical_Company
ORGANIZATION railway_company Evri/Organization/Business/Company/Railway
ORGANIZATION real_estate_company
Evri/Organization/Business/Company/Real_Estate_Company
ORGANIZATION retailer Evri/Organization/Business/Company/Retailer
ORGANIZATION shipping_company Evri/Organization/Business/Company/Shipping_Company
ORGANIZATION software_company
Evri/Organization/Technology/Company/Software_Company
ORGANIZATION steel_company Evri/Organization/Business/Company/Steel_Company
ORGANIZATION telecommunications_company
Evri/Organization/Business/Company/Telecommunications_Company
ORGANIZATION utilities_company Evri/Organization/Business/Company/Utilities_Company
ORGANIZATION wholesaler Evri/Organization/Business/Company/Wholesaler
ORGANIZATION television_production_company
Evri/Organization/Entertainment/Company/Television_Production_Company
ORGANIZATION food_company Evri/Organization/Business/Company/Food_Company
ORGANIZATION beverage_company
Evri/Organization/Business/Company/Food_Company/Beverage_Company
ORGANIZATION restaurant Evri/Organization/Business/Company/Food_Company/Restaurant
ORGANIZATION winery
Evri/Organization/Business/Company/Food_Company/Beverage_Company
EVENT film_festival Evri/Event/Entertainment/Film_Festival
ORGANIZATION film_festival Evri/Event/Entertainment/Film_Festival
PRODUCT anime Evri/Product/Entertainment/Anime
PRODUCT aircraft Evri/Product/Aircraft
PRODUCT military_aircraft Evri/Product/Aircraft/Military_Aircraft
PRODUCT vehicle Evri/Product/Vehicle
PRODUCT ballet Evri/Product/Entertainment/Ballet
PRODUCT opera Evri/Product/Entertainment/Opera
PRODUCT painting Evri/Product/Entertainment/Painting
PRODUCT song Evri/Product/Entertainment/Single
EVENT technology_conference Evri/Event/Technology/Technology_Conference
CONCEPT legislation Evri/Concept/Politics/Legislation
CONCEPT treaty Evri/Concept/Politics/Treaty
ORGANIZATION trade_association Evri/Organization/Business/Trade_Association
ORGANIZATION technology_organization
Evri/Organization/Technology/Technology_Organization
ORGANIZATION educational_institution Evri/Organization/Educational_Institution
LOCATION museum Evri/Location/Structure/Building/Museum
LOCATION religious_building Evri/Location/Structure/Building/Religious_Building
PERSON astronomer Evri/Person/Astronomer
PERSON mathematician Evri/Person/Mathematician
PERSON academic Evri/Person/Academic
PERSON dancer Evri/Person/Entertainment/Dancer
PRODUCT play Evri/Product/Entertainment/Play
LOCATION botanical_garden Evri/Location/Botanical_Garden
LOCATION hospital Evri/Location/Health/Hospital
```

TABLE 4-continued

```
PERSON psychiatrist Evri/Person/Health/Psychiatrist
PERSON physician Evri/Person/Health/Physician
PERSON nurse Evri/Person/Health/Nurse
ORGANIZATION journalism_organization Evri/Organization/Journalism_Organization
ORGANIZATION healthcare_company
Evri/Organization/Business/Company/Healthcare_Company
ORGANIZATION religious_organization Evri/Organization/Religious_Organization
PERSON biologist Evri/Person/Scientist/Biologist
PERSON biochemist Evri/Person/Scientist/Biochemist
PERSON botanist Evri/Person/Scientist/Botanist
PERSON poet Evri/Person/Entertainment/Author/Poet
PERSON curler Evri/Person/Sports/Athlete/Curler
PERSON biathlete Evri/Person/Sports/Athlete/Biathlete
PERSON alpine_skier Evri/Person/Sports/Athlete/Alpine_Skier
PERSON cross-country_skier Evri/Person/Sports/Athlete/Cross-country_Skier
PERSON freestyle_skier Evri/Person/Sports/Athlete/Freestyle_Skier
PERSON luger Evri/Person/Sports/Athlete/Luger
PERSON nordic_combined_skier Evri/Person/Sports/Athlete/Nordic_Combined_Skier
PERSON speed_skater Evri/Person/Sports/Athlete/Speed_Skater
PERSON skeleton_racer Evri/Person/Sports/Athlete/Skeleton_Racer
PERSON ski_jumper Evri/Person/Sports/Athlete/Ski_Jumper
PERSON snowboarder Evri/Person/Sports/Athlete/Snowboarder
PERSON bobsledder Evri/Person/Sports/Athlete/Bobsledder
PERSON bodybuilder Evri/Person/Sports/Athlete/Bodybuilder
PERSON equestrian Evri/Person/Sports/Athlete/Equestrian
PERSON fencer Evri/Person/Sports/Athlete/Fencer
PERSON hurler Evri/Person/Sports/Athlete/Hurler
PERSON martial_artist Evri/Person/Sports/Athlete/Martial_Artist
PERSON canoer Evri/Person/Sports/Athlete/Canoer
LOCATION music_venue Evri/Location/Entertainment/Music_Venue
LOCATION aquarium Evri/Location/Aquarium
LOCATION cemetery Evri/Location/Cemetery
LOCATION national_park Evri/Location/National_Park
LOCATION volcano Evri/Location/Volcano
LOCATION zoo Evri/Location/Zoo
LOCATION structure Evri/Location/Structure
LOCATION airport Evri/Location/Structure/Airport
LOCATION bridge Evri/Location/Structure/Bridge
LOCATION hotel Evri/Location/Structure/Hotel
LOCATION palace Evri/Location/Structure/Palace
LOCATION monument Evri/Location/Structure/Monument
LOCATION street Evri/Location/Street
LOCATION amusement_park Evri/Location/Amusement_Park
LOCATION unitary_authority Evri/Location/Unitary_Authority
PRODUCT drug_brand Evri/Product/Health/Drug_Brand
PRODUCT weapon Evri/Product/Weapon
PRODUCT missile_system Evri/Product/Weapon/Missile_System
PRODUCT firearm Evri/Product/Weapon/Firearm
PRODUCT artillery Evri/Product/Weapon/Artillery
PRODUCT anti-aircraft_weapon Evri/Product/Weapon/Anti-aircraft_Weapon
PRODUCT anti-tank_weapon Evri/Product/Weapon/Anti-tank_Weapon
PRODUCT biological_weapon Evri/Product/Weapon/Biological_Weapon
PRODUCT chemical_weapon Evri/Product/Weapon/Chemical_Weapon
CHEMICAL chemical_weapon Evri/Product/Weapon/Chemical_Weapon
SUBSTANCE chemical_weapon Evri/Product/Weapon/Chemical_Weapon
PRODUCT explosive Evri/Product/Weapon/Explosive
PRODUCT weapons_launcher Evri/Product/Weapon/Weapons_Launcher
PERSON chess_player Evri/Person/Chess_Player
PERSON sculptor Evri/Person/Artist/Sculptor
PRODUCT game Evri/Product/Game
ORGANIZATION theater_company
Evri/Organization/Entertainment/Company/Theater_Company
PERSON badminton_player Evri/Person/Sports/Athlete/Badminton_Player
PRODUCT naval_ship Evri/Product/Watercraft/Naval_Ship
PRODUCT battleship Evri/Product/Watercraft/Naval_Ship/Battleship
PRODUCT cruiser Evri/Product/Watercraft/Naval_Ship/Cruiser
PRODUCT aircraft_carrier Evri/Product/Watercraft/Naval_Ship/Aircraft_Carrier
PRODUCT destroyer Evri/Product/Watercraft/Naval_Ship/Destroyer
PRODUCT frigate Evri/Product/Watercraft/Naval_Ship/Frigate
PRODUCT submarine Evri/Product/Watercraft/Naval_Ship/Submarine
PRODUCT cruise_ship Evri/Product/Watercraft/Cruise_Ship
PRODUCT yacht Evri/Product/Watercraft/Yacht
PRODUCT ocean_liner Evri/Product/Watercraft/Ocean_Liner
LOCATION county Evri/Location/County
PRODUCT symphony Evri/Product/Entertainment/Symphony
ORGANIZATION television_station
Evri/Organization/Entertainment/Company/Television_Station
ORGANIZATION radio_station Evri/Organization/Entertainment/Company/Radio_Station
CONCEPT constitutional_amendment Evri/Concept/Politics/Constitutional_Amendment
PERSON australian_rules_footballer Evri/Person/Sports/Athlete/Australian_Rules_Footballer
```

TABLE 4-continued

```
ORGANIZATION australian_rules_football_team
Evri/Organization/Sports/Australian_Rules_Football_Team
ORGANIZATION criminal_organization Evri/Organization/Criminal_Organization
PERSON poker_player Evri/Person/Poker_Player
PERSON bowler Evri/Person/Sports/Athlete/Bowler
PERSON yacht_racer Evri/Person/Sports/Athlete/Yacht_Racer
PERSON water_polo player Evri/Person/Sports/Athlete/Water_Polo_Player
PERSON field_hockey_player Evri/Person/Sports/Athlete/Field_Hockey_Player
PERSON skateboarder Evri/Person/Sports/Athlete/Skateboarder
PERSON polo_player Evri/Person/Sports/Athlete/Polo_Player
PERSON gaelic_footballer Evri/Person/Sports/Athlete/Gaelic_Footballer
PRODUCT programming_language Evri/Product/Technology/Programming_Language
PERSON engineer Evri/Person/Technology/Engineer
EVENT cybercrime Evri/Event/Technology/Cybercrime
EVENT criminal_act Evri/Event/Criminal_Act
PERSON critic Evri/Person/Critic
PERSON pool_player Evri/Person/Pool_Player
PERSON snooker_player Evri/Person/Snooker_Player
PERSON competitive_eater Evri/Person/Competitive_Eater
PRODUCT data_storage_medium Evri/Product/Technology/Data_Storage_Medium
PRODUCT data_storage_device Evri/Product/Technology/Data_Storage_Device
PERSON mountain_climber Evri/Person/Mountain_Climber
PERSON aviator Evri/Person/Aviator
ORGANIZATION cooperative Evri/Organization/Cooperative
CONCEPT copyright_license Evri/Concept/Copyright_License
EVENT observance Evri/Event/Observance
PERSON outdoor_sportsperson Evri/Person/Sports/Outdoor_Sportsperson
PERSON rodeo_performer Evri/Person/Sports/Rodeo_Performer
PERSON sports_shooter Evri/Person/Sports/Athlete/Sports_Shooter
CONCEPT award Evri/Concept/Award
CONCEPT entertainment_series Evri/Concept/Entertainment/Entertainment_Series
PERSON chef Evri/Person/Chef
PERSON cartoonist Evri/Person/Entertainment/Cartoonist
PERSON comics_creator Evri/Person/Entertainment/Comics_Creator
PERSON nobility Evri/Person/Nobility
PERSON porn_star Evri/Person/Porn_Star
PERSON archaeologist Evri/Person/Scientist/Archaeologist
PERSON paleontologist Evri/Person/Scientist/Paleontologist
PERSON victim_of_crime Evri/Person/Victim_of_Crime
LOCATION region Evri/Location/Region
PERSON linguist Evri/Person/Linguist
PERSON librarian Evri/Person/Librarian
PERSON bridge_player Evri/Person/Bridge_Player
PERSON choreographer Evri/Person/Entertainment/Choreographer
PRODUCT camera Evri/Product/Technology/Camera
PRODUCT publication Evri/Product/Publication
PRODUCT comic Evri/Product/Entertainment/Comic
PRODUCT short_story Evri/Product/Entertainment/Short_Story
ORGANIZATION irregular_military_organization
Evri/Organization/Irregular_Military_Organization
SUBSTANCE chemical_element Evri/Substance/Chemical_Element
SUBSTANCE alkaloid Evri/Substance/Organic_Compound/Alkaloid
SUBSTANCE glycoside Evri/Substance/Glycoside
SUBSTANCE amino_acid Evri/Substance/Amino_Acid
SUBSTANCE protein Evri/Substance/Protein
SUBSTANCE enzyme Evri/Substance/Enzyme
SUBSTANCE hormone Evri/Substance/Hormone
SUBSTANCE hydrocarbon Evri/Substance/Organic_Compound/Hydrocarbon
SUBSTANCE inorganic_compound Evri/Substance/Inorganic_Compound
SUBSTANCE lipid Evri/Substance/Organic_Compound/Lipid
SUBSTANCE steroid Evri/Substance/Organic_Compound/Lipid/Steroid
SUBSTANCE molecule Evri/Substance/Molecule
SUBSTANCE polymer Evri/Substance/Molecule/Polymer
SUBSTANCE terpene Evri/Substance/Organic Compound/Terpene
SUBSTANCE toxin Evri/Substance/Toxin
SUBSTANCE antibiotic Evri/Substance/Health/Antibiotic
SUBSTANCE antioxidant Evri/Substance/Health/Antioxidant
SUBSTANCE anti-inflammatory Evri/Substance/Health/Anti-inflammatory
SUBSTANCE antiasthmatic_drug Evri/Substance/Health/Antiasthmatic_drug
SUBSTANCE anticonvulsant Evri/Substance/Health/Anticonvulsant
SUBSTANCE antihistamine Evri/Substance/Health/Antihistamine
SUBSTANCE antihypertensive Evri/Substance/Health/Antihypertensive
SUBSTANCE antiviral Evri/Substance/Health/Antiviral
SUBSTANCE painkiller Evri/Substance/Health/Painkiller
SUBSTANCE Painkiller Evri/Substance/Health/Painkiller
SUBSTANCE anesthetic Evri/Substance/Health/Anesthetic
SUBSTANCE antibody Evri/Substance/Antibody
SUBSTANCE chemotherapeutic_drug Evri/Substance/Health/Chemotherapeutic
SUBSTANCE anti-diabetic_drug Evri/Substance/Health/Anti-diabetic
SUBSTANCE antianginal_drug Evri/Substance/Health/Antianginal
```

TABLE 4-continued

```
SUBSTANCE muscle_relaxant Evri/Substance/Health/Muscle_relaxant
SUBSTANCE hypolipidemic_drug Evri/Substance/Health/Hypolipidemic_Drug
SUBSTANCE psychoactive_drug Evri/Substance/Health/Psychoactive_Drug
SUBSTANCE vaccine Evri/Substance/Health/Vaccine
SUBSTANCE gastrointestinal_drug Evri/Substance/Health/Gastrointestinal_Drug
SUBSTANCE erectile_dysfunction_drug Evri/Substance/Health/Erectile_Dysfunction_Drug
SUBSTANCE organometallic_compound
Evri/Substance/Organic_Compound/Organometallic_Compound
SUBSTANCE phenol Evri/Substance/Organic_Compound/Phenol
SUBSTANCE ketone Evri/Substance/Organic_Compound/Ketone
SUBSTANCE amide Evri/Substance/Organic_Compound/Amide
SUBSTANCE ester Evri/Substance/Organic_Compound/Ester
SUBSTANCE ether Evri/Substance/Organic_Compound/Ether
SUBSTANCE heterocyclic_compound
Evri/Substance/Organic_Compound/Heterocyclic_Compound
SUBSTANCE organic_compound Evri/Substance/Organic_Compound
SUBSTANCE carbohydrate Evri/Substance/Organic_Compound/Carbohydrate
SUBSTANCE peptide Evri/Substance/Organic_Compound/Peptide
SUBSTANCE organohalide Evri/Substance/Organic_Compound/Organohalide
SUBSTANCE organosulfur_compound
Evri/Substance/Organic_Compound/Organosulfur_Compound
SUBSTANCE aromatic_compound Evri/Substance/Organic_Compound/Aromatic_Compound
SUBSTANCE carboxylic_acid Evri/Substance/Organic_Compound/Carboxylic_Acid
SUBSTANCE nucleic_acid Evri/Substance/Nucleic_Acid
SUBSTANCE ion Evri/Substance/Ion
ORGANISM cyanobacterium Evri/Organism/Health/Cyanobacterium
ORGANISM gram-positive_bacterium Evri/Organism/Health/Gram-positive_Bacterium
ORGANISM gram-negative_bacterium Evri/Organism/Health/Gram-negative_Bacterium
ORGANISM acid-fast_bacterium Evri/Organism/Health/Acid-fast_Bacterium
ORGANISM dna_virus Evri/Organism/Health/DNA_Virus
ORGANISM rna_virus Evri/Organism/Health/RNA_Virus
CONDITION symptom Evri/Condition/Health/Symptom
CONDITION injury Evri/Condition/Health/Injury
CONDITION inflammation Evri/Condition/Health/Inflammation
CONDITION disease Evri/Condition/Health/Disease
CONDITION cancer Evri/Condition/Health/Disease/Cancer
ORGANISM medicinal_plant Evri/Organism/Health/Medicinal_Plant
ORGANISM poisonous_plant Evri/Organism/Health/Poisonous_Plant
ORGANISM herb Evri/Organism/Herb
CONCEPT medical_procedure Evri/Concept/Health/Medical_Procedure
ORGANISM bacterium Evri/Organism/Health/Bacterium
ORGANISM virus Evri/Organism/Health/Virus
ORGANISM horse Evri/Organism/Horse
PERSON fugitive Evri/Person/Fugitive
ORGANIZATION military_unit Evri/Organization/Politics/Military_Unit
ORGANIZATION law_enforcement_agency
Evri/Organization/Politics/Law_Enforcement_Agency
LOCATION golf_course Evri/Location/Golf_Course
PERSON law_enforcement_agent Evri/Person/Politics/Law_Enforcement_Agent
PERSON magician Evri/Person/Entertainment/Magician
LOCATION educational_institution Evri/Organization/Educational_Institution
CONCEPT social_program Evri/Concept/Politics/Social_Program
EVENT international_conference Evri/Event/Politics/International_Conference
```

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 61/309,318, entitled "CONTENT RECOMMENDATION BASED ON COLLECTIONS OF ENTITIES," filed Mar. 1, 2010, is incorporated herein by reference, in its entirety.

From the foregoing it will be appreciated that, although specific embodiments have been described herein for purposes of illustration, various modifications may be made without deviating from the spirit and scope of this disclosure. For example, the methods, techniques, and systems for content recommendation are applicable to other architectures. For example, instead of utilizing a Vector Space Model of document indexing, systems that are programmed to perform natural language processing (e.g., parts of speech tagging) can be employed. Also, the methods, techniques, and systems discussed herein are applicable to differing query languages, protocols, communication media (optical, wireless, cable, etc.) and devices (such as wireless handsets, mobile communications devices, electronic organizers, personal digital assistants, portable email machines, game machines, pagers, navigation devices such as GPS receivers, etc.).

The invention claimed is:

1. A method in a content recommendation computing system, the method comprising:
presenting a first user interface control that is configured to create a new entity collection in response to received user selection of indications of named entities and suggest one or more additional entities to add to an existing collection;
presenting a second user interface control that displays information about collections created by multiple different users of the content recommendation computing system;
defining, responsive to user selections of indications of named entities via the first user interface control, a collection including multiple entities that are each referenced by one or more of multiple content items indexed by the content recommendation computing system and that are each electronically represented in the content recommendation computing system, the collection being separate from the multiple content items indexed by the content recommendation computing system;

under control of the content recommendation computing system,
  automatically recommending one or more additional entities to be added to the collection based on the multiple entities of the collection, by:
    determining shared characteristics of the multiple entities, wherein each shared characteristic is the same for each of the multiple entities of the collection, the shared characteristics including common facets and common key terms common to the multiple entities of the collection, wherein the common facets are category values, type values, and/or characteristic values of the multiple entities and are sub-type values of a top-level entity type electronically represented by the content recommendation computing system;
    determining a plurality of entities that includes at least a first entity that appears in a content item in a relationship with one of the common facets, a second entity that appears in a content item in context with one of the common key terms, and a third entity that appears in a content item in a relationship with one of the multiple entities and in context with another of the multiple entities, wherein the first entity appears in a content item in a relationship with one of the common facets when the first entity appears as a first subject or object of a subject-verb-object relation present in the content item in which the one of the common facets appears as the other of the subject or object of the first subject-verb-object relation; and
    ordering the determined plurality of entities, based on entity frequency counts of frequency each entity appears in the indexed content items and on whether the determined plurality of entities share one or more of the common facets;
  presenting on the first user interface control the ordered plurality of entities as suggested additions to the collection;
  modifying the collection by adding one of the ordered plurality of entities to the multiple entities of the collection, the added entity selected by a user via the first user interface control;
  automatically processing the modified collection to determine one or more of the multiple content items that are related to at least some of the multiple entities of the modified collection, wherein processing the modified collection includes determining whether one of the multiple entities appears in a content item in a relationship with a facet common to entities of the modified collection and in the content item in context with key terms common to the entities of the modified collection, wherein the one of the multiple entities appears in a content item in a relationship with the facet common to entities of the modified collection when the one of the multiple entities appears as a subject or object of a second subject-verb-object relation present in the content item in which the facet common to the entities of the modified collection appears as the other of the subject or object of the second subject-verb-object relation; and
  recommending the determined one or more of the multiple content items.

2. The method of claim 1 wherein processing the modified collection includes determining multiple articles that each reference at least one of the entities of the modified collection.

3. The method of claim 1 wherein processing the modified collection includes determining multiple entities that are each related to at least one of the entities of the modified collection.

4. The method of claim 1 wherein processing the modified collection includes determining whether an entity appears in an article in a relationship with one of the multiple entities and in the article in context with another one of the multiple entities, wherein the entity appears in the article in a relationship with one of the multiple entities when the entity appears as a subject or object of a third subject-verb-object relation present in the article in which the one of the multiple entities appears as the other of the subject or object of the third subject-verb-object relation.

5. The method of claim 1 wherein recommending the content items includes ordering the multiple content items based on at least one of relevance, recency, or credibility.

6. The method of claim 1, wherein the second user interface control is configured to receive indications of users and/or groups that are allowed to access the defined collection.

7. The method of claim 1, further comprising presenting a third user interface control configured to create a collections widget code module that is configured to provide content recommendations based on an associated collection in a third-party application context.

8. The method of claim 7, wherein the third user interface control includes:
  a widget code area that displays computer instructions implementing the widget code module; and
  a widget preview area that displays a preview of the widget code module as the widget code module would appear in the third-party application context.

9. A method in a content recommendation computing system, the method comprising:
  presenting a first user interface control that is configured to create a new entity collection in response to received user selection of indications of multiple entities and suggest one or more additional entities to add to an existing collection;
  presenting a second user interface control that displays information about collections created by multiple different users of the content recommendation computing system;
  receiving, via the first user interface control, indications of multiple entities that are each referenced by one or more indexed articles and that are each electronically represented in the content recommendation computing system;
  under control of the content recommendation computing system,
    automatically recommending one or more entities based on the indicated multiple entities, by:
      determining shared characteristics of the multiple entities, wherein each shared characteristic is the same for each of the multiple entities, the shared characteristics including common facets and common key terms common to the multiple entities, wherein the common facets are category values, type values, and/or characteristic values of the multiple entities and are sub-type values of a top-level entity type electronically represented by the content recommendation computing system;

determining a plurality of entities that includes at least a first entity that appears in an article in a relationship with one of the common facets, a second entity that appears in an article in context with one of the common key terms, and a third entity that appears in an article in a relationship with one of the multiple entities and in context with another of the multiple entities, wherein the first entity appears in an article in a relationship with one of the common facets when the first entity appears as a subject or object of a first subject-verb-object relation present in the article in which the one of the common facets appears as the other of the subject or object of the first subject-verb-object relation; and ordering the determined plurality of entities, based on entity frequency counts of frequency each entity appears in the indexed articles and on whether the determined plurality of entities share one or more of the common facets; and presenting on the first user interface control the ordered plurality of entities as suggested additions to the multiple entities;

adding one of the ordered plurality of entities to the multiple entities to form modified multiple entities, the added entity selected by a user, the added entity selected by a user via the first user interface control;

determining multiple articles that each include references to at least two of the modified multiple entities;

determining whether one of the modified multiple entities appears in an article in a relationship with a facet common to entities of the modified multiple entities and in the article in context with key terms common to the entities of the modified multiple entities, wherein the one of the modified multiple entities appears in an article in a relationship with the facet common to entities of the modified multiple entities when the one of the modified multiple entities appears as a subject or object of a second subject-verb-object relation present in the article in which the facet common to the entities of the modified multiple entities appears as the other of the subject or object of the second subject-verb-object relation; and storing the determined multiple articles.

10. The method of claim 9 wherein determining the multiple articles includes constructing a query configured to obtain indications of one or more of the articles indexed by the content recommendation computing system.

11. The method of claim 10 wherein constructing the query includes determining whether one of the modified multiple entities is a known disambiguated entity or a known non-disambiguated entity.

12. The method of claim 11 wherein constructing the query includes constructing a query that includes a unique identifier for the one entity when the one entity is a known disambiguated entity.

13. The method of claim 11 wherein constructing the query includes constructing a query that includes, when the one entity is a known non-disambiguated entity, a name for the entity along with one or more disambiguating terms.

14. The method of claim 9 further comprising: ordering the multiple articles based on article recency and/or article relevance.

15. The method of claim 14 wherein ordering the multiple articles includes ordering a first article before a second article, the first article having a more recent publishing date than the second article.

16. The method of claim 14 wherein ordering the multiple articles includes ordering a first article before a second article, the first article, the first article referencing more of the multiple entities than the second article.

17. The method of claim 14 wherein ordering the multiple articles includes ordering the multiple articles based at least in part on term document frequency and/or inverse term document frequency.

18. The method of claim 14 wherein ordering the multiple articles includes ordering the multiple articles based at least in part on source credibility.

19. The method of claim 9, wherein determining the plurality of entities includes determining whether the second entity appears in an article in context with the one of the common key terms, wherein the context includes the second entity being within a specified number of sentences of the one of the common key terms.

20. The method of claim 9, wherein determining the plurality of entities includes determining whether the third entity appears in an article in context with the another of the multiple entities, wherein the context includes the third entity being within a specified number of sentences of the another of the multiple entities.

21. A method in a content recommendation computing system, the method comprising:

presenting a first user interface control that is configured to create a new entity collection in response to received user selection of indications of multiple named entities and suggest one or more additional entities to add to an existing collection;

presenting a second user interface control that displays information about collections created by multiple different users of the content recommendation computing system;

receiving from a user via the first user interface control an indication of a collection including multiple named entities that are each referenced by one or more of multiple articles indexed by the content recommendation computing system and that are each electronically represented in the content recommendation computing system, the collection being separate from the multiple articles indexed by the content recommendation computing system; and under control of the content recommendation computing system, automatically recommending one or more additional entities based on the collection to be added to the collection, by:

determining shared characteristics of the multiple entities, wherein each shared characteristic is the same for each of the multiple entities of the collection, the shared characteristics including common facets and common key terms common to the multiple entities of the collection, wherein the common facets are category values, type values, and/or characteristic values of the multiple entities and are sub-type values of a top-level entity type electronically represented by the content recommendation computing system;

determining a plurality of additional entities by constructing a query configured to discover relationships expressed in articles, wherein the plurality of additional entities includes at least:
  a first entity that appears in an article in a relationship with one of the common facets, wherein the first entity appears in the article in a relationship with one of the common facets when the first entity appears as a subject or object of a first subject-verb-object relation present in the article in which the one of the common facets appears as the other of the subject or object of the first subject-verb-object relation,
  a second entity that appears in an article in context with one of the common key terms, and
  a third entity that appears in an article in a relationship with one of the multiple entities and in the article in context with another one of the multiple entities, wherein the third entity appears in the article in a relationship with one of the multiple entities when the third entity appears as a subject or object of a second subject-verb-object relation present in the article in which the one of the multiple entities appears as the other of the subject or object of the second subject-verb-object relation;
ordering the determined plurality of additional entities, based on entity frequency counts of frequency each entity appears in the indexed articles and on whether the determined additional entities share one or more of the common facets;
presenting on the first user interface control the ordered plurality of entities as suggested additions to the collection;
modifying the collection by adding one of the ordered plurality of entities to the collection, the added entity selected by a user via the first user interface control;
automatically processing the modified collection to determine one or more of the indexed articles that are related to at least some of the multiple entities of the modified collection, wherein processing the modified collection includes determining whether one of the multiple entities appears in an article in a relationship with a facet common to entities of the modified collection and in the article in context with key terms common to the entities of the modified collection, wherein the one of the multiple entities appears in an article in a relationship with the facet common to entities of the modified collection when the one of the multiple entities appears as a subject or object of a third subject-verb-object relation present in the article in which the facet common to the entities of the modified collection appears as the other of the subject or object of the third subject-verb-object relation;
storing the modified collection; and
storing indications of the determined articles.

22. The method of claim 21 wherein determining the plurality of additional entities includes determining a plurality of additional entities that each appear in a subject-verb-object relationship described in an article and that includes one of the multiple entities.

23. The method of claim 21 wherein determining the plurality of additional entities includes determining a plurality of additional entities that each appear in an article in a relationship with one of the common facets and in the article in context with one of the common key terms.

24. The method of claim 21 wherein determining the plurality of additional entities includes determining a plurality of additional entities that each appear in an article in a relationship with one of the multiple entities and in the article in context with another one of the multiple entities.

25. The method of claim 21 wherein receiving the indication of the collection includes at least one of: receiving indication of an entity selected from an entity store, receiving indication of a keyterm, and/or receiving an indication of facet.

26. The method of claim 21, further comprising ordering the plurality of entities based at least in part on how many facets are shared between each of the plurality of entities and the multiple entities.

27. The method of claim 21, further comprising ordering the plurality of entities based at least in part on how frequently each of the plurality the entities appear in one or more articles that reference the entity.

28. A non-transitory computer-readable medium whose contents enable a content recommendation computing system to recommend content, by performing a method comprising:
  presenting a first user interface control that is configured to create a new entity collection in response to received user selection of indications of named entities and suggest one or more additional entities to add to an existing collection;
  presenting a second user interface control that displays information about collections created by multiple different users of the content recommendation computing system;
  defining, responsive to user selections of indications of named entities via the first user interface control, a collection including multiple entities that are each referenced by one or more of multiple content items indexed by the content recommendation computing system and that are each electronically represented in the content recommendation computing system, the collection being separate from the multiple content items indexed by the content recommendation computing system;
  under control of the content recommendation computing system,
    automatically recommending one or more additional entities to be added to the collection based on the multiple entities of the collection, by:
      determining shared characteristics of the multiple entities, wherein each shared characteristic is the same for each of the multiple entities of the collection, the shared characteristics including common facets and common key terms common to the multiple entities of the collection, wherein the common facets are category values, type values, and/or characteristic values of the multiple entities and are sub-type types of a top-level entity type electronically represented by the content recommendation computing system;
      determining a plurality of entities that includes at least a first entity that appears in a content item in a relationship with one of the common facets, a second entity that appears in a content item in context with one of the common key terms, and a third entity that appears in a content item in a relationship with one of the multiple entities and in context with another of the multiple entities, wherein the first entity appears in a content item in a relationship with one of the common facets when the first entity appears as a subject or object of a first subject-verb-object relation present in the content item in which the one of the common facets appears as the other of the subject or object of the first subject-verb-object relation; and ordering the determined plurality of entities, based on entity frequency counts of frequency each entity appears in the indexed content items and on whether the determined plurality of entities share one or more of the common facets;

presenting on the first user interface control the ordered plurality of entities as suggested additions to the collection;

modifying the collection by adding one of the ordered plurality of entities to the multiple entities of the collection, the added entity selected by a user via the first user interface control;

automatically processing the modified collection to determine one of the multiple content items that is related to at least some of the multiple entities of the modified collection, wherein processing the modified collection includes determining whether one of the multiple entities appears in a content item in a relationship with a facet common to entities of the modified collection and in the content item in context with key terms common to the entities of the modified collection, wherein the one of the multiple entities appears in a content item in a relationship with the facet common to entities of the modified collection when the one of the multiple entities appears as a subject or object of a second subject-verb-object relation present in the content item in which the facet common to the entities of the modified collection appears as the other of the subject or object of the second subject-verb-object relation; and recommending the determined one or more of the multiple content items.

29. The non-transitory computer-readable medium of claim 28 wherein the plurality of entities includes a fourth entity appears in an article in a relationship with one or more of the common facets and in the article in context with one of the common key terms.

30. The non-transitory computer-readable medium of claim 28 wherein the computer-readable medium is a memory in a computing device.

31. The non-transitory computer-readable medium of claim 28 wherein the contents are instructions that when executed cause the content recommendation computing system to perform the method.

32. A content recommendation computing system configured to recommend content, comprising:

a memory;

a processing unit;

a code module stored on the memory that is configured, when executed by the processing unit, to:

present a user interface control that is configured to create a new entity collection in response to received user selection of indications of named entities and suggest one or more additional entities to add to an existing collection;

present a second user interface control that displays information about collections created by multiple different users of the content recommendation computing system;

define, responsive to user selections of indications of named entities via the first user interface control, a collection including multiple entities that are each referenced by one or more of multiple content items indexed by a content recommendation computing system and that are each electronically represented in the content recommendation computing system, the collection being separate from the multiple content items indexed by the content recommendation computing system;

automatically recommend one or more additional entities to be added to the collection based on the multiple entities of the collection, by:

determining shared characteristics of the multiple entities, wherein each shared characteristic is the same for each of the multiple entities of the collection, the shared characteristics including common facets and common key terms common to the multiple entities of the collection, wherein the common facets are category values, type values, and/or characteristic values of the multiple entities and are sub-type values of a top-level entity type electronically represented by the content recommendation computing system;

determining a plurality of entities that includes at least a first entity that appears in a content item in a relationship with one of the common facets, a second entity that appears in a content item in context with one of the common key terms, and a third entity that appears in a content item in a relationship with one of the multiple entities and in context with another of the multiple entities, wherein the first entity appears in a content item in a relationship with one of the common facets when the first entity appears as a subject or object of a first subject-verb-object relation present in the content item in which the one of the common facets appears as the other of the subject or object of the first subject-verb-object relation; and ordering the determined plurality of entities, based on entity frequency counts of frequency each entity appears in the indexed content items and on whether the determined plurality of entities share one or more of the common facets;

present on the first user interface control the ordered plurality of entities as suggested additions to the collection;

modify the collection by adding one of the ordered plurality of entities to the multiple entities of the collection, the added entity selected by a user via the first user interface control;

automatically process the modified collection to determine one or more content items of the multiple content items that are related to at least some of the multiple entities of the modified collection, wherein the module processes the modified collection by determining whether one of the multiple entities appears in a content item in a relationship with a facet common to entities of the modified collection and in the content item in context with key terms common to the entities of the modified collection, wherein the one of the multiple entities appears in a content item in a relationship with the facet common to entities of the modified collection when the one of the multiple entities appears as a subject or object of a second subject-verb-object relation present in the content item in which the facet common to the entities of the modified collection appears as the other of the subject or object of the second subject-verb-object relation; and recommend the determined one or more of the multiple content items.

33. The content recommendation computing system of claim 32 wherein the module is configured to recommend at least one of an article, image, advertisement, audio, video, and/or document.

34. The content recommendation computing system of claim 32 wherein the module is configured to recommend content items to at least one of a desktop computing system, a personal digital assistant, a smart phone, a mobile application, a laptop computer, and/or a third-party application.

* * * * *